US011359141B2

(12) United States Patent
Kirsch et al.

(10) Patent No.: US 11,359,141 B2
(45) Date of Patent: Jun. 14, 2022

(54) ADDITIVES FOR LIQUID CRYSTAL MIXTURES

(71) Applicant: MERCK PATENT GMBH, Darmstadt (DE)

(72) Inventors: Peer Kirsch, Seeheim-Jugenheim (DE); Qiong Tong, Darmstadt (DE); Helga Haas, Lampertheim (DE); Kaja Christina Deing, Darmstadt (DE); Christoph Marten, Darmstadt (DE); Andreas Pohle, Pfungstadt (DE); Reiner Friedrich, Seeheim-Jugenheim (DE)

(73) Assignee: MERCK PATENT GMBH, Darmstadt (DE)

( * ) Notice: Subject to any disclaimer, the term of this patent is extended or adjusted under 35 U.S.C. 154(b) by 207 days.

(21) Appl. No.: 16/467,255

(22) PCT Filed: Dec. 5, 2017

(86) PCT No.: PCT/EP2017/081481
§ 371 (c)(1),
(2) Date: Jun. 6, 2019

(87) PCT Pub. No.: WO2018/104285
PCT Pub. Date: Jun. 14, 2018

(65) Prior Publication Data
US 2019/0300791 A1 Oct. 3, 2019

(30) Foreign Application Priority Data

Dec. 8, 2016 (DE) .................. 102016014622.2

(51) Int. Cl.
| | | |
|---|---|---|
| *G02F 1/13* | (2006.01) | |
| *C09K 19/04* | (2006.01) | |
| *C09K 19/34* | (2006.01) | |
| *C09K 19/30* | (2006.01) | |
| *C09K 19/54* | (2006.01) | |
| *G02F 1/1341* | (2006.01) | |
| *C09K 19/12* | (2006.01) | |

(52) U.S. Cl.
CPC .......... *C09K 19/3491* (2013.01); *C09K 19/04* (2013.01); *C09K 19/3003* (2013.01); *C09K 19/3098* (2013.01); *C09K 19/3402* (2013.01); *C09K 19/3405* (2013.01); *C09K 19/54* (2013.01); *C09K 19/542* (2013.01); *C09K 2019/0444* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *C09K 2019/3027* (2013.01); *C09K 2019/3408* (2013.01); *C09K 2019/3422* (2013.01); *G02F 1/1341* (2013.01); *G02F 1/13415* (2021.01)

(58) Field of Classification Search
CPC ....................................................... C09K 19/54
See application file for complete search history.

(56) References Cited

U.S. PATENT DOCUMENTS

| | | | |
|---|---|---|---|
| 5,482,650 A | 1/1996 | Janulis et al. | |
| 5,868,960 A * | 2/1999 | Kosaka | C07D 277/66 252/299.01 |
| 5,972,241 A | 10/1999 | Johnson et al. | |
| 9,567,526 B2 | 2/2017 | Engel et al. | |
| 9,617,477 B2 | 4/2017 | Goto et al. | |
| 10,392,339 B2 | 8/2019 | Tanaka et al. | |
| 2007/0170394 A1* | 7/2007 | Kawamura | C09K 19/3003 252/299.01 |
| 2013/0182202 A1 | 7/2013 | Graziano et al. | |
| 2014/0138580 A1 | 5/2014 | Mizumura et al. | |
| 2014/0339470 A1 | 11/2014 | Katoh et al. | |
| 2014/0375943 A1 | 12/2014 | Engel et al. | |
| 2015/0344784 A1 | 12/2015 | Goto et al. | |
| 2016/0152894 A1 | 6/2016 | Yoon et al. | |
| 2017/0369418 A1 | 12/2017 | Tanaka et al. | |

FOREIGN PATENT DOCUMENTS

| | | |
|---|---|---|
| CN | 104250214 A | 12/2014 |
| EP | 3029127 B1 | 12/2017 |
| EP | 2842974 B1 | 3/2019 |
| JP | 10298127 A * | 11/1998 |
| JP | 10298127 A | 11/1998 |
| JP | 2007308483 A * | 11/2007 |
| JP | 2007308483 A | 11/2007 |

(Continued)

OTHER PUBLICATIONS

Kunishima Munetaka et al: "Development of acid-catalyzed fluorous benzylating reagents based on a triazinedione core", Journal of Fluorine Chemistry, Elsevier, NL, vol. 190, Sep. 5, 2016 (Sep. 5, 2016), pp. 68-74, XP029738638, ISSN: 0022-1139, DOI:10.1016/J.JFLUCHEM.2016.09.003 A (Year: 2016).*
Translation of Description of JP 2007308483.*
International Search Report PCT/EP2017/081481 dated May 30, 2018 (pp. 1-15).
Kunishima Munetaka et al: "Development of acid-catalyzed fluorous benzylating reagents based on a triazinedione core", Journal of Fluorine Chemistry, Elsevier, NL, vol. 190, Sep. 5, 2016 (Sep. 5, 2016), pp. 68-74, XP029738638, ISSN: 0022-1139.
Communication according to Art. 94(3) EPC dated Mar. 11, 2021 in corresponding EP application 17821816.0 (pp. 1-5).

(Continued)

Primary Examiner — Chanceity N Robinson
(74) Attorney, Agent, or Firm — Millen, White, Zelano & Branigan, PC; Ryan Pool

(57) ABSTRACT

Polyfluorinated additives for use as components in liquid-crystal mixtures. Liquid-crystal mixtures which comprise these compounds. And liquid-crystal displays based on these liquid-crystal mixtures.

11 Claims, No Drawings

(56) References Cited

FOREIGN PATENT DOCUMENTS

| | | |
|---|---|---|
| JP | 2013047204 A | 3/2013 |
| JP | 2013173881 A | 9/2013 |
| JP | 2016132111 A | 7/2016 |
| KR | 20110068303 A | 6/2011 |
| TW | 201118159 A | 6/2011 |
| TW | 201631136 A | 9/2016 |
| WO | 9322396 A1 | 11/1993 |
| WO | 16129490 A1 | 8/2016 |

OTHER PUBLICATIONS

Taiwanese Office Action in corresponding TW Application No. 106142838 dated Aug. 2, 2021 (pp. 1-14) and English translation thereof (pp. 1-5).

Notice of Reasons for Refusal in corresponding Japanese Patent Application No. 2019-530656 dated Jan. 31, 2022 (pp. 1-6) and English translation thereof (pp. 1-6).

* cited by examiner

ADDITIVES FOR LIQUID CRYSTAL MIXTURES

The invention relates to polyfluorinated additives for use as components in liquid-crystal mixtures, to liquid-crystal mixtures which comprise the compounds, and to liquid-crystal displays based on these mixtures.

Liquid crystals have found a broad range of applications since the first commercially usable liquid-crystalline compounds were found about 40 years ago. Known areas of application today are simple digital displays, displays of portable and desktop computers, navigation systems and not least television sets. For video-capable displays in particular, high demands are made of the response times and contrast of the images.

The spatial arrangement of the molecules in a liquid crystal has the effect that many of its properties are direction-dependent. Of particular importance for use in liquid-crystal displays are the optical, dielectric and elasto-mechanical anisotropies. Depending on whether the molecules are oriented with their longitudinal axes perpendicular or parallel to the two plates of a capacitor, the latter has a different capacitance; in other words, the dielectric constant ε of the liquid-crystalline medium has different values for the two orientations. Substances whose dielectric constant is larger when the longitudinal axes of the molecules are oriented perpendicular to the capacitor plates than when they are oriented parallel are referred to as dielectrically positive. In other words, if the dielectric constant $\varepsilon_\parallel$ parallel to the longitudinal axes of the molecules is larger than the dielectric constant $\varepsilon_\perp$ perpendicular to the longitudinal axes of the molecules, the dielectric anisotropy $\Delta\varepsilon=\varepsilon_\parallel-\varepsilon_\perp$ is greater than zero. Most liquid crystals used in conventional displays fall into this group.

Both the polarisability of the molecule and the permanent dipole moment play a role for the dielectric anisotropy. On application of a voltage to the display, the longitudinal axis of the molecules orients itself in such a way that the larger of the dielectric constants becomes effective. The strength of the interaction with the electric field depends on the difference between the two constants. In the case of small differences, higher switching voltages are necessary than in the case of large differences. The introduction of suitable polar groups, such as, for example, nitrile groups or fluorine, into the liquid-crystal molecules enables a broad range of working voltages to be achieved.

In the case of the liquid-crystalline molecules used in conventional liquid-crystal displays, the dipole moment oriented along the longitudinal axis of the molecules is larger than the dipole moment oriented perpendicular to the longitudinal axis of the molecules. In the widespread TN ("twisted nematic") cells, a liquid-crystalline layer with a thickness of only from about 5 to 10 μm is arranged between two plane-parallel glass plates, onto each of which an electrically conductive, transparent layer of indium tin oxide (ITO) has been vapour-deposited as electrode. A likewise transparent alignment layer, usually consisting of a plastic (for example polyimides), is located between these films and the liquid-crystalline layer. This alignment layer serves to bring the longitudinal axes of the adjacent liquid-crystalline molecules into a preferential direction through surface forces in such a way that, in the voltage-free state, they lie uniformly with the same orientation, flat or with the same small tilt angle, on the inside of the display surface. Two polarisation films which only enable linear-polarised light to enter and escape are applied to the outside of the display in a certain arrangement.

By means of liquid crystals in which the larger dipole moment is oriented parallel to the longitudinal axis of the molecule, very high-performance displays have already been developed. In most cases here, mixtures of from 5 to 20 components are used in order to achieve a sufficiently broad temperature range of the mesophase and short response times and low threshold voltages. However, difficulties are still caused by the strong viewing-angle dependence in liquid-crystal displays as are used, for example, for laptops. The best imaging quality can be achieved if the surface of the display is perpendicular to the viewing direction of the observer. If the display is tilted relative to the observation direction, the imaging quality deteriorates drastically under certain circumstances. For greater comfort, attempts are being made to maximise the angle through which the display can be tilted from the viewing direction of an observer without significantly reducing the imaging quality. Attempts have recently been made to improve the viewing-angle dependence using liquid-crystalline compounds whose dipole moment perpendicular to the longitudinal axis of the molecule is larger than that parallel to the longitudinal axis of the molecule. The dielectric anisotropy $\Delta\varepsilon$ is negative in this case. In the field-free state, these molecules are oriented with their longitudinal axis perpendicular to the glass surface of the display. Application of an electric field causes them to orient themselves more or less parallel to the glass surfaces. In this way, it has been possible to achieve an improvement in the viewing-angle dependence. Displays of this type are known as VA-TFT ("vertically aligned") displays.

For switching individual pixels, the majority of high-resolution displays are addressed by non-linear electronic elements, for example by thin-film transistors ("TFTs"). Such displays are also referred to below as active-matrix displays (TFT displays).

Besides problems regarding the angle dependence of the contrast and the response times, difficulties also arise in TFT displays due to insufficiently high specific resistance of the liquid-crystal mixtures [TOGASHI, S., SEKO-GUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of a TFT display deteriorates, and the problem of 'after-image elimination' may occur. Since the specific resistance of the liquid-crystal mixture generally drops over the life of a TFT display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and the lowest possible sensitivity on heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The TFT displays from the prior art do not meet today's requirements.

The LCD device itself comprises two substrates with electrodes and a layer of the liquid crystal located in the space enclosed by the substrates. The display of an image is achieved by changing the alignment of the liquid crystals with the aid of an electric voltage applied to the electrodes.

An LCD display is typically produced by adhesively bonding a first substrate having a pixel electrode, a thin-film transistor (TFT) and other components to a second substrate which contains a common electrode, using a sealant.

The space enclosed by the substrates is filled with the liquid crystal via a fill opening by means of capillary force or vacuum; the fill opening is subsequently sealed using a sealant.

With the increase in the size of liquid-crystal displays in recent years, the so-called "one drop filling" process (ODF process) has been proposed as a process for the mass production of liquid-crystal displays (see, for example, JPS63-179323 and JPH10-239694) in order to shorten the cycle times during production. This is a process for the production of a liquid-crystal display in which a drop of the liquid crystal is applied to the substrate, which is fitted with electrodes. The second substrate fitted with electrodes and/or colour filters and a sealant round the edges is subsequently mounted in vacuo, and the sealant is cured by UV irradiation and heat treatment.

The filling of active-matrix liquid-crystal devices by the ODF method is currently the preferred method for large-format displays. Suitable metering devices for filling a crystal display by the ODF method are familiar to the person skilled in the art. A prerequisite for the success of the ODF method is that the liquid-crystal medium distributes itself after application to form a uniform film between the substrates. Problems can be caused by an inade-quate flow behaviour. On use of conventional liquid-crystal mixtures, a known problem is the occurrence of so-called "ODF mura" or "ODF drop mura", characterised by, for example, periodic ring-shaped irregularities of the display surface along the droplet boundaries. Due to the different flow conditions during droplet deposition and coalescence of the droplets when the substrates are joined together, the ODF mura occur to different extents, which is essentially evident through uneven distribution of the brightness of the display. In the case of liquid-crystal devices of the VA type, and also of the MVA, PVA and PS-VA types, outlines of the droplets are a typical problem. In addition, brightness differences of this type are fixed in the case of polymer-stabilised displays (for example PSA and PS-VA). Conventional preventative measures, such as a reduction in the polymer concentration, are generally associated with other disadvantages, such as lower stability of the tilt angle, etc. It is therefore desirable to provide liquid-crystal mixtures which achieve good wetting of the substrate (spreading), have good flow properties and substantially avoid the phenomenon of ODF mura.

It is therefore an object of the invention specifically to improve the wetting behaviour and flow properties of liquid-crystalline media. The electro-optical and chemical properties of the mixtures, which have been optimised in a wide variety of ways, must not be adversely affected in the process. A further object of the present invention is to provide mixtures and a process for the production of liquid-crystal displays in which the above-described phenomenon of ODF mura does not occur or only occurs to a tolerable extent.

There is therefore still a great demand for TFT displays having very high specific resistance at the same time as a large working-temperature range, short response times even at low temperatures and low threshold voltage which do not have these disadvantages, or only do so to a reduced extent.

Development in the area of liquid-crystalline materials is still far from complete. In order to improve the properties of liquid-crystalline display elements, attempts are constantly being made to develop novel compounds which enable optimisation of such displays.

Liquid-crystalline mixtures having a reduced tendency towards the formation of ODF mura have not been explicitly described much to date. The specification KR 2011-0068303 proposes a polysiloxane as additive for reducing drop mura.

An object of the present invention consists in providing a liquid-crystalline medium having improved properties for processing and application. A further object of the present invention is to provide additives having advantageous properties for use in liquid-crystalline media.

This is achieved by the provision of a liquid-crystalline medium comprising a liquid-crystalline component, which is characterised in that it comprises an additive of the following formula I:

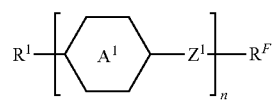

in which $R^1$ denotes a straight-chain or branched alkyl group having 1 to 20 C atoms, or H, where, in addition, one or more $CH_2$ groups in this radical may each be replaced, independently of one another, by —C≡C—, —CH═CH—,

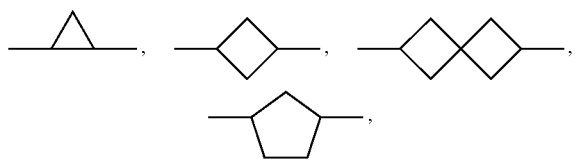

—O—, —S—, —CO—O— or —O—CO— in such a way that O/S atoms are not linked directly to one another, $R^F$ denotes a group selected from the formulae —$R^2$,

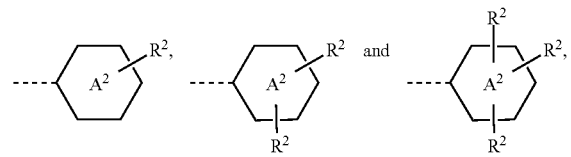

$R^2$ in each case independently denotes

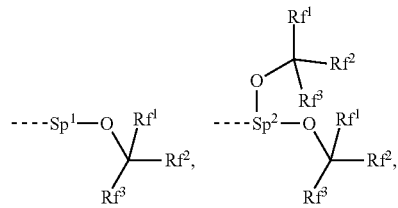

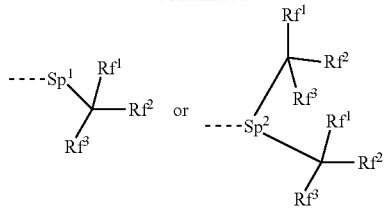

Rf¹, Rf³ independently denote H, F, —CF₃, —CF₂CF₃, —CF₂CF₂CF₃ or CF(CF₃)₂, preferably —CF₃, —CF₂CF₃, —CF₂CF₂CF₃ or CF(CF₃)₂, particularly preferably —CF₃, Rf² independently denotes an unbranched, branched or cyclic fluoroalkyl group having 3 to 15 fluorine atoms and 1 to 10 C atoms, in which one or more non-adjacent CH₂ groups may be replaced by —O— and/or —S—, in particular —CF₃, —CF₂CF₃, —CF₂CF₂CF₃, —CH₂CF₂CF₂CF₃, —CH₂CF₂CF₃, —CF(CF₃)—O—CF₂CF₂CF₃, —S—CF₂CHF—O—CF₂CF₂CF₃ or CF(CF₃)₂,
preferably —CF₃, —CF₂CF₃, —CF₂CF₂CF₃ or CF(CF₃)₂, particularly preferably —CF₃, Z¹ in each case independently denotes a single bond, —CH₂CH₂—, —COO—, trans- —CH=CH—, trans- —CF=CF—, —CH₂O—, —CF₂O— or —C≡C—, in which asymmetrical bridges may be oriented to both sides, and where two O atoms of adjacent groups are not connected directly, Sp¹ denotes a single bond or —(CH₂)$_m$—, in which m=1, 2, 3 or 4 and in which one or two CH₂ groups may be replaced by —O— or —S— in such a way that O/S atoms are not linked directly to one another, Sp² denotes a linear or branched, trivalent spacer, preferably a trivalent alkylene having 1 to 10 C atoms, which is linear or branched, in which one or more non-adjacent CH₂ groups may be replaced by —O—, particularly preferably one of the moieties

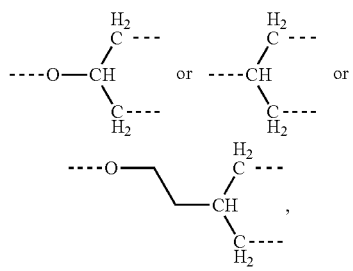

A¹ in each case independently denotes a radical selected from the following groups:
  a) the group consisting of trans-1,4-cyclohexylene and 1,4-cyclohexenylene, in which, in addition, one or more non-adjacent CH₂ groups may be replaced by —O— and/or —S— and in which, in addition, one or more H atoms may be replaced by F or Cl,
  b) 1,4-phenylene, in which, in addition, one or two CH groups may be replaced by N and in which, in addition, one or more H atoms may be replaced by a group L or R², and
  c) the group consisting of 2,6-naphthylene, dibenzofuran-3,7-diyl, dibenzothiophene-3,7-diyl, 9H-fluorene-2,7-diyl, phenanthrene-2,7-diyl, 6H-benzo[c] chromene-3,8-diyl, anthracene-2,6-diyl, tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by a group L, A² denotes a 6- or 5-membered saturated, unsaturated or aromatic, carbocyclic or heterocyclic ring system, preferably a cyclohexane ring or a benzene ring, which is in each case optionally additionally substituted by one or two groups L, L independently denotes F, Cl, —CN, an alkyl group having 1 to 5 C atoms, an alkoxy group having 1-5 C atoms or an alkenyl group having 2 to 5 C atoms, n denotes 0, 1, 2, 3 or 4, preferably 0, 1, 2 or 3, particularly preferably 1, 2 or 3, very particularly preferably 1 or 2.

The invention furthermore relates to compounds of the formula I:

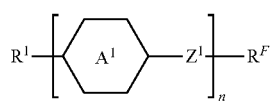

in which

R¹ denotes a straight-chain or branched alkyl group having 1 to 20 C atoms, or H, where, in addition, one or more CH₂ groups in this radical may each be replaced, independently of one another, by —C≡C—, —CH=CH—,

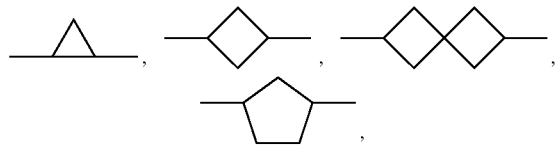

—O—, —S—, —CO—O— or —O—CO— in such a way that O/S atoms are not linked directly to one another, R$^F$ denotes a group selected from the formulae

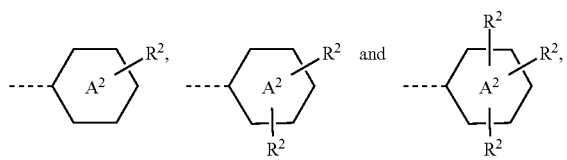

R² in each case independently denotes

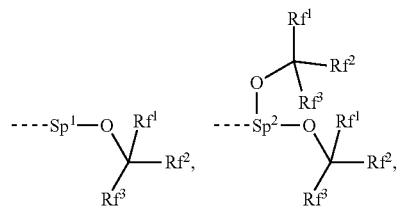

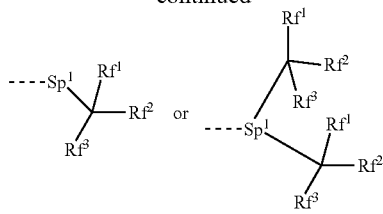

Rf¹, Rf³ independently denote H, F, —CF₃, —CF₂CF₃, —CF₂CF₂CF₃ or CF(CF₃)₂, preferably —CF₃, —CF₂CF₃, —CF₂CF₂CF₃ or CF(CF₃)₂, particularly preferably —CF₃, Rf² independently denotes an unbranched, branched or cyclic fluoroalkyl group having 3 to 15 fluorine atoms and 1 to 10 C atoms, in which one or more non-adjacent CH₂ groups may be replaced by —O— and/or —S—, in particular —CF₃, —CF₂CF₃, —CF₂CF₂CF₃, —CH₂CF₂CF₂CF₃, —CH₂CF₂CF₃, —CF(CF₃)—O—CF₂CF₂CF₃, —S—CF₂CHF—O—CF₂CF₂CF₃ or CF(CF₃)₂, preferably —CF₃, —CF₂CF₃, —CF₂CF₂CF₃ or CF(CF₃)₂, particularly preferably —CF₃, Z¹ in each case independently denotes a single bond, —CH₂CH₂—, —COO—, trans- —CH=CH—, trans- —CF=CF—, —CH₂O—, —CF₂O— or —C≡C—, in which asymmetrical bridges may be oriented to both sides, and where two O atoms are not connected directly, Sp¹ denotes a single bond or —(CH₂)ₘ—, in which m=1, 2, 3 or 4 and in which one or two CH₂ groups may be replaced by —O— or —S— in such a way that O/S atoms are not linked directly to one another Sp² denotes a linear or branched, trivalent spacer, preferably a trivalent alkylene having 1 to 10 C atoms, which is linear or branched, in which one or more non-adjacent CH₂ groups may be replaced by —O—, preferably one of the moieties

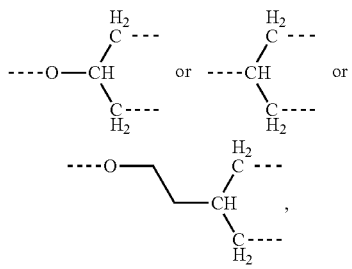

A¹ in each case independently denotes a radical selected from the following groups:
  a) the group consisting of trans-1,4-cyclohexylene and 1,4-cyclohexenylene, in which, in addition, one or more non-adjacent CH₂ groups may be replaced by —O— and/or —S— and in which, in addition, one or more H atoms may be replaced by F or Cl,
  b) 1,4-phenylene, in which, in addition, one or two CH groups may be replaced by N and in which, in addition, one or more H atoms may be replaced by a group L, and
  c) the group consisting of 2,6-naphthylene, dibenzofuran-3,7-diyl, dibenzothiophene-3,7-diyl, 9H-fluorene-2,7-diyl, phenanthrene-2,7-diyl, 6H-benzo[c] chromene-3,8-diyl, anthracene-2,6-diyl, tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by a group L, A² denotes a 6- or 5-membered saturated, unsaturated or aromatic, carbocyclic or heterocyclic ring system, preferably a cyclohexane ring or a benzene ring, which is in each case optionally additionally substituted by one or two groups L, L independently denotes F, Cl, —CN, an alkyl group having 1 to 5 C atoms, an alkoxy group having 1 to 5 C atoms or an alkenyl group having 2 to 5 C atoms, n denotes 0, 1, 2, 3 or 4, preferably 1, 2 or 3, particularly preferably 1 or 2.

The invention furthermore relates to the use of the compounds of the formula I as component of a liquid-crystalline medium, in particular for a nematic medium.

Preference is given to compounds of the formula I in which R¹ denotes a straight-chain, unbranched alkyl group having 1 to 20 C atoms, where in each case, in addition, one or more CH₂ groups, in each case independently of one another, may be replaced by —CH=CH— or —C≡C—.

The ring A¹ in the formula I preferably denotes, in each case independently, also in the case of multiple occurrence, a group selected from sub-groups a) and b), which, in addition, may be mono- or polysubstituted by a group L. The group A¹ particularly preferably denotes a cyclohexane ring, a cyclohexene ring or a benzene ring, which is optionally additionally substituted by one or two groups L.

The group L preferably independently denotes F, Cl, —CF₃ or an alkyl or alkoxy group having 1, 2 or 3 carbon atoms, particularly preferably F, Cl, methyl or ethyl.

The group Z¹ preferably denotes a single bond.

The compounds of the formula I are preferably selected from the compounds of the formulae

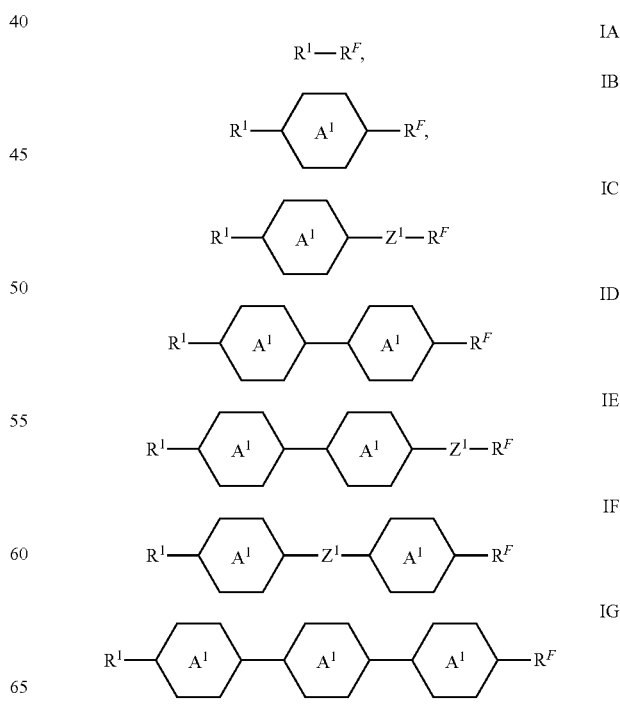

Of these, preference is given to the structures of the formulae IA, IB, IC, ID and IG, particularly of the formulae IA, IB and IC.

In a preferred embodiment, use is made of compounds of the formula IA in which $R^1$ denotes a radical as defined for formula I, but having 8 to 20 C atoms, while the radicals $R^1$ in the formulae IB to IF (generally n>0), preferably independently have a chain length of 1 to 10 C atoms. The radical $R^1$ in formula IA preferably denotes, for example, octadecanyl, 1-ethylhexyl, n-octyl, dodecyl etc. Corresponding long-chain alcohols as precursors are commercially available.

The radical $R^F$ is preferably an element selected from the formulae

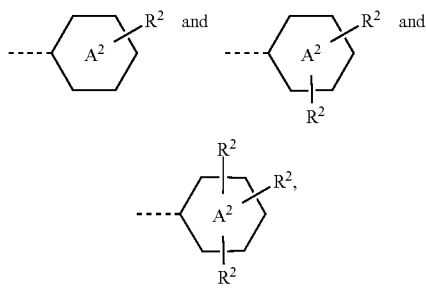

in particular

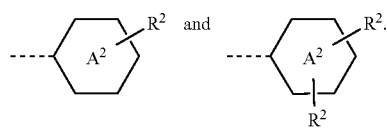

The following part-formulae are particularly preferred for $R^F$:

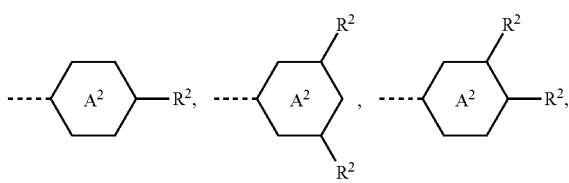

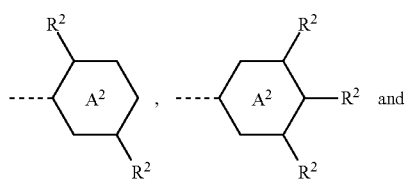

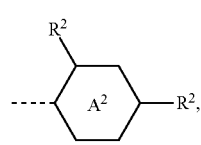

very particularly preferably the formulae:

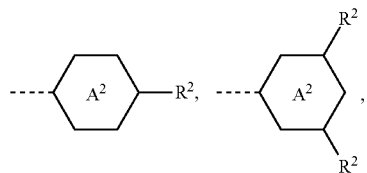

in which the ring $A^2$ denotes a six-membered ring, preferably a benzene ring or a cyclohexane ring.

$R^2$ is particularly preferably a radical of the formulae

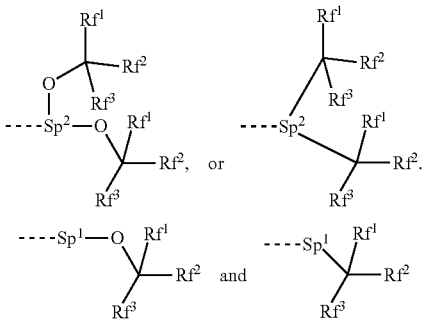

preferably denote the groups

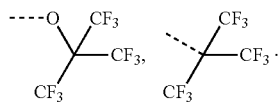

The radical

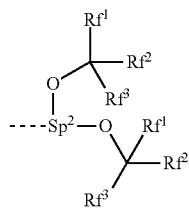

preferably denotes

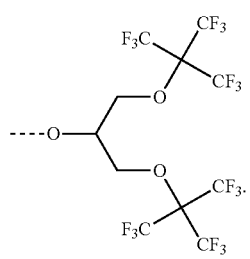

The radical

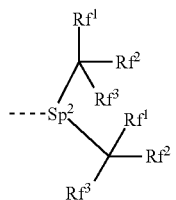

preferably denotes

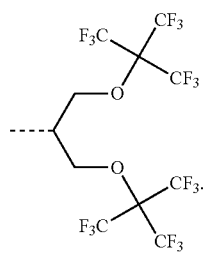

The radical $R^F$ preferably contains in total at least 9 fluorine atoms, particularly preferably at least 12 fluorine atoms, furthermore 18 or more, 28 or more and very particularly preferably 36 or more fluorine atoms. The preferred number of fluorine atoms in the groups $R^2$ accordingly arises depending on the number of groups $R^2$. The total number of fluorine atoms is preferably 60 or less.

Preference is given to compounds of the formula I and liquid-crystalline media comprising an additive of the formula I in which the radicals of the formula I have one of the preferred meanings indicated.

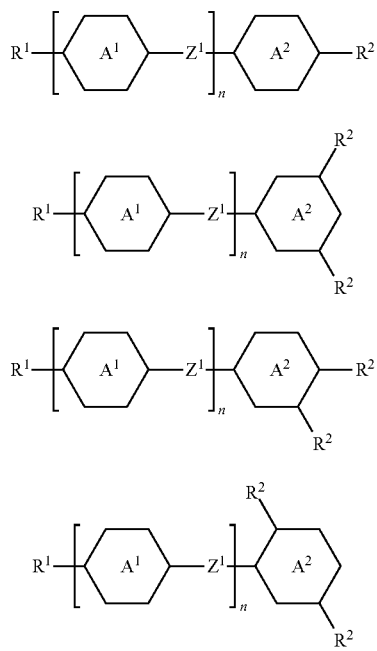

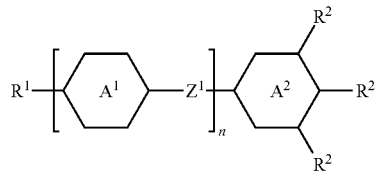

Of these, particular preference is given to the structures of the formulae I-1 and I-2, very particularly of the formula I-2.

In the formulae I and I-1 to I-5, the moiety

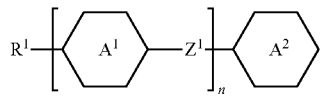

preferably denotes a moiety selected from the following formulae:

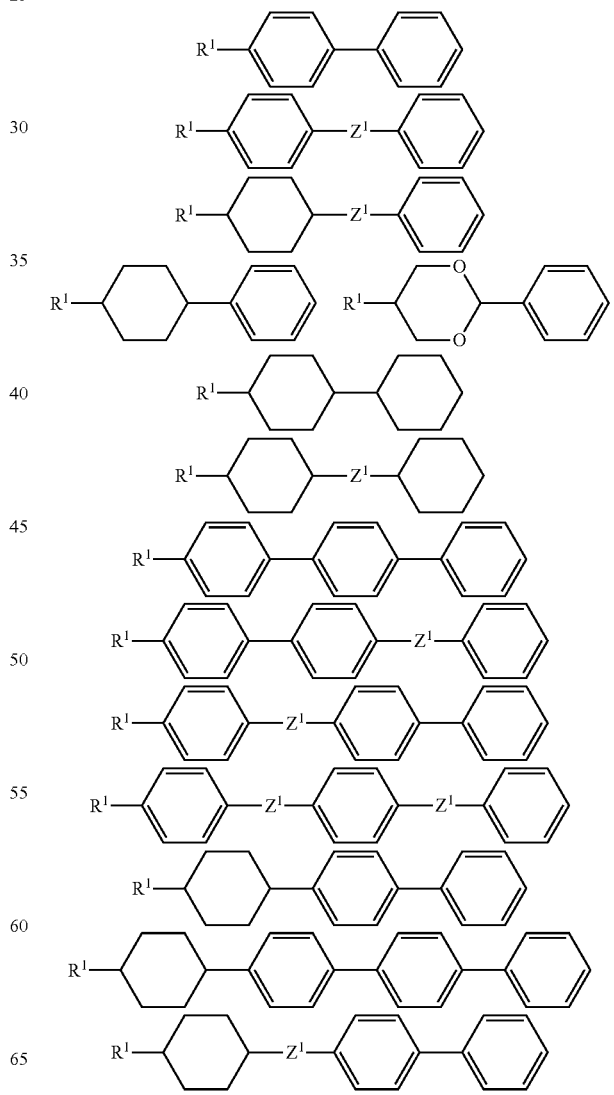

-continued

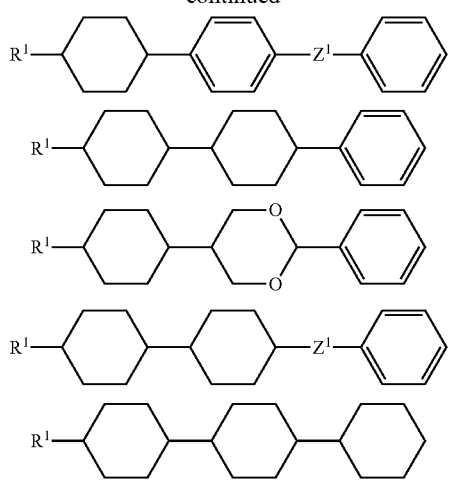

in which the substituents are defined as above and below, the rings are optionally substituted by a group L and the right-hand ring corresponding to a ring $A^2$ in the formulae I and I-1 to I-5 is substituted by one or two groups $R^2$.

Preference is accordingly given to structures selected from the formulae:

I-1-1
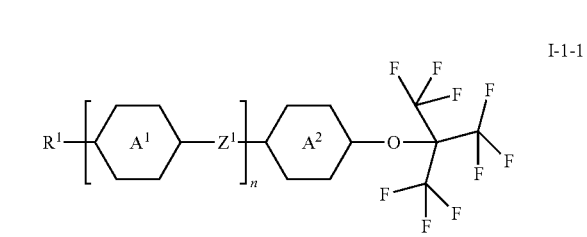

I-1-2
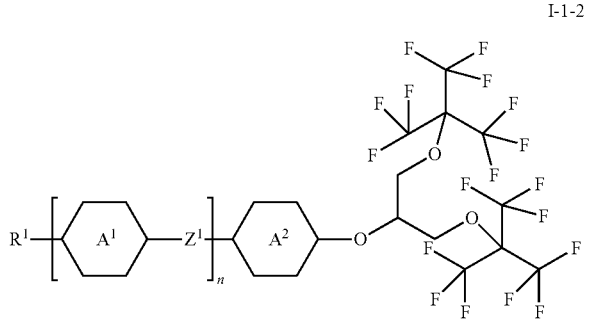

I-1-3
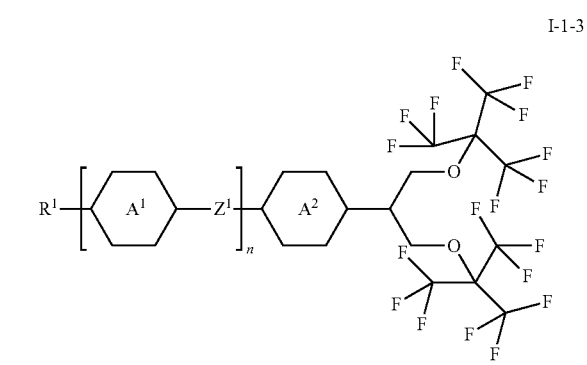

I-2-1
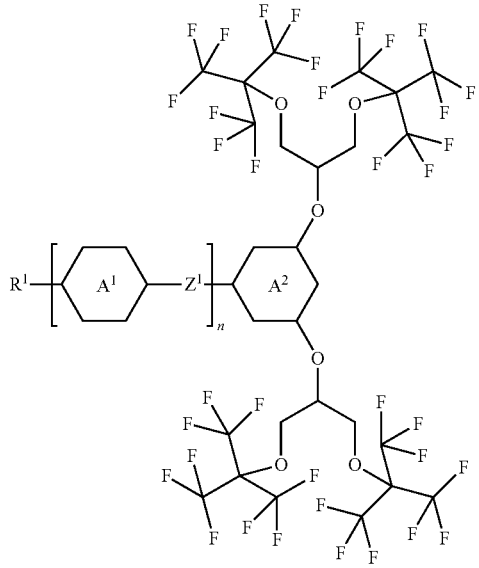

I-3-1
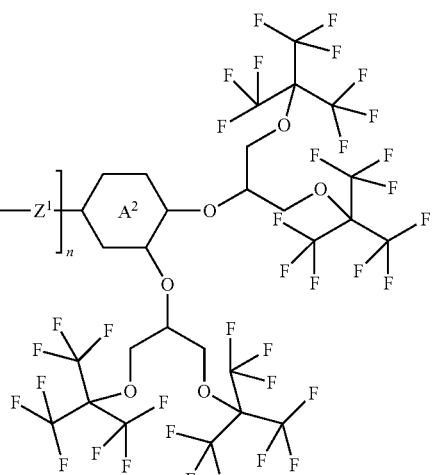

in which the variables are defined as above and below.

The group $R^1$ in formula I and sub-formulae thereof preferably denotes an alkyl radical having 1 to 15 C atoms, in particular an alkyl radical having 2 to 6 C atoms. It is preferably an n-alkyl group.

The compounds according to the invention are very readily soluble in the usual liquid-crystalline media for display devices. The compounds improve the wetting with liquid-crystalline media on substrates and the flow properties on surfaces. They effect, inter alia, a reduced surface tension, a reduced contact angle of a medium with a substrate and excellent spreading of droplets on surfaces. They are therefore good spreading agents or wetting agents, in particular for liquid-crystalline media. Suitable substrates are surfaces of glass, ITO (indium tin oxide), polyimide layers (alignment coatings) or diverse plastics. With the compounds according to the invention as additives, stable nematic phases can readily be produced in a broad temperature range.

Besides the excellent properties as liquid-crystalline component, the compounds according to the invention are distinguished by very little influence on the already optimised physical properties of the medium, such as VHR ("voltage holding ratio"), long-term stability (reliability), low-temperature stability, response times, etc.

Halogen in connection with the present invention denotes fluorine, chlorine, bromine or iodine, particular fluorine or chlorine and very particularly fluorine.

Particular preference is given in accordance with the invention to compounds of formula I selected from the following sub-formulae:

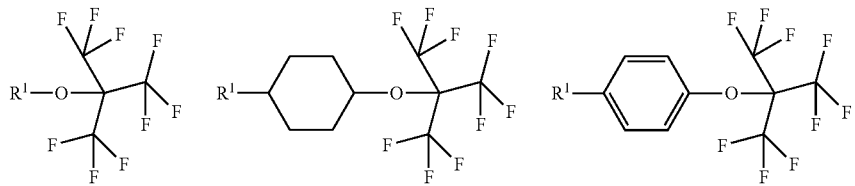

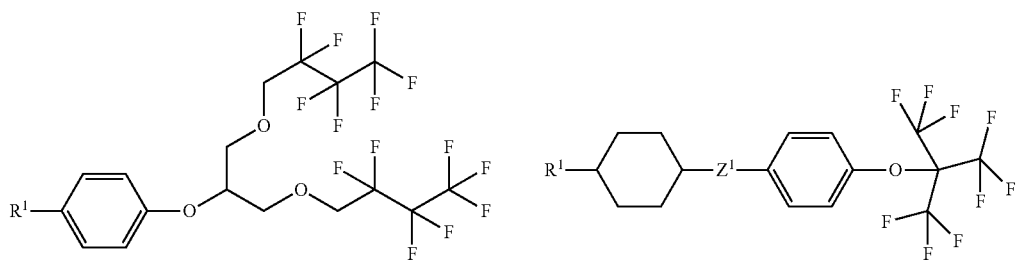

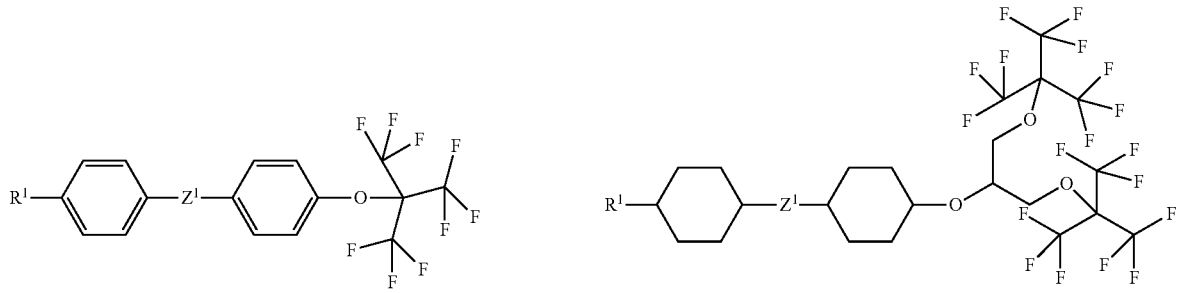

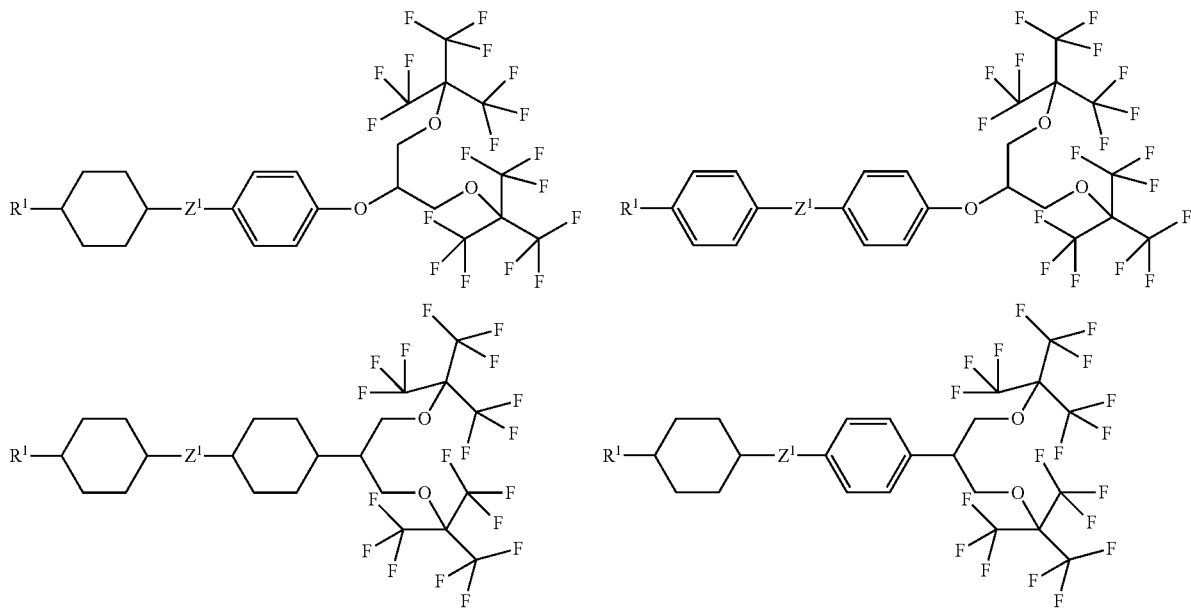

-continued
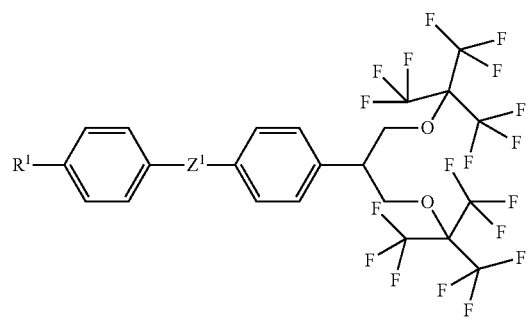
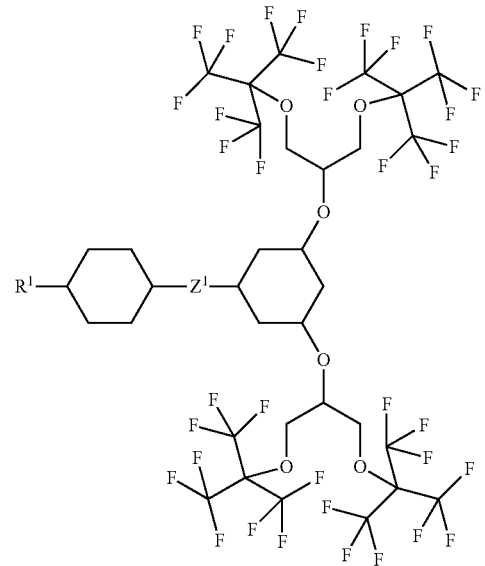
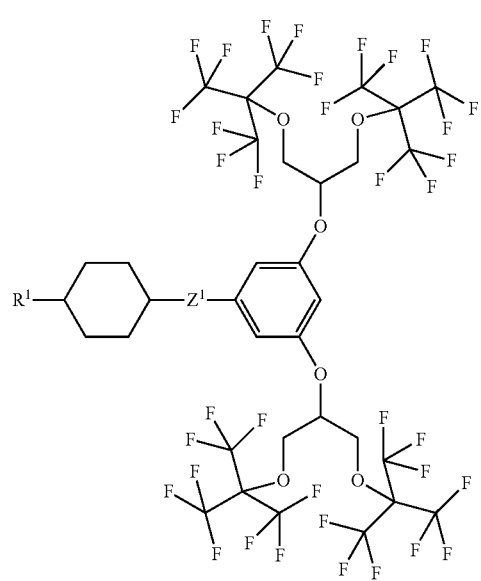
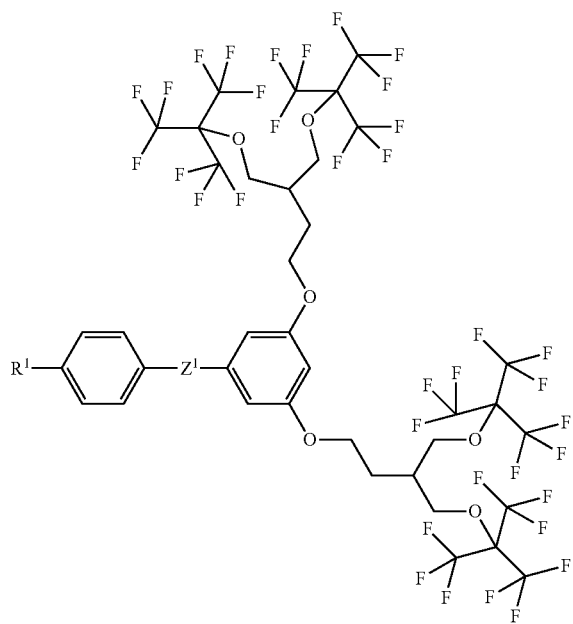

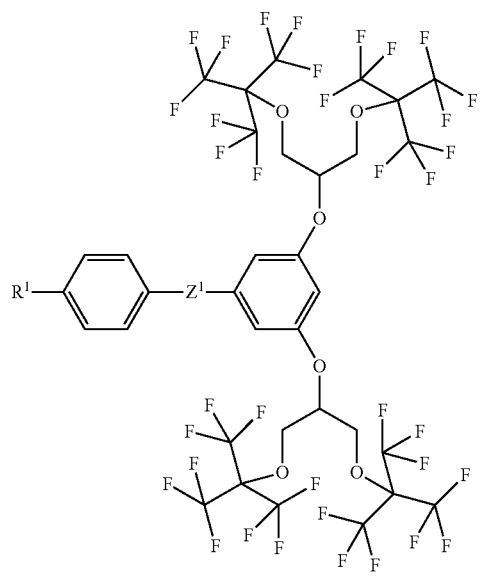
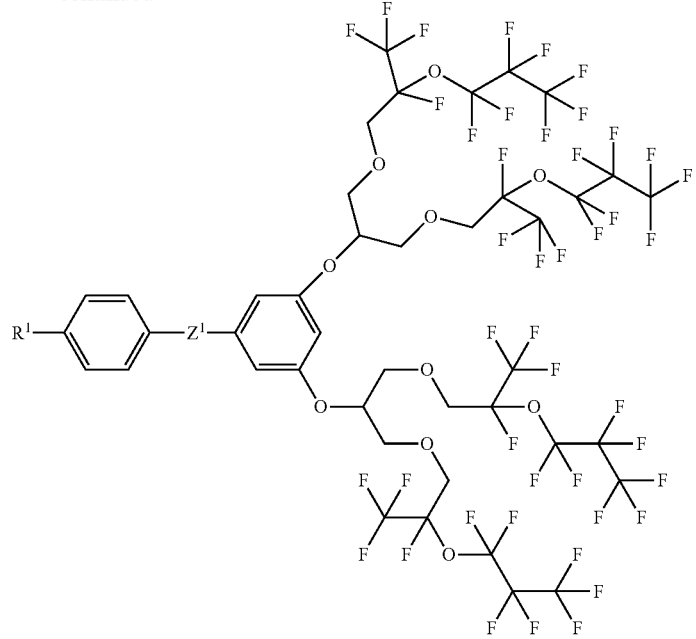
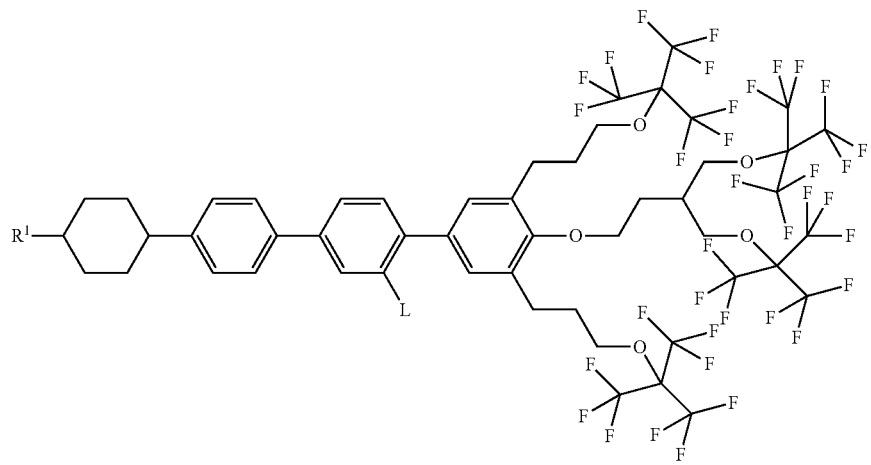

in which the parameters have the respective meaning given above under formula I, and independently preferably $R^1$ independently denotes an alkyl group having 1 to 20 C atoms, where, in addition, in each case one or more $CH_2$ groups, in each case independently of one another, may be replaced by —CH=CH— or —C≡C—, and $Z^1$ denotes a single bond.

Particular preference is given, for example, to the following specific individual compounds:

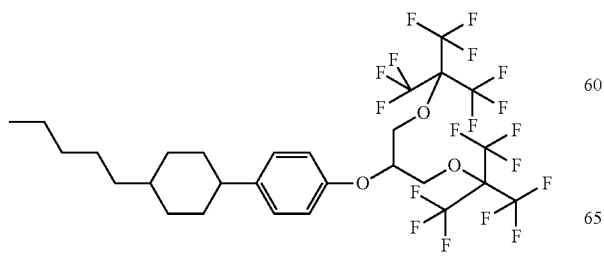

-continued

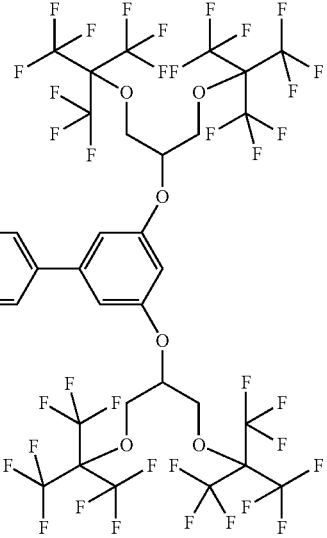

-continued

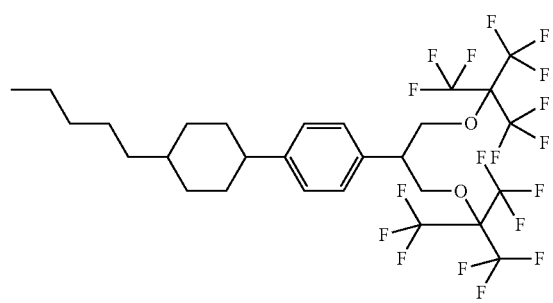

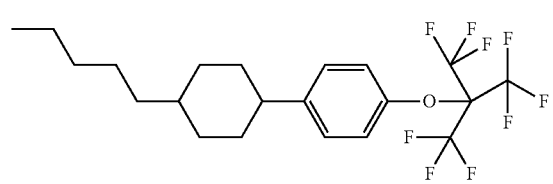

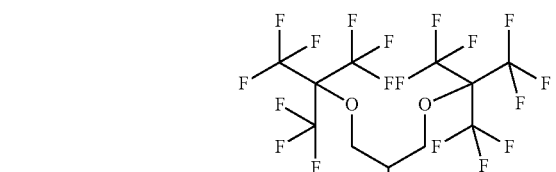

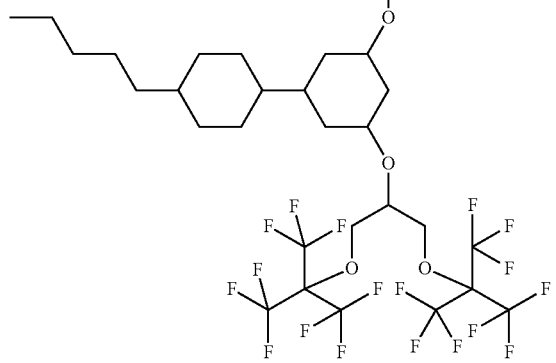

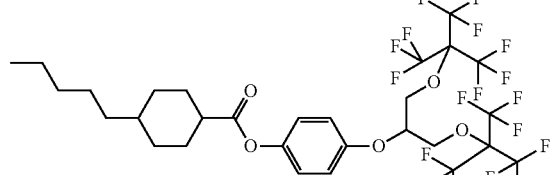

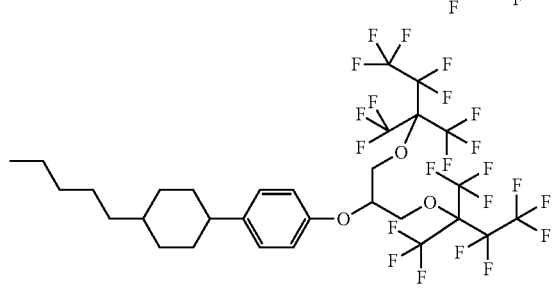

-continued

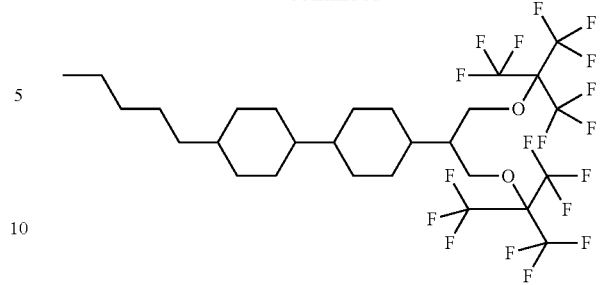

In accordance with the present invention, the compounds of the formula I are used in a total concentration of 0.001% to 2%, more preferably of 0.005% or more to 0.1% or less, particularly preferably of 0.01% or more to 0.025% or less.

The present invention preferably relates to a liquid-crystalline medium having at least two liquid-crystalline compounds, comprising at least one compound of the formula I.

The liquid-crystalline medium is preferably polar, i.e. it has positive or negative dielectric anisotropy.

The liquid-crystalline medium preferably additionally comprises a proportion of polymerisable compounds, preferably selected from the compounds in Table G.

As a preferred embodiment, a medium having negative dielectric anisotropy is described below which comprises a) one or more compounds of the formula I and b) one or more compounds of the formula II

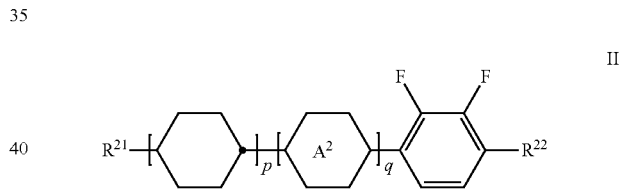

in which

R$^{21}$ denotes an unsubstituted alkyl radical having 1 to 7 C atoms, an unsubstituted alkoxy radical having 1 to 6 C atoms or an unsubstituted alkenyl radical having 2 to 7 C atoms, R$^{22}$ denotes an unsubstituted alkyl radical having 1 to 7 C atoms or an unsubstituted alkoxy radical having 1 to 6 C atoms,

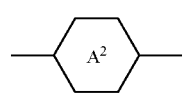

denotes

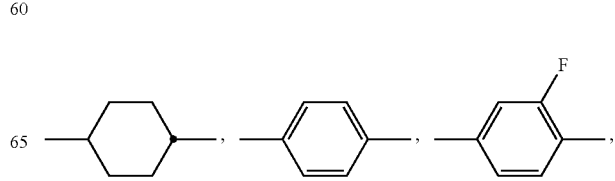

-continued

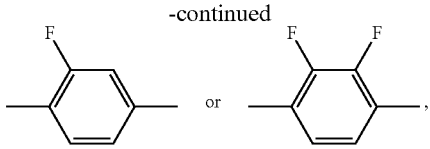

p and q each, independently of one another, denote 0, 1 or 2 and (p+q) denotes 1, 2 or 3, c) optionally one or more compounds of the formula III

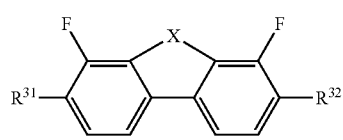
III in which

X denotes O or S, preferably O, and $R^{31}$, $R^{32}$, independently of one another, denote an unsubstituted alkyl radical having 1 to 7 C atoms, preferably an n-alkyl radical, particularly preferably having 2 to 5 C atoms, or an unsubstituted alkoxy radical having 2 to 7 C atoms, particularly preferably having 2 to 5 C atoms, where preferably at least one of the radicals $R^{31}$ and $R^{32}$ denotes alkoxy, and d) optionally, preferably obligatorily, one or more compounds selected from the group of the compounds of the formulae IV and V, preferably of the formula IV,

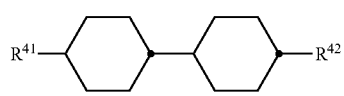
IV

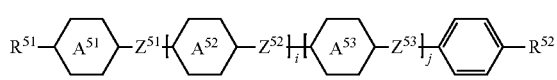
V in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical, $R^{51}$ and $R^{52}$, independently of one another, have one of the meanings given for $R^{21}$ and $R^{22}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

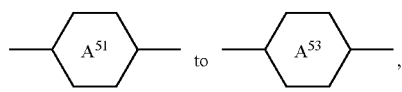

if present, in each case independently of one another, denote

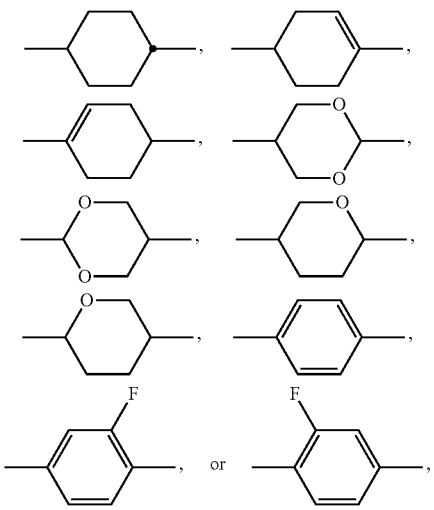

preferably

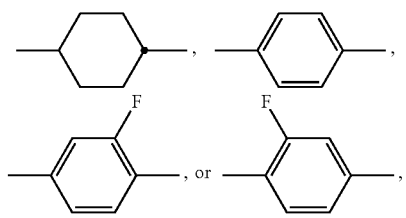

preferably

denotes

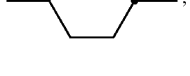

and, if present,

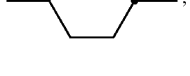

preferably denotes

$Z^{51}$ to $Z^{53}$ each, independently of one another, denote —CH$_2$—CH$_2$—, —CH$_2$—O—, —CH=CH—, —C≡C—, —COO— or a single bond, preferably —CH$_2$—CH$_2$—, —CH$_2$—O— or a single bond and particularly preferably a single bond, i and j each, independently of one another, denote 0 or 1, (i+j) preferably denotes 0 or 1.

The liquid-crystalline media according to the invention preferably comprise one or more compounds of the formula II selected from the group of the formulae II-1 to II-3, preferably of the formula II-3,

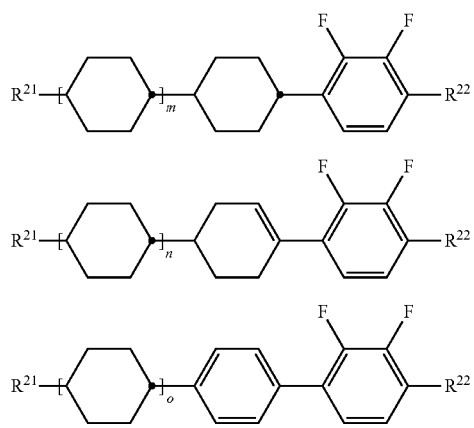

in which
  $R^{21}$ denotes an unsubstituted alkyl radical having 1 to 7 C atoms, preferably an n-alkyl radical, particularly preferably having 2 to 5 C atoms, or
    an unsubstituted alkenyl radical having 2 to 7 C atoms, preferably a straight-chain alkenyl radical, particularly preferably having 2 to 5 C atoms,
  $R^{22}$ denotes an unsubstituted alkyl radical having 1 to 7 C atoms, preferably having 2 to 5 C atoms, or an unsubstituted alkoxy radical having 1 to 6 C atoms, preferably having 2, 3 or 4 C atoms, and
  m, n and o each, independently of one another, denote 0 or 1.

The medium according to the invention preferably comprises one or more compounds selected from the group of the formulae II-1 to II-4 in a total concentration in the range from 10% or more to 80% or less, preferably from 15% or more to 70% or less, particularly preferably from 20% or more to 60% or less.

In a further preferred embodiment, the medium according to the invention, in addition to the compounds selected from the group of the formulae II-1 to II-4, comprises one or more compounds of the formula III-1 in a total concentration in the range from 1% or more to 20% or less, preferably from 2% or more to 15% or less, particularly preferably from 3% or more to 10% or less.

The media in accordance with the present invention, in addition to the compounds of the formula I, or preferred sub-formulae thereof, preferably comprise one or more dielectrically neutral compounds of the formula IV in a total concentration in the range from 5% or more to 90% or less, preferably from 10% or more to 80% or less, particularly preferably from 20% or more to 70% or less.

In a preferred embodiment of the present invention, the media according to the invention comprise one or more compounds of the formula II-1, preferably one or more compounds selected from the group of the compounds of the formulae II-1-1 and II-1-2

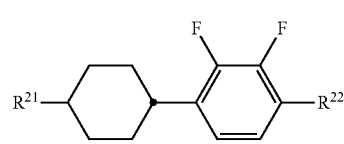

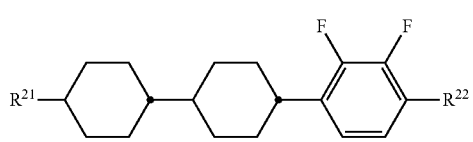

in which the parameters have the meaning given above in the case of formula II-1 and preferably $R^{21}$ denotes an alkyl radical having 2 to 5 C atoms, preferably having 3 to 5 C atoms, and $R^{22}$ denotes an alkyl or alkoxy radical having 2 to 5 C atoms, preferably an alkoxy radical having 2 to 4 C atoms, or an alkenyloxy radical having 2 to 4 C atoms.

In a preferred embodiment of the present invention, the media according to the invention comprise one or more compounds of the formula II-2, preferably one or more compounds selected from the group of the compounds of the formulae II-2-1 and II-2-2

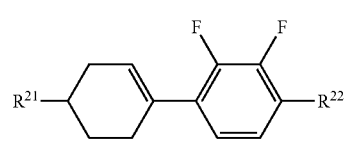

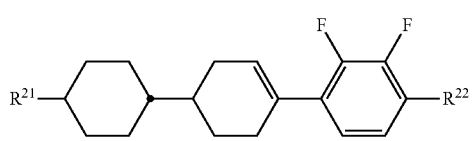

in which the parameters have the meaning given above in the case of formula II-2 and preferably $R^{21}$ denotes an alkyl radical having 2 to 5 C atoms, preferably having 3 to 5 C atoms, and $R^{22}$ denotes an alkyl or alkoxy radical having 2 to 5 C atoms, preferably an alkoxy radical having 2 to 4 C atoms or an alkenyloxy radical having 2 to 4 C atoms.

In a particularly preferred embodiment of the present invention, the media according to the invention comprise one or more compounds of the formula II-3, preferably one or more compounds selected from the group of the compounds of the formulae II-3-1 and II-3-2, very particularly preferably of the formula II-3-2,

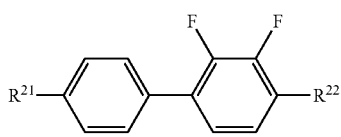

II-3-1

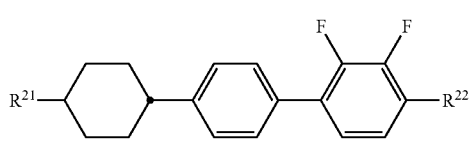

II-3-2 in which the parameters have the meaning given above in the case of formula II-3 and preferably $R^{21}$ denotes an alkyl radical having 2 to 5 C atoms, preferably having 3 to 5 C atoms, and $R^{22}$ denotes an alkyl or alkoxy radical having 2 to 5 C atoms, preferably an alkoxy radical having 2 to 4 C atoms or an alkenyloxy radical having 2 to 4 C atoms.

In a further preferred embodiment, the medium comprises one or more compounds of the formulae III-1 bis III-3

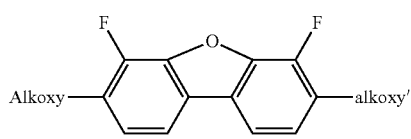

III-1

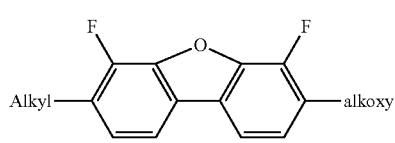

III-2

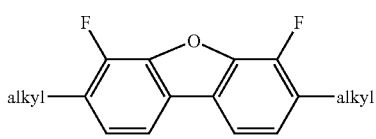

III-3 in which alkyl, alkyl' denote alkyl having 1 to 7 C atoms, preferably having 2-5 C atoms, alkoxy, alkoxy' denote alkoxy having 1 to 7 C atoms, preferably having 2 to 5 C atoms.

The medium particularly preferably comprises one or more compounds of the formula III-1.

In a further preferred embodiment, the medium comprises one or more compounds of the formula IV

IV in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

In a particularly preferred embodiment, the medium comprises one or more compounds of the formula IV, selected from the group of the compounds of the formulae IV-1 to IV-4, preferably selected from the group of the compounds of the formulae IV-1 and IV-2,

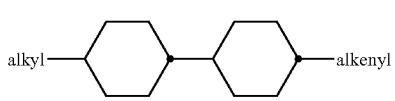

IV-1

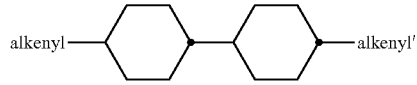

IV-2

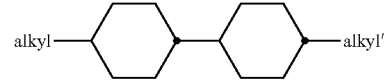

IV-3

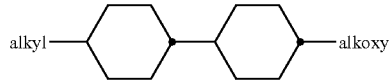

IV-4 in which alkyl and alkyl', independently of one another, denote alkyl having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

In a particularly preferred embodiment, the media according to the invention comprise one or more compounds of the formula IV-1 and/or one or more compounds of the formula IV-2.

In a further preferred embodiment, the medium comprises one or more compounds of the formula V

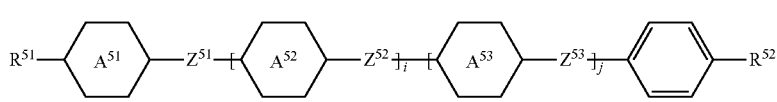
V in which $R^{51}$ and $R^{52}$, independently of one another, have one of the meanings given for $R^{21}$ and $R^{22}$ and preferably denotes alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

if present, in each case independently of one another, denote

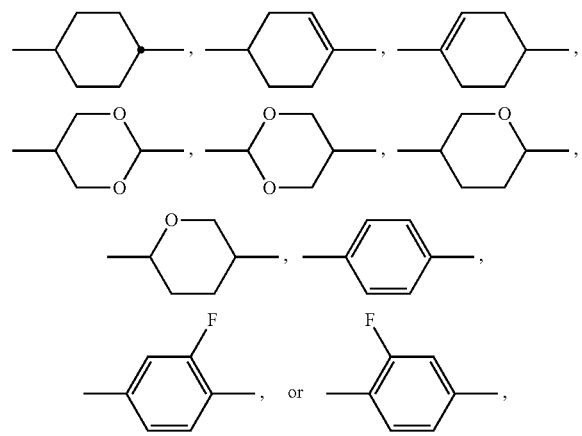

preferably

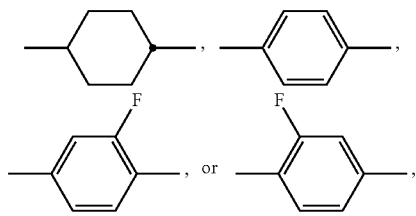

preferably

denotes

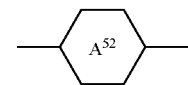

and, if present,

preferably denotes

$Z^{51}$ to $Z^{53}$ each, independently of one another, denote —$CH_2$—$CH_2$—, —$CH_2$—O—, —CH=CH—, —C≡C—, —COO— or a single bond, preferably —$CH_2$—$CH_2$—, —$CH_2$—O— or a single bond and particularly preferably a single bond, i and j each, independently of one another, denote 0 or 1, (i+j) preferably denotes 0 or 1.

The media according to the invention preferably comprise the following compounds in the total concentrations indicated:

5-60% by weight of one or more compounds selected from the group of the compounds of the formula II and/or 5-60% by weight of one or more compounds selected from the group of the compounds of the formula II and III and/or 10-60% by weight of one or more compounds selected from the group of the compounds of the formulae II-1 to II-3 and/or 10-60% by weight of one or more compounds of the formulae IV and/or V, where the total content of all compounds in the medium is 100%.

As a preferred embodiment, a medium having positive dielectric anisotropy is described below which comprises
a) one or more compounds of the formula I,
b) one or more compounds of the formulae VI and VII:

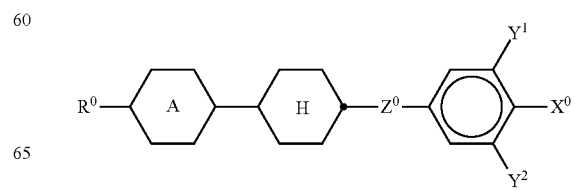

-continued

VII

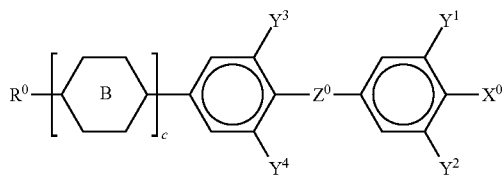

in which
R⁰ denotes an alkyl or alkoxy radical having 1 to 15 C atoms, in which optionally, in addition, one or more CH₂ groups in these radicals are substituted, independently of one another, by —C≡C—, —CF₂O—, —CH=CH—,

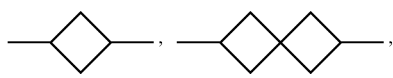

—O—, —(CO)O— or —O(CO)— in such a way that O atoms are not linked directly to one another, and in which, in addition, one or more H atoms may optionally be replaced by halogen, ring A denotes

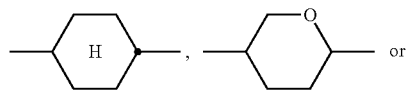 or

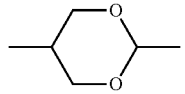

ring B, independently of one another, denotes 1,4-phenylene, optionally substituted by one or two F or Cl,

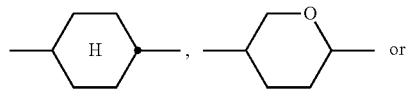 or

,

X⁰ denotes F, Cl, CN, SF₅, SCN, NCS, a halogenated alkyl group, a halogenated alkenyl group, a halogenated alkoxy group or a halogenated alkenyloxy group, in each case having up to 6 C atoms, Y$^{1-4}$ each, independently of one another, denote H or F, Z⁰ denotes —CF₂O—, —(CO)O— or a single bond, and c denotes 0, 1 or 2, preferably 1 or 2, and c) optionally, preferably obligatorily, one or more compounds selected from the group of the compounds of the formulae IV and V, preferably of the formula IV.

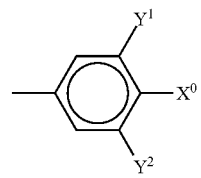

preferably denotes

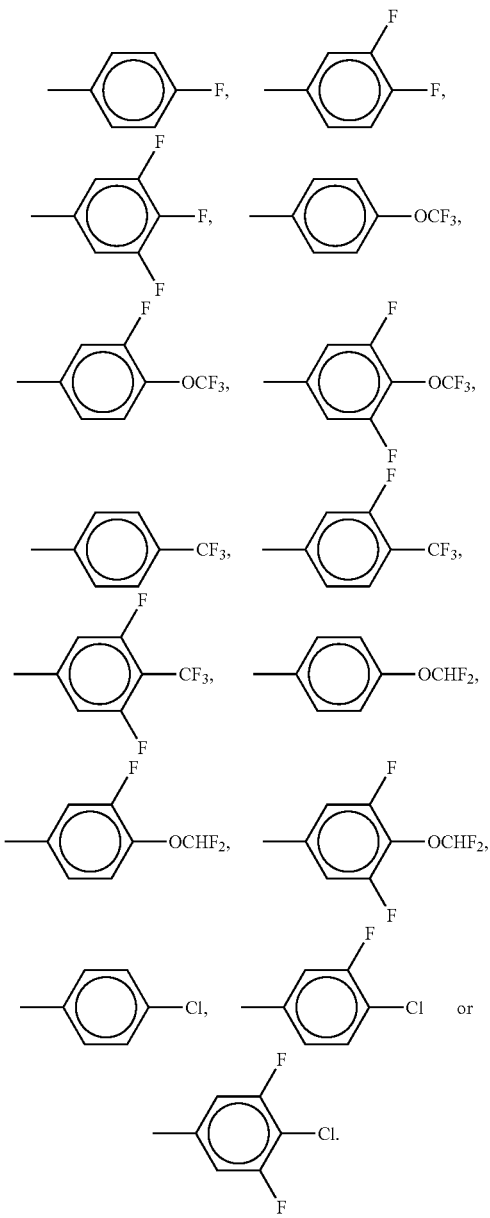

R⁰ preferably denotes straight-chain alkyl or alkenyl having 2 to 7 C atoms;

X⁰ preferably denotes F, OCF₃, Cl or CF₃, in particular F.

In a further embodiment, preference is given to media having positive or negative dielectric anisotropy which comprise both dielectrically negative compounds selected from the formulae II and III and additionally dielectrically positive compounds selected from the formulae VI and VII. Dielectrically neutral compounds are likewise optionally present therein.

Very generally, combinations of the preferred embodiments of the invention indicated above and below and the examples are also to be regarded as particularly preferred, so long as they can formally be combined with one another. Further embodiments are revealed by the claims and combinations thereof.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se which are not mentioned here in greater detail. The compounds of the formula I can advantageously be prepared as can be seen from the following illustrative syntheses (Scheme 1).

A typical preparation process for a series of the compounds according to the invention includes a process step in which a polyfluorinated alcohol (for example $C(CF_3)_3OH$) is etherified using a further OH-functionalised compound having one or more ring systems (Scheme 1). The condensation is preferably carried out under Mitsunobu conditions. It is therefore preferably carried out in the presence of triphenylphosphine and an azodicarboxylate (for example DIAD, DEAD), preferably with diisopropyl azodicarboxylate. The reaction is typically carried out in THF at 20-50° C.

Scheme 1. Illustrative preparation of compounds of the formula I or IA by means of ether formation from polyfluorinated alcohols.

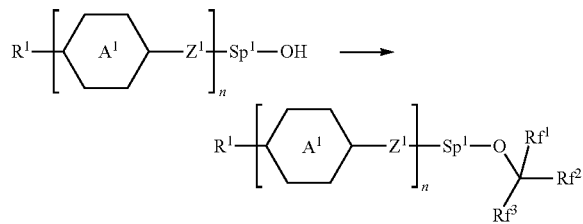

$R^2$ in each case independently denotes

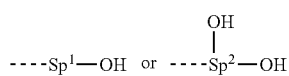

is prepared by etherification in the presence of a fluorinated alcohol of the formula

A typical preparation process for another series of the compounds according to invention includes a process step in which a polyfluorinated alkene (for example $F_2C=C(CF_3)_2$) is linked to a halogenated (electrophilic) compound by means of a C—C bond (Scheme 2).

Scheme 2. Illustrative preparation of compounds of the formula I or IA by means of C—C linking from perfluorinated nucleophiles.

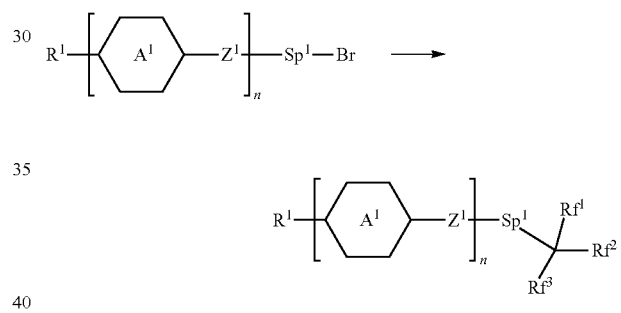

As illustrative reaction, a reaction in accordance with Scheme 3 is shown in which a perfluoroalkene is activated by means of caesium fluoride to give a carbanion and linked to a benzoyl bromide (cf., for example, K. N. Makarov et al. Journal of Fluorine Chemistry, 10 (1977) 157-158).

Scheme 3. Illustrative synthesis of additives without ether bonding.

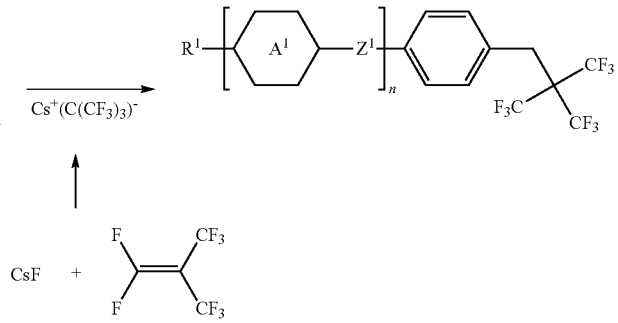

The invention accordingly relates to a process for the preparation of compounds according to the invention which is characterised in that a compound of the formula I in which Suitable polyfluorinated starting materials (alcohols, alkenes) are commercially available. Alcohols of the structure $R^1$-$[A^1$-$Z^1]_n$-$Sp^1$-OH or $R^1$-$[A^1$-$Z^1]_n$-$Sp^1$-$(OH)_2$ shown in Scheme 1 as starting material are known from the literature or can be obtained analogously thereto, as can the analogous halide compounds in accordance with Scheme 2.

The substituents of the compounds in Scheme 1 can be varied analogously to the general formula I by varying the building blocks employed. In this way, very different compounds according to invention are obtained.

The compounds of the formula I are suitable for use in VA-TFT display systems (such as, for example, ECB, VAN, MVA, (S)-PVA and ASV), for TN-TFT, FFS (fringe field switching), PALC, STN or IPS display systems. The person skilled in the art is familiar with further display types in which compounds according to the invention can be employed in liquid-crystal media having correspondingly suitable dielectric properties.

The present invention also relates to electro-optical displays or electro-optical components which contain liquid-crystalline media according to the invention. Preference is given to electro-optical displays which are based on the VA or ECB effect and in particular those which are addressed by means of an active-matrix addressing device.

Accordingly, the present invention likewise relates to the use of a liquid-crystalline medium according to the invention in an electro-optical display or in an electro-optical component.

The invention likewise relates to a process for the preparation of a liquid-crystalline medium as described above and below, which is characterised in that one or more compounds of the formula I are mixed with one or more further liquid-crystalline compounds, and further compounds and additives are optionally added. Preference is given to a process for the preparation of the liquid-crystalline media according to the invention, characterised in that one or more compounds of the formula I are mixed with one or more compounds of the formula II, preferably with one or more compounds of the sub-formulae II-1 and/or II-2 and/or II-3 and/or II-4, and with one or more further compounds and/or additives.

In the present application, the term "compounds", also written as "compound(s)", denotes one or more compounds, unless explicitly indicated otherwise.

In the present application:
alkyl particularly preferably denotes straight-chain alkyl, in particular $CH_3$—, $C_2H_5$—, $n\text{-}C_3H_7$—, $n\text{-}C_4H_9$— or $n\text{-}C_5H_{11}$—,
alkenyl particularly preferably denotes $CH_2$=CH—, E-$CH_3$—CH=CH—, $CH_2$=CH—$CH_2$—$CH_2$—, E-$CH_3$—CH=CH—$CH_2$—$CH_2$— or E-$(n\text{-}C_3H_7)$—CH=CH—,
alkoxy particularly preferably denotes straight-chain alkoxy, in particular $CH_3O$—, $C_2H_5O$—, $n\text{-}C_3H_7O$—, $n\text{-}C_4H_9O$— or $n\text{-}C_5H_{11}O$—.

For the present invention, the sub-formulae

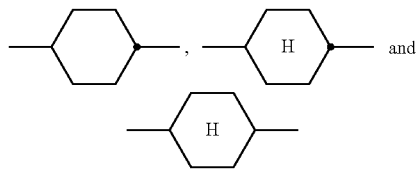

denote trans-1,4-cyclohexylene and the sub-formulae

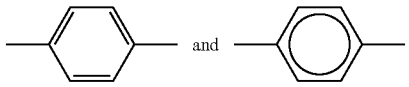

denote 1,4-phenylene.

In the present application, the expression dielectrically positive describes compounds or components where $\Delta\varepsilon>3.0$, dielectrically neutral describes compounds or components where $-1.5\leq\Delta\varepsilon\leq3.0$ and dielectrically negative describes compounds or components where $\Delta\varepsilon<-1.5$. $\Delta\varepsilon$ is determined at a frequency of 1 kHz and 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and also in a cell having homogeneous alignment. The cell thickness in both cell types is about 20 μm. The applied voltage is a rectangular wave having a frequency of 1 kHz and an effective value of typically 0.5 V to 1.0 V, but is always selected so that it is below the capacitive threshold for the respective test mixture.

$\Delta\varepsilon$ is defined as $(\varepsilon_\parallel-\varepsilon_\perp)$, while $\varepsilon_{ave.}$ is $(\varepsilon_\parallel+2\varepsilon_\perp)/3$.

The host mixture used for dielectrically positive compounds is mixture ZLI-4792 and the host mixture used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components which have a nematic phase at the measurement temperature of 20° C. are measured as such, all others are treated like compounds.

The expression threshold voltage in the present application denotes the optical threshold and is indicated for 10% relative contrast ($V_{10}$), the expression saturation voltage denotes the optical saturation and is indicated for 90% relative contrast ($V_{90}$), in both cases unless expressly indicated otherwise. The capacitive threshold voltage ($V_0$), also called the Freedericks threshold $V_{Fr}$, is only used if this is expressly stated.

The parameter ranges indicated in this application all include the limit values, unless expressly indicated otherwise.

The different upper and lower limit values indicated for various ranges of properties give rise in combination with one another to additional preferred ranges.

Throughout the application, unless indicated otherwise, the following conditions and definitions apply. All concentrations are indicated in percent by weight and in each case relate to the entire mixture, all temperatures and all temperature differences are indicated in degrees Celsius or differential degrees. All physical properties are determined in accordance with "Merck Liquid Crystals, Physical Properties of Liquid Crystals", status November 1997, Merck KGaA, Germany, and are quoted for a temperature of 20° C., unless indicated otherwise. The optical anisotropy (Δn) is determined at a wavelength of 589.3 nm. The dielectric anisotropy (Δε) is determined at a frequency of 1 kHz. The threshold voltages and all other electro-optical properties are determined in test cells made at Merck. The test cells for the determination of Δε have a cell thickness of about 20 μm. The electrode is a circular ITO electrode having an area of 1.13 cm² and a protective ring. The alignment layers are SE-1211 from Nissan Chemicals, Japan, for homeotropic alignment ($\varepsilon_\parallel$) and polyimide AL-1054 from Japan Synthetic Rubber, Japan, for homogeneous alignment ($\varepsilon_\perp$). The capacitances are determined with a Solatron 1260 frequency response analyser using a sinus wave with a voltage of 0.3 $V_{rms}$. The light used in the electro-optical measurements is white light. A set-up with a commercially available DMS instrument from Autronic-Melchers, Germany, is used. The characteristic voltages are determined with perpendicular observation. The threshold voltage ($V_{10}$), "mid-grey voltage" ($V_{50}$) and saturation voltage ($V_{90}$) are determined for 10%, 50% and 90% relative contrast.

The liquid-crystal media in accordance with the present invention may comprise further additives and chiral dopants in the usual concentrations. The total concentration of these further constituents is in the range from 0% to 10%, preferably 0.1% to 6%, based on the entire mixture. The concentrations of the individual compounds used are preferably in each case in the range from 0.1% to 3%. The concentration of these and similar additives is not taken into account when quoting the values and concentration ranges of the liquid-crystal components and compounds in the liquid-crystal media in this application.

The liquid-crystal media according to the invention consist of a plurality of compounds, preferably of 3 to 30, more preferably of 4 to 20 and very preferably of 4 to 16 compounds. These compounds are mixed in the usual manner. In general, the desired amount of the compound used in the lesser amount is dissolved in the compound used in the greater amount. If the temperature is above the clearing point of the compound used in the higher concentration, the completeness of the dissolution operation is particularly easy to see. However, it is also possible to prepare the media by other conventional routes, for example using so-called premixes, which are, for example, homologous or eutectic mixtures of compounds, or using so-called "multi-bottle" systems, whose constituents are themselves ready-to-use mixtures.

By addition of suitable additives, the liquid-crystal media in accordance with the present invention can be modified in such a way that they can be used in all known types of liquid-crystal displays, either through use of the liquid-crystal media as such, such as TN, TN-AMD, ECB-AMD, VAN-AMD, IPS-AMD, FFS-AMD LCDs, or in hybrid systems, such as PDLC, NCAP, PN LCDs and especially in ASM-PA LCDs.

All temperatures, such as, for example, the melting point T(C,N) or T(C,S), the transition from the smectic (S) to the nematic (N) phase T(S,N) and the clearing point T (N,I) of the liquid crystals are indicated in degrees Celsius. All temperature differences are indicated in differential degrees.

In the present invention and in particular in the following examples, the structures of the mesogenic compounds are indicated by means of abbreviations, which are also called acronyms. In these acronyms, the chemical formulae are abbreviated as follows using the following Tables A to C. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl respectively, preferably 1-E-alkenyl, in each case having n, m or l C atoms respectively. Table A shows the codes used for the ring elements of the core structures of the compounds, while Table B shows the linking groups. Table C shows the meanings of the codes for the end groups on the left-hand or right-hand side. The acronyms are composed of the codes for the ring elements with optional linking groups, followed by a first hyphen and the codes for the left-hand end group, and a second hyphen and the codes for the right-hand end group. Table D lists illustrative structures of compounds with their respective abbreviations.

TABLE A

| Ring elements | | | |
|---|---|---|---|
| C |  | P | 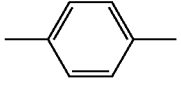 |
| D | 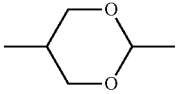 | DI | 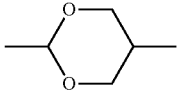 |
| A | 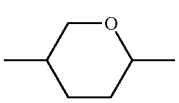 | AI | 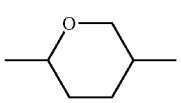 |
| G | 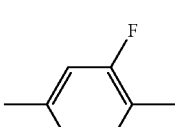 | GI | 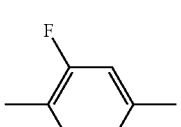 |
| U | 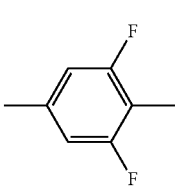 | UI | 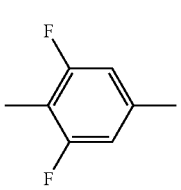 |

TABLE A-continued

| | Ring elements | | |
|---|---|---|---|
| M | (2,5-pyrimidine) | MI | (2,5-pyrimidine, alt.) |
| N | (2,5-pyridine) | NI | (2,5-pyridine, alt.) |
| Y | (difluorobenzene) | | |
| P(F,Cl)Y | (F,Cl-benzene) | P(Cl,F)Y | (Cl,F-benzene) |
| Np | (naphthalene) | dH | (decahydronaphthalene) |
| n3f | (trifluoronaphthalene) | nN3fI | (trifluoronaphthalene, alt.) |
| tH | (tetrahydronaphthalene) | tHI | (tetrahydronaphthalene, alt.) |
| tH2f | (difluorotetrahydronaphthalene) | tH2fI | (difluorotetrahydronaphthalene, alt.) |
| o2f | (difluorochromane) | o2fI | (difluorochromane, alt.) |
| dh | (decahydronaphthalene) | B | (difluorodibenzofuran) |
| K | (trifluoroindane) | KI | (trifluoroindane, alt.) |

TABLE A-continued

Ring elements

| | | | |
|---|---|---|---|
| L | (cyclohexene ring) | LI | (cyclohexene ring) |
| F | (fluoro cyclohexene) | FI | (fluoro cyclohexene) |
| Nf | (fluoro pyridine) | NfI | (fluoro pyridine) |

TABLE B

Bridging members

| | |
|---|---|
| E | —$CH_2$—$CH_2$— |
| V | —CH=CH— |
| T | —C≡C— |
| W | —$CF_2$—$CF_2$— |
| B | —CF=CF— |

TABLE B-continued

Bridging members

| | | | |
|---|---|---|---|
| Z | —CO—O— | ZI | —O—CO— |
| X | —CF=CH— | XI | —CH=CF— |
| O | —$CH_2$—O— | OI | —O—$CH_2$— |
| Q | —$CF_2$—O— | QI | —O—$CF_2$— |

TABLE C

End groups

| On the left individually or in combination | | On the right individually or in combination | |
|---|---|---|---|
| -n- | $C_nH_{2n+1}$— | -n | —$C_nH_{2n+1}$ |
| -nO- | $C_nH_{2n+1}$—O— | -nO | —O—$C_nH_{2n+1}$ |
| —V— | $CH_2$=CH— | —V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2O$— | —OM | —$OCFH_2$ |
| —DO— | $CF_2HO$— | —OD | —$OCF_2H$ |
| —TO— | $CF_3O$— | —OT | —$OCF_3$ |
| —A— | H—C≡C— | —A | —C≡C—H |
| —nA— | $C_nH_{2n+1}$—C≡C— | —An | —C≡C—$C_nH_{2n+1}$ |
| —NA— | N≡C—C≡C— | —AN | —C≡C—C≡N |
| | | —OXF | —O—CH=CF2 |

| On the left only in combination | | On the right only in combination | |
|---|---|---|---|
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— |
| | | -...X... | —CH=CF— | in which n and m are each integers and the three dots "..." are placeholders for other abbreviations from this table.

The following table shows illustrative structures together with their respective abbreviations. These are shown in order to demonstrate the meaning of the rules for the abbreviations. The mixtures according to the invention, besides the compounds of the formula I, preferably comprise one or more compounds of the compounds shown below.

The following abbreviations are used:
(n, m and z, independently of one another, each denote an integer, preferably 1 to 6).

TABLE D

Illustrative structures

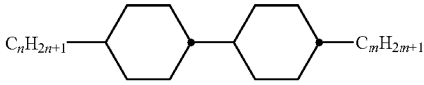

CC-n-m

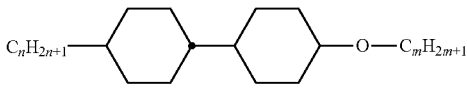

CC-n-Om

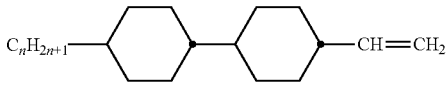

CC-n-V

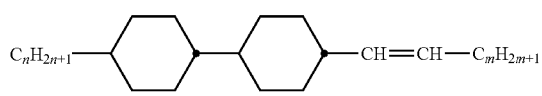

CC-n-Vm

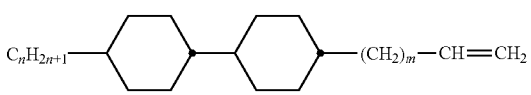

CC-n-mV

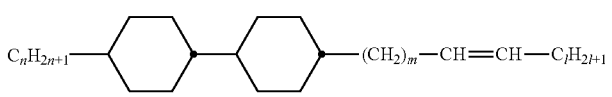

CC-n-mVl

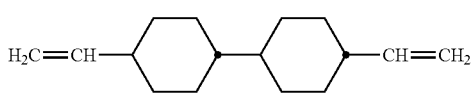

CC-V-V

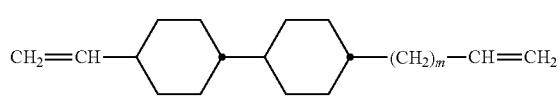

CC-V-mV

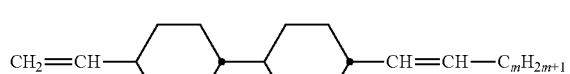

CC-V-Vm

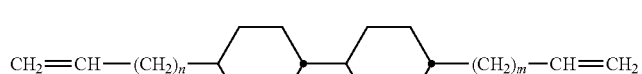

CC-Vn-mV

TABLE D-continued
Illustrative structures
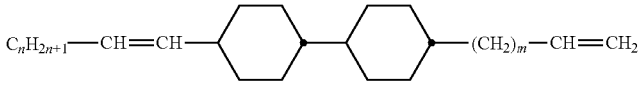
CC-nV-mV
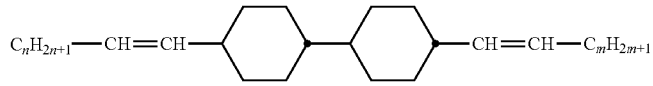
CC-nV-Vm
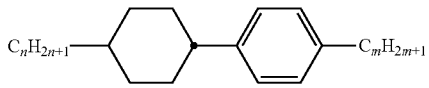
CP-n-m
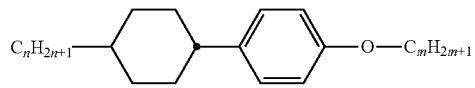
CP-n-Om
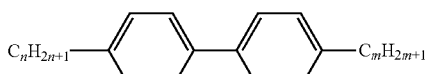
PP-n-m
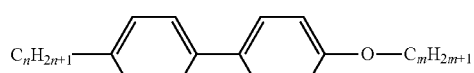
PP-n-Om
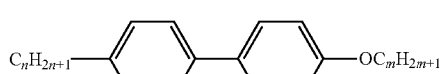
PP-n-Om
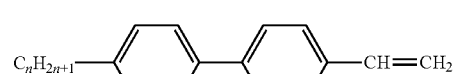
PP-n-V
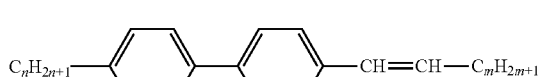
PP-n-Vm
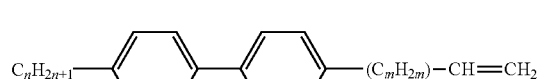
PP-n-mV
PP-n-mVl TABLE D-continued

| Illustrative structures |
|---|

$C_nH_{2n+1}$—⬡—⬡—⌬—$C_mH_{2m+1}$

CCP-n-m $C_nH_{2n+1}$—⬡—⬡—⌬—$OC_mH_{2m+1}$

CCP-n-Om $H_2C=CH$—⬡—⬡—⌬—$C_mH_{2m+1}$

CCP-V-m $C_nH_{2n+1}$—CH=CH—⬡—⬡—⌬—$C_mH_{2m+1}$

CCP-nV-m $CH_2=CH-(CH_2)_n$—⬡—⬡—⌬—$C_mH_{2m+1}$

CCP-Vn-m $C_nH_{2n+1}$—⬡—⬡—⌬—$(C_mH_{2m})$—$CH=CH_2$

CCP-n-mV $C_nH_{2n+1}$—CH=CH—$(CH_2)_m$—⬡—⬡—⌬—$C_lH_{2l+1}$

CCP-nVm-l $C_nH_{2n+1}$—⬡—⌬—⌬—$C_mH_{2m+1}$

CPP-n-m $C_nH_{2n+1}$—⬡—⌬(F)—⌬—$C_mH_{2m+1}$

CGP-n-m $C_nH_{2n+1}$—⬡—⌬—⌬(F)—$C_mH_{2m+1}$

CPG-n-m

TABLE D-continued
Illustrative structures
CPP-nO-m
CPP-n-Om
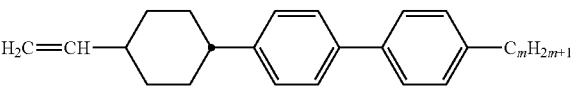
CPP-V-m
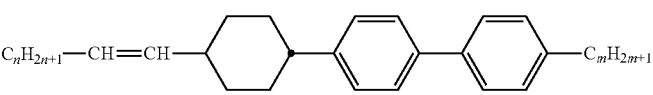
CPP-nV-m
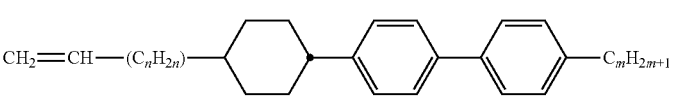
CPP-Vn-m
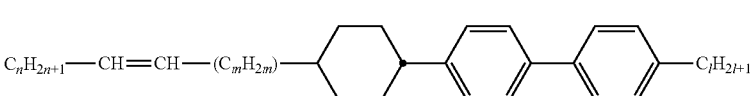
CPP-nVm-l
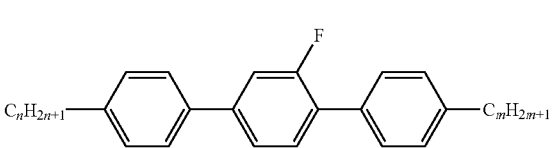
PGP-n-m
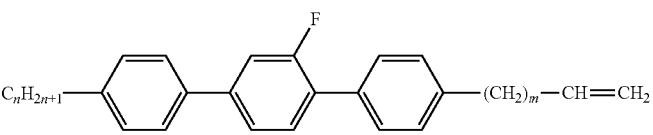
PGP-n-mV
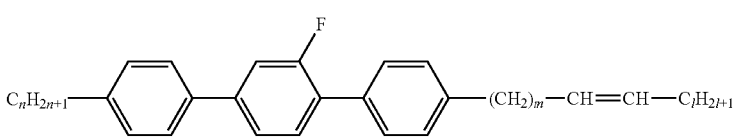
PGP-n-mVl
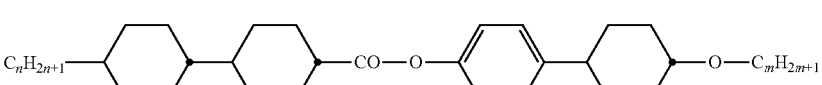
CCZPC-n-m TABLE D-continued
Illustrative structures
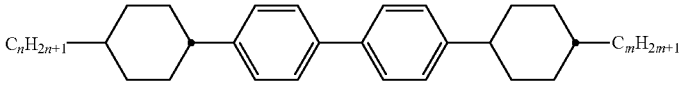
CPPC-n-m
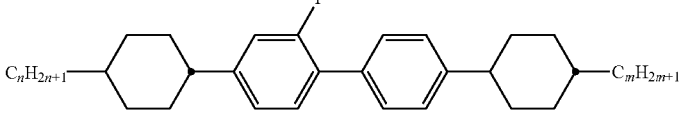
CGPC-n-m
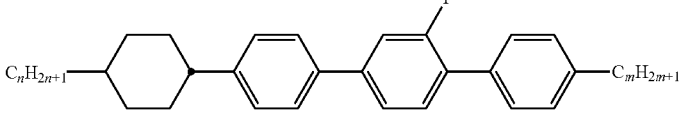
CPGP-n-m
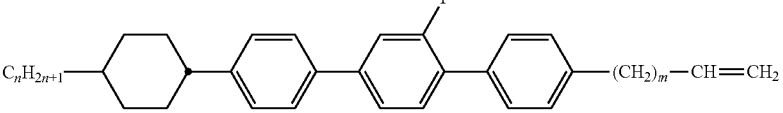
CPGP-n-mV
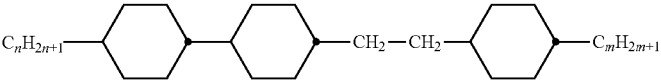
CCEC-n-m
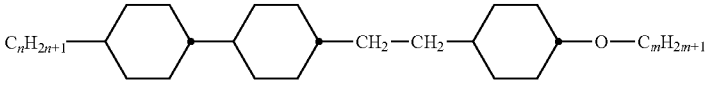
CCEC-n-Om
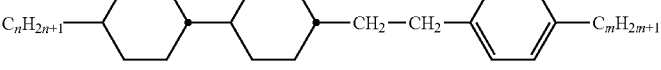
CCEP-n-m
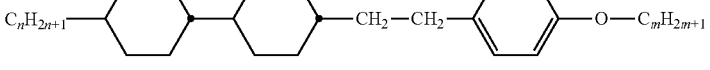
CCEP-n-Om
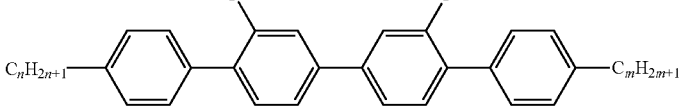
PGIGP-n-m TABLE D-continued
Illustrative structures
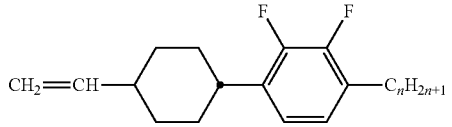
CY-V-n
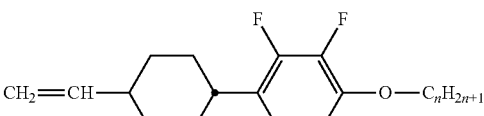
CY-V-On
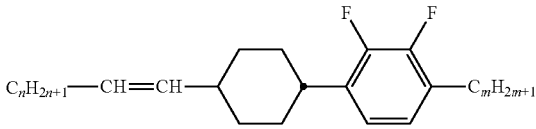
CY-nV-m
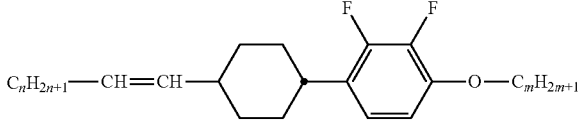
CY-nV-Om
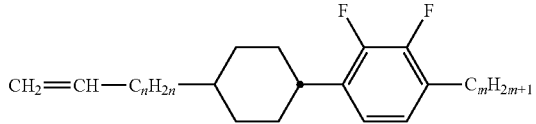
CY-Vn-m
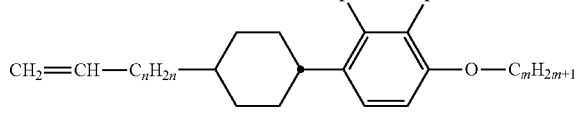
CY-Vn-Om
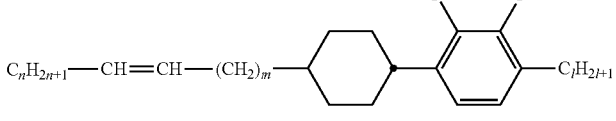
CY-nVm-l
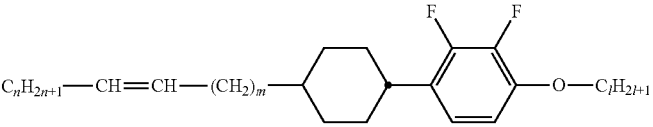
CY-nVm-Ol TABLE D-continued
Illustrative structures
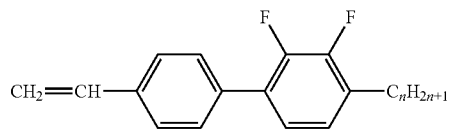
PY-V-n
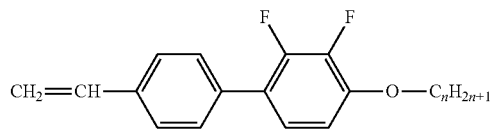
PY-V-On
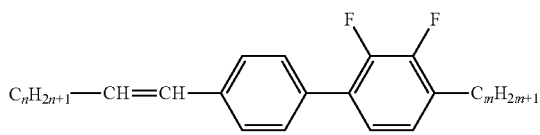
PY-nV-m
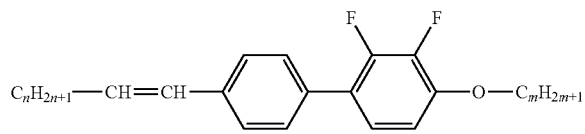
PY-nV-Om
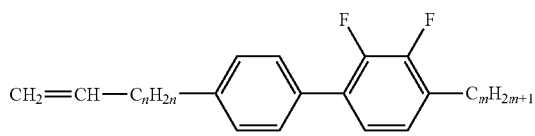
PY-Vn-m
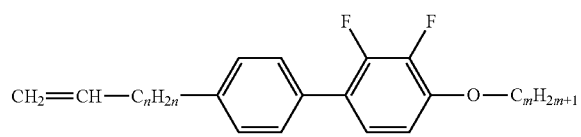
PY-Vn-Om
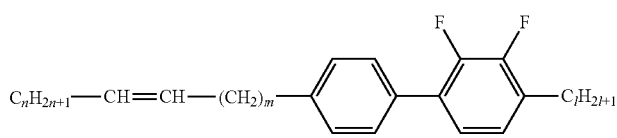
PY-nVm-l
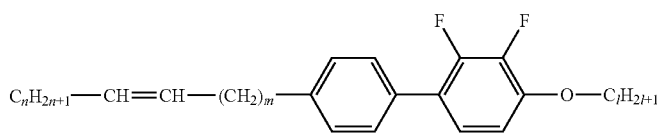
PY-nVm-Ol TABLE D-continued
Illustrative structures
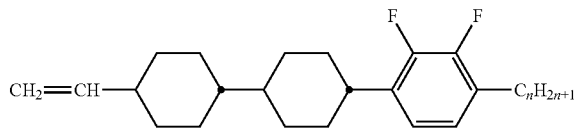
CCY-V-n
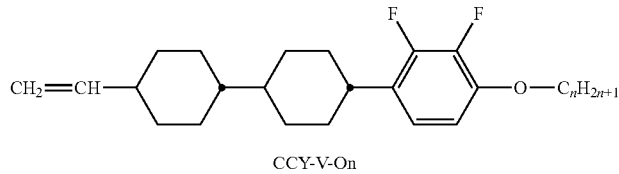
CCY-V-On
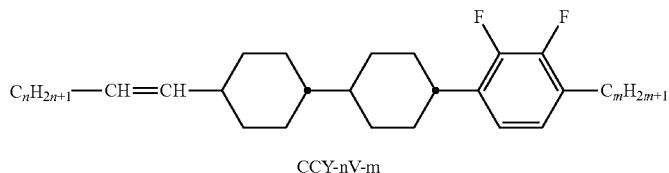
CCY-nV-m
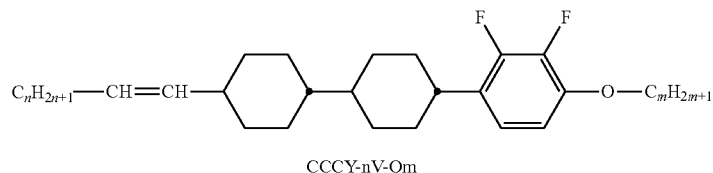
CCCY-nV-Om
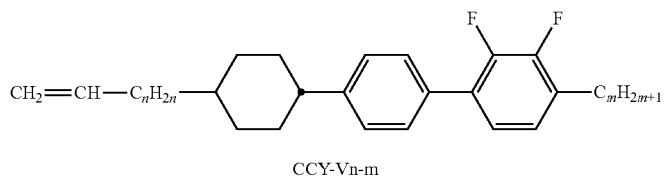
CCY-Vn-m
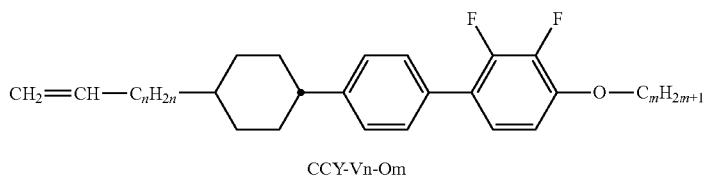
CCY-Vn-Om
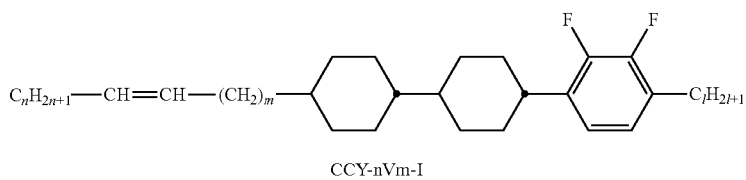
CCY-nVm-l
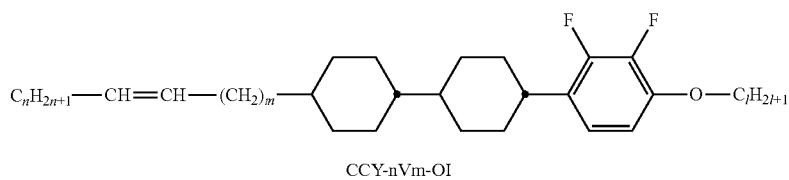
CCY-nVm-Ol TABLE D-continued
Illustrative structures
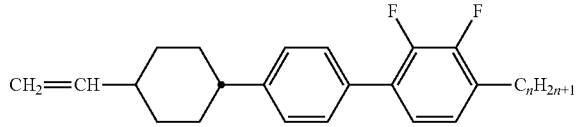
CPY-V-n
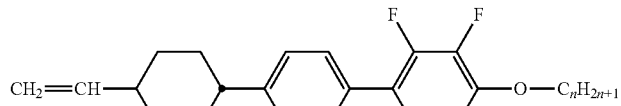
CPY-V-On
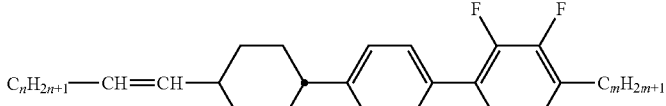
CPY-nV-m
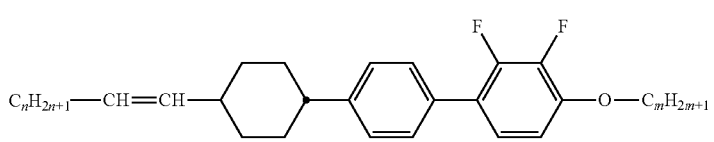
CPY-nV-Om
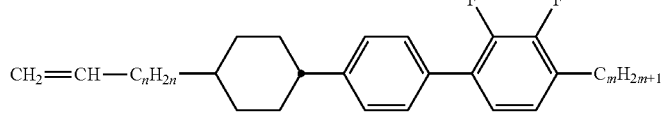
CPY-Vn-m
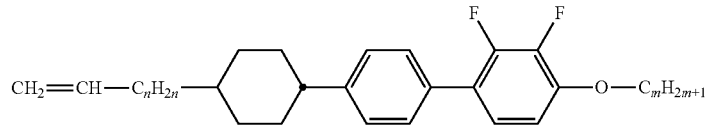
CPY-Vn-Om
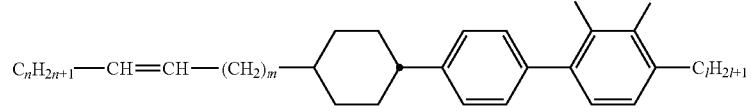
CPY-nVm-l
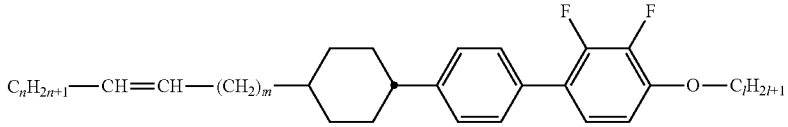
CPY-nVm-Ol TABLE D-continued
Illustrative structures
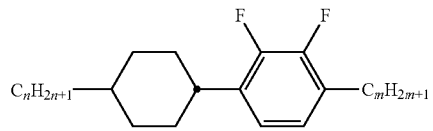
CY-n-m
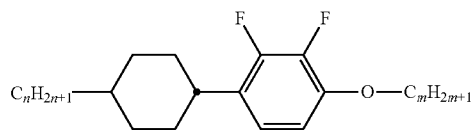
CY-n-Om
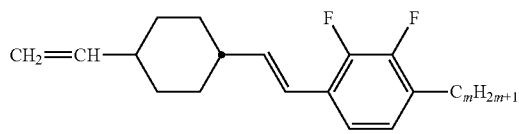
CVY-n-m
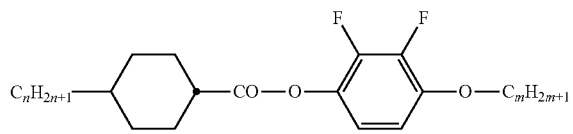
CZY-n-Om
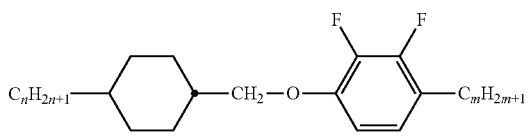
COY-n-m
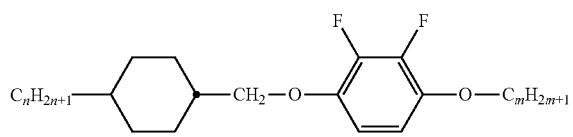
COY-n-Om
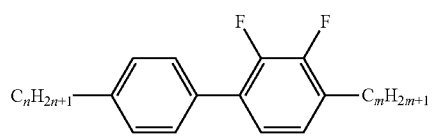
PY-n-m
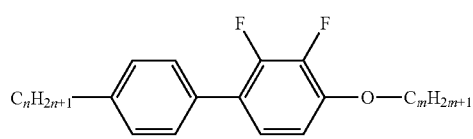
PY-n-Om TABLE D-continued
Illustrative structures
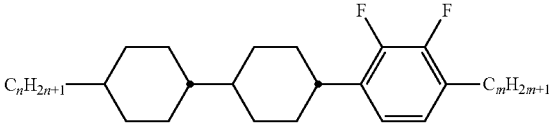
CCY-n-m
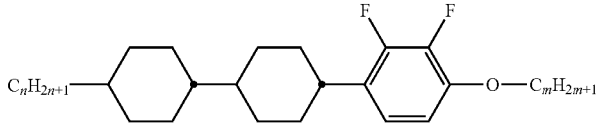
CCY-n-Om
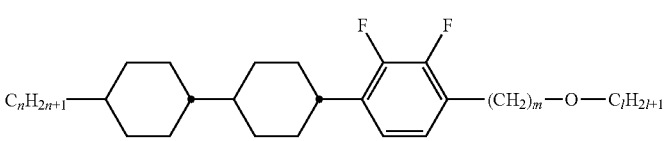
CCY-n-mOl
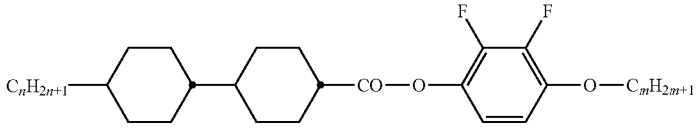
CCZY-n-Om
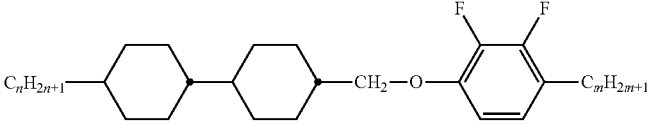
CCOY-n-m
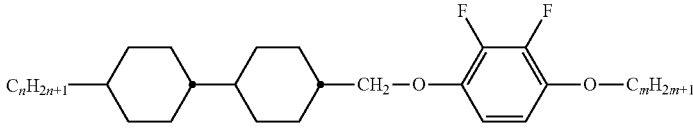
CCOY-n-Om
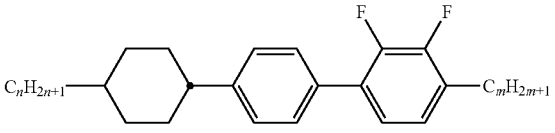
CPY-n-m
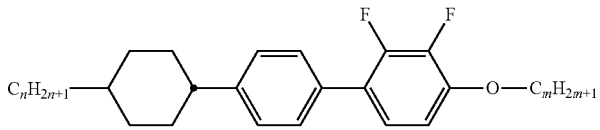
CPY-n-Om TABLE D-continued
Illustrative structures
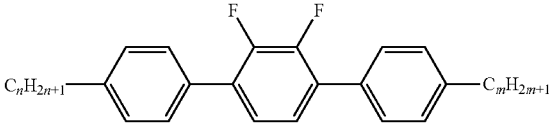
PYP-n-m
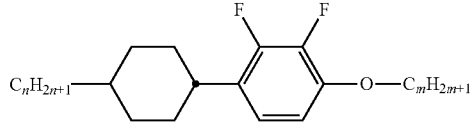
CP(F,Cl)-n-Om
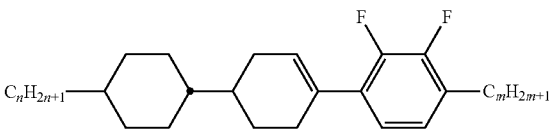
CLY-n-m
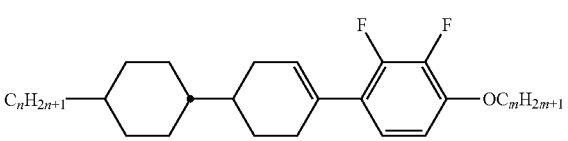
CLY-n-Om
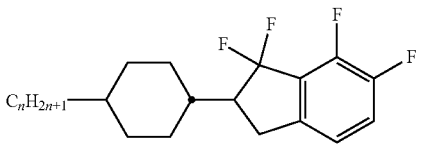
CK-n-F
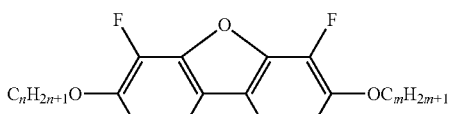
B-nO-Om
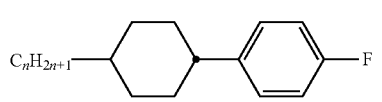
CP-n-F
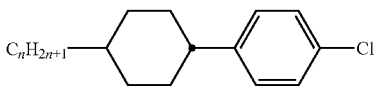
CP-n-CL
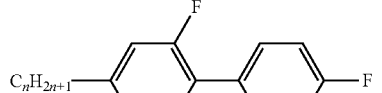
GP-n-F TABLE D-continued
Illustrative structures
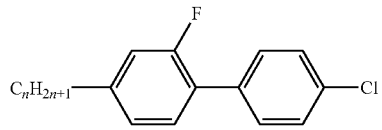
GP-n-CL
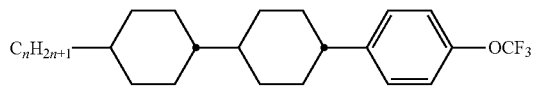
CCP-n-OT
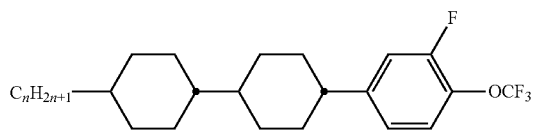
CCG-n-OT
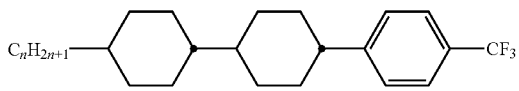
CCP-n-T
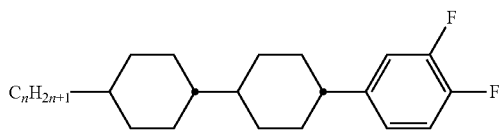
CCG-n-F
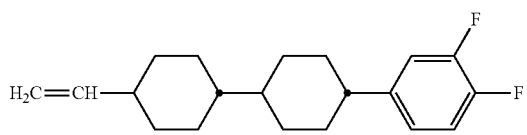
CCG-V-F
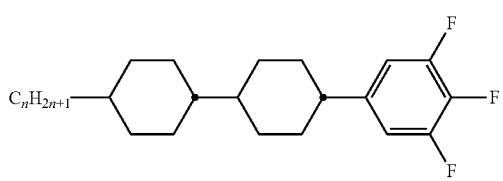
CCU-n-F
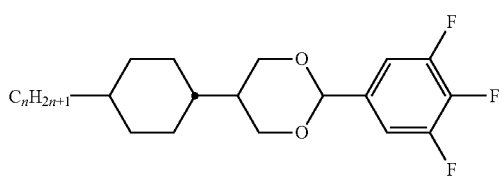
CDU-n-F TABLE D-continued
Illustrative structures
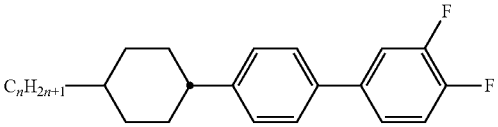
CPG-n-F
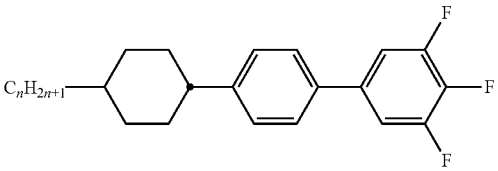
CPU-n-F
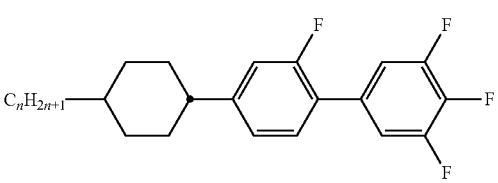
CGU-n-F
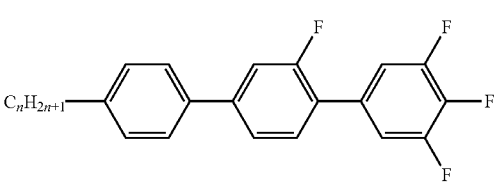
PGU-n-F
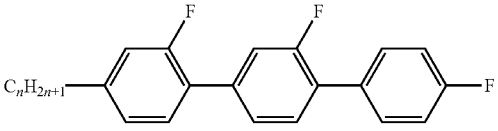
GGP-n-F
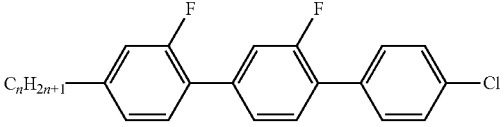
GGP-n-CL
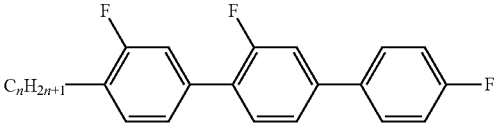
PGIGI-n-F
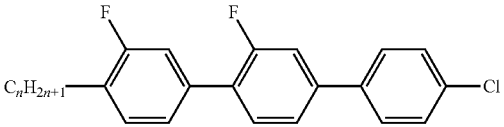
PGIGI-n-CL TABLE D-continued
Illustrative structures
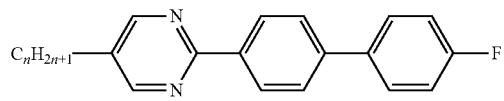
MPP-n-F
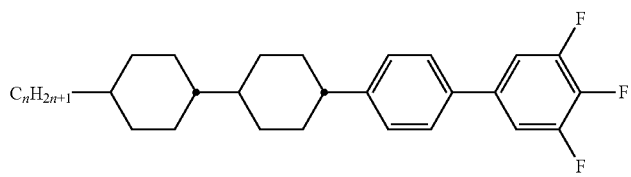
CCPU-n-F
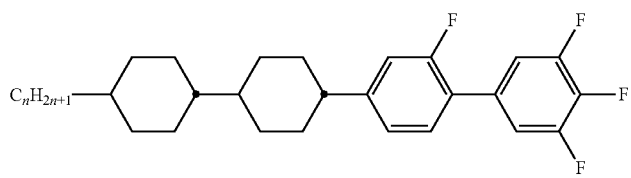
CCGU-n-F
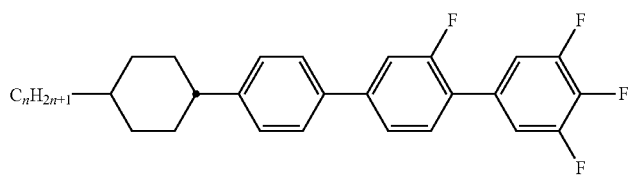
CPGU-n-F
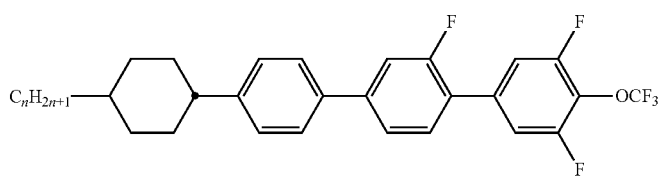
CPGU-n-OT
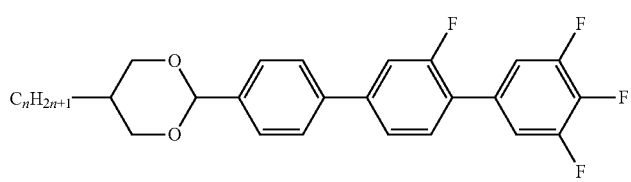
DPGU-n-F
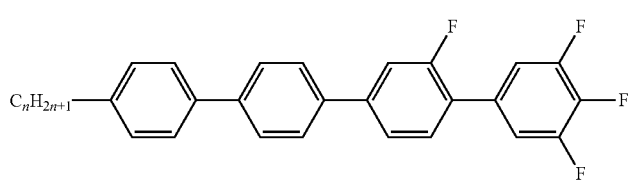
PPGU-n-F TABLE D-continued
Illustrative structures
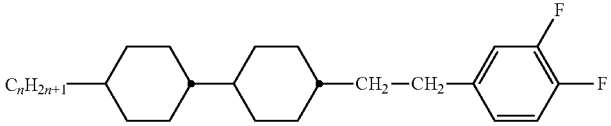
CCEG-n-F
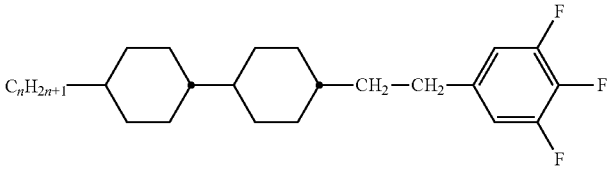
CCEU-n-F
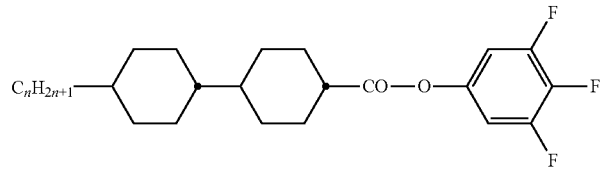
CCZU-n-F
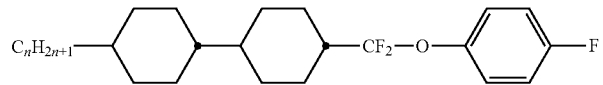
CCQP-n-F
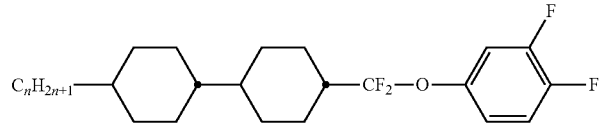
CCQG-n-F
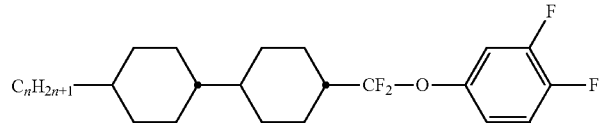
CCQU-n-F
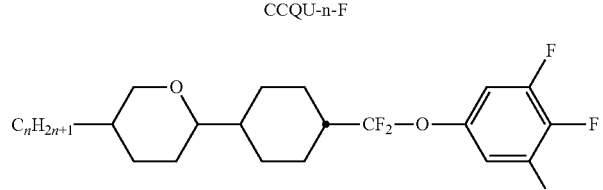
ACQU-n-F
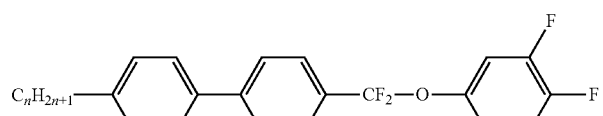
PPQG-n-F TABLE D-continued
Illustrative structures
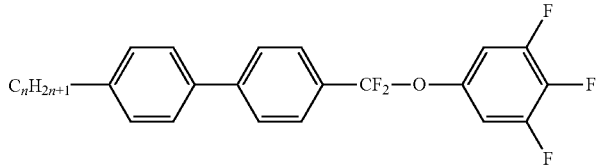
PPQU-n-F
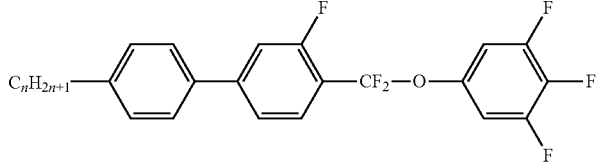
PGQU-n-F
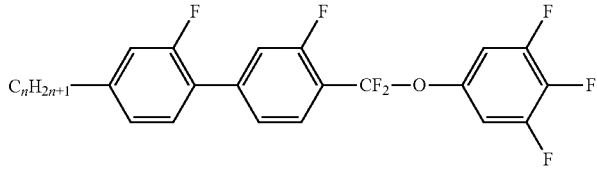
GGQU-n-F
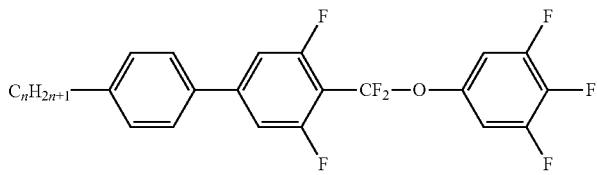
PUQU-n-F
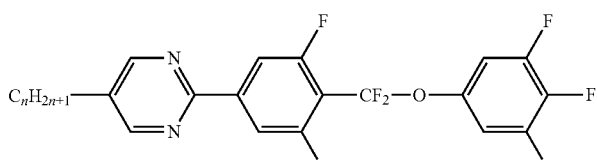
MUQU-n-F
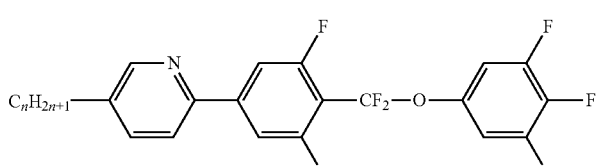
NUQU-n-F
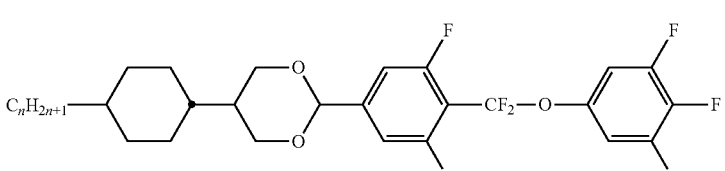
CDUQU-n-F TABLE D-continued
Illustrative structures
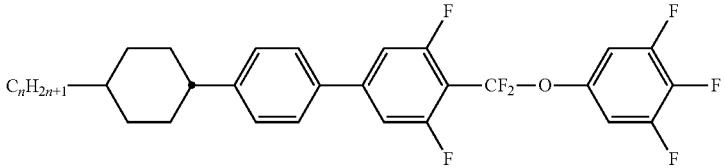
CPUQU-n-F
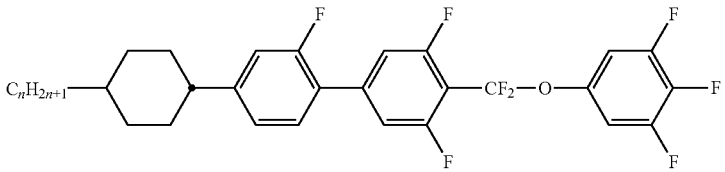
CGUQU-n-F
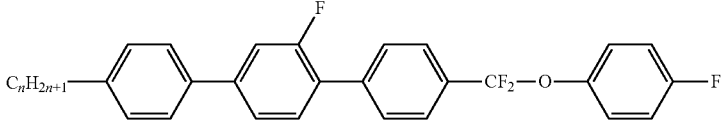
PGPQP-n-F
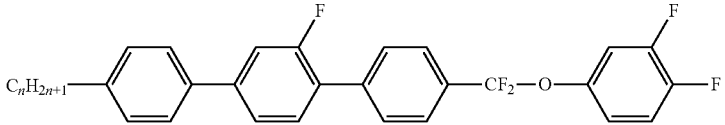
PGPQG-n-F
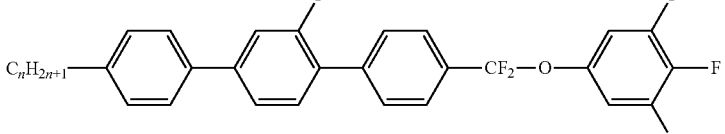
PGPQU-n-F
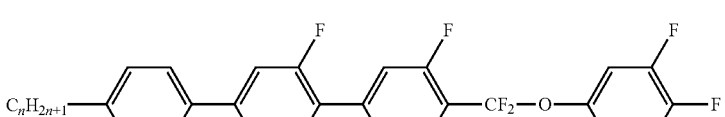
PGUQU-n-F
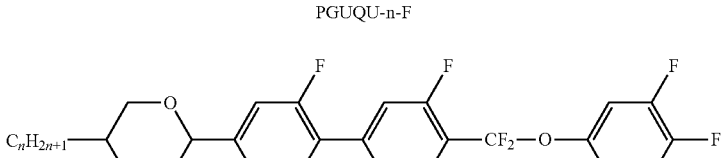
APUQU-n-F TABLE D-continued
Illustrative structures
![DGUQU-n-F structure]
DGUQU-n-F
Table E below shows chiral dopants which can preferably be employed in the mixtures according to the invention.
TABLE E
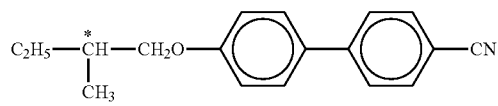
C 15
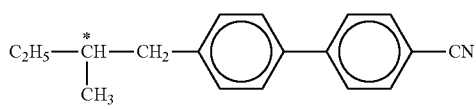
CB 15
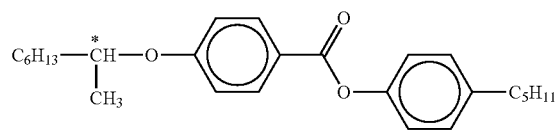
CM 21
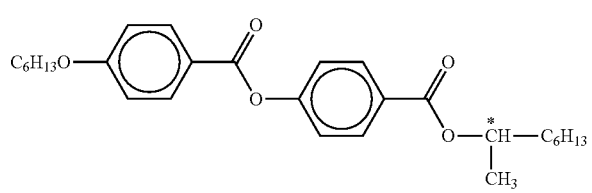
R S-811/S-811
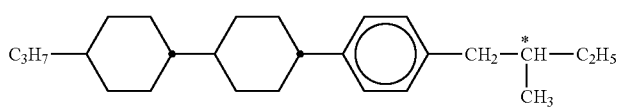
CM 44
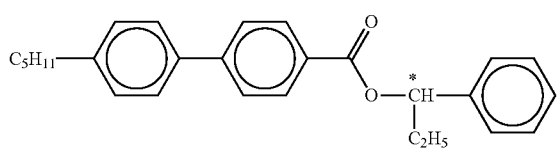
CM 45

TABLE E-continued
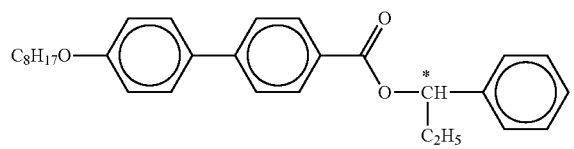
CM 47
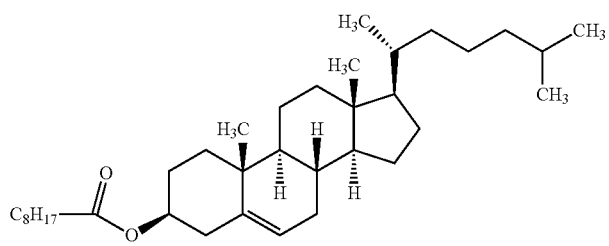
CN
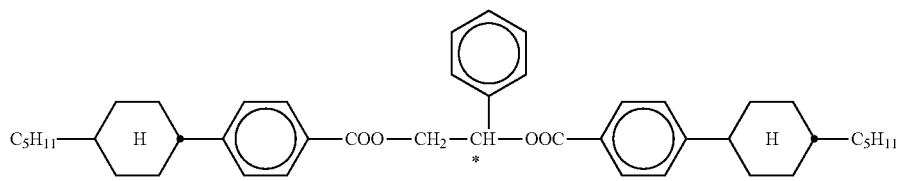
R-1011/S-1011
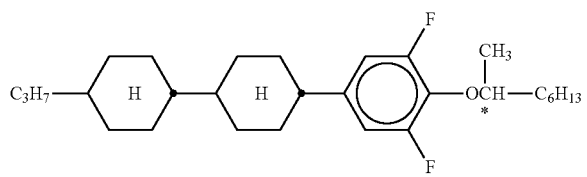
R-2011/S-2011
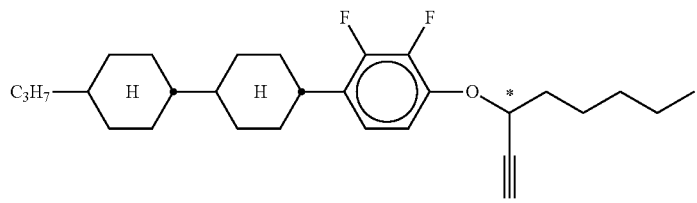
R-3011/S-3011
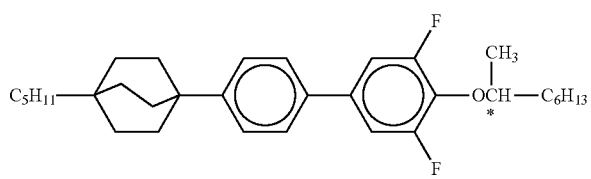
R-4011/S-4011

TABLE E-continued

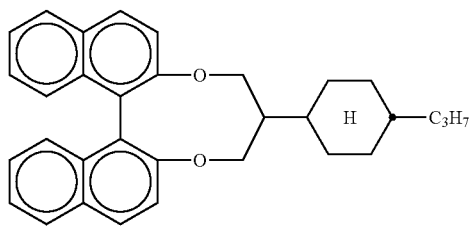

R-5011/S-5011

In a preferred embodiment of the present invention, the media according to the invention comprise one or more compounds selected from the group of the compounds from Table E.

Table F shows stabilisers which can be employed in the mixtures according to the invention. The parameter n here denotes an integer in the range from 1 to 12.

TABLE F

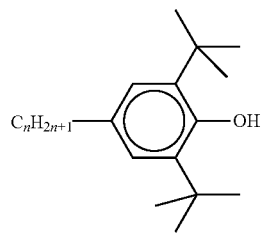

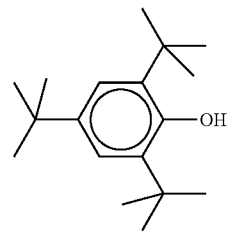

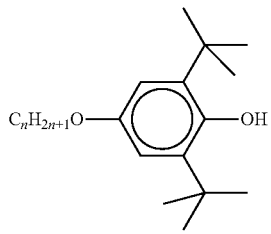

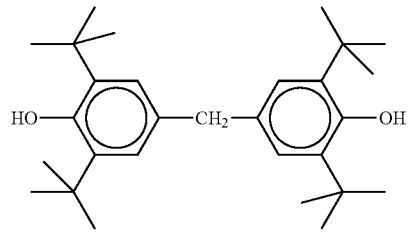

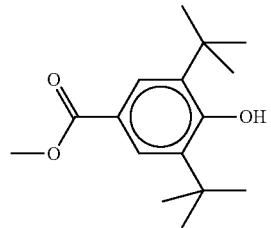

TABLE F-continued

TABLE F-continued
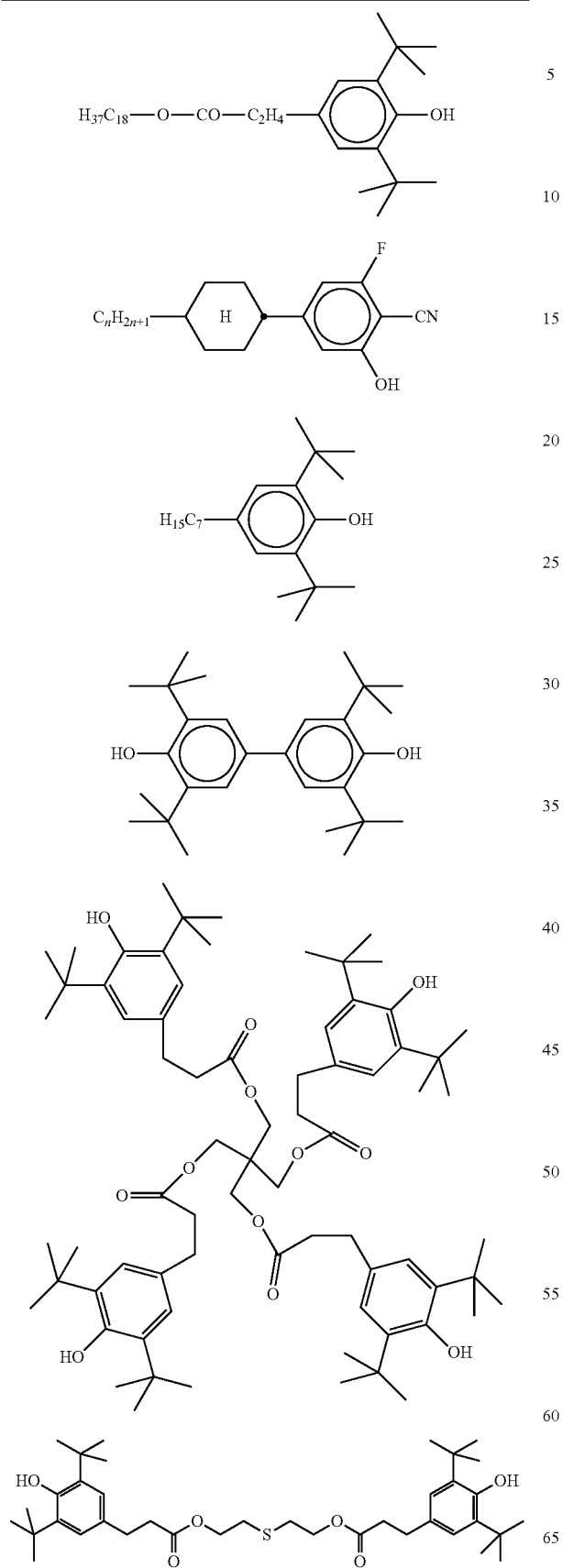
TABLE F-continued
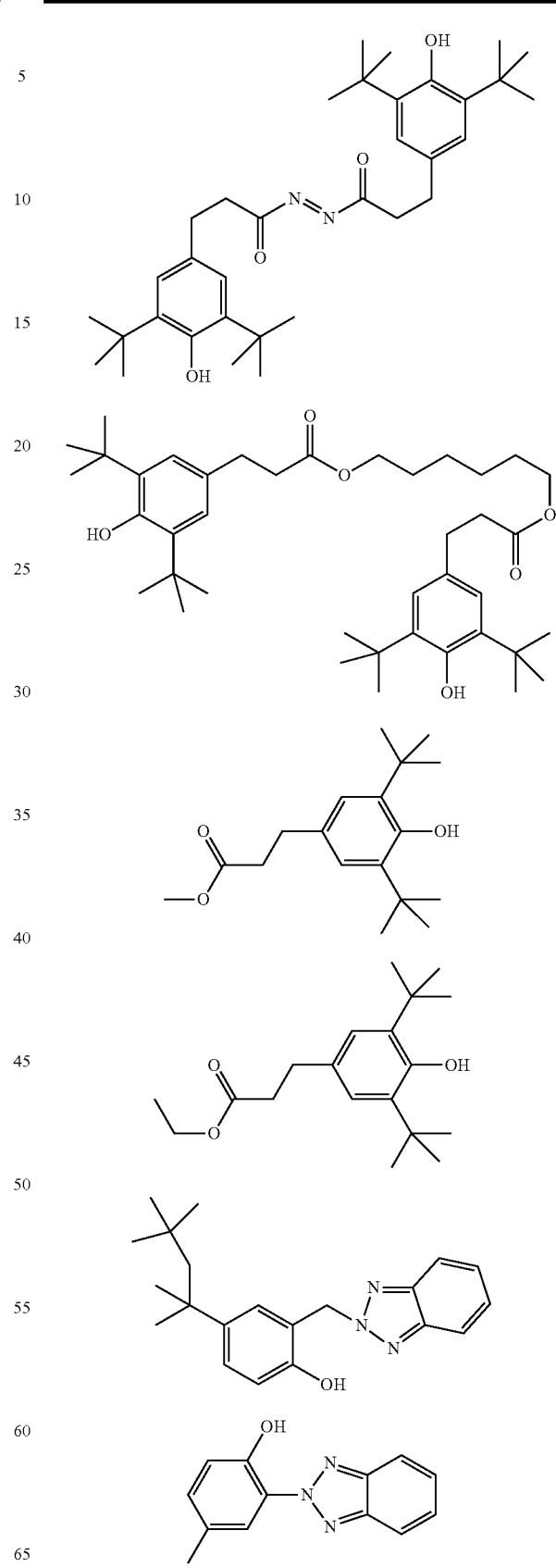

TABLE F-continued
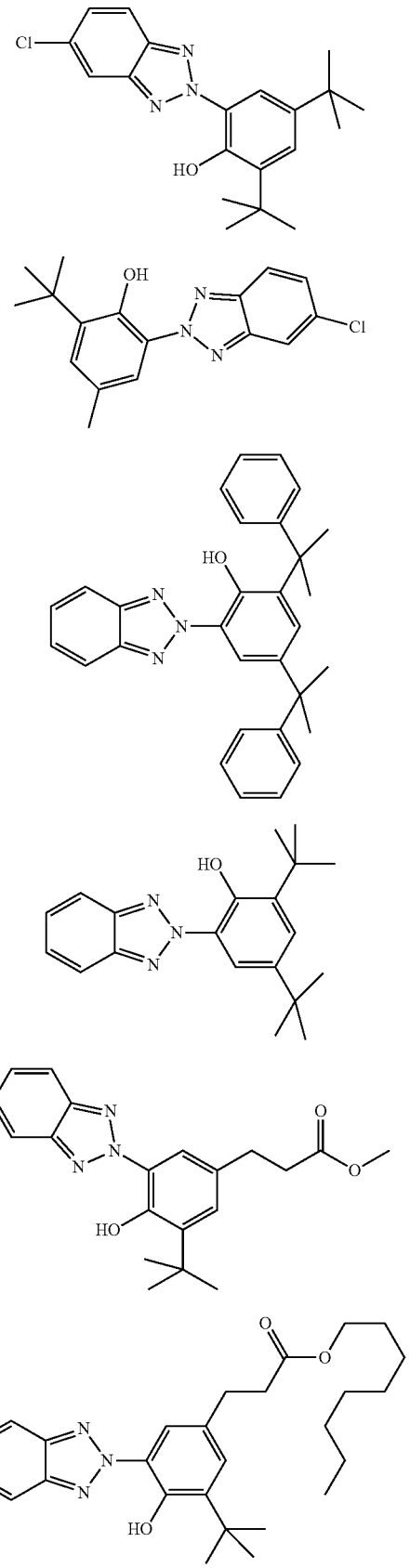
TABLE F-continued
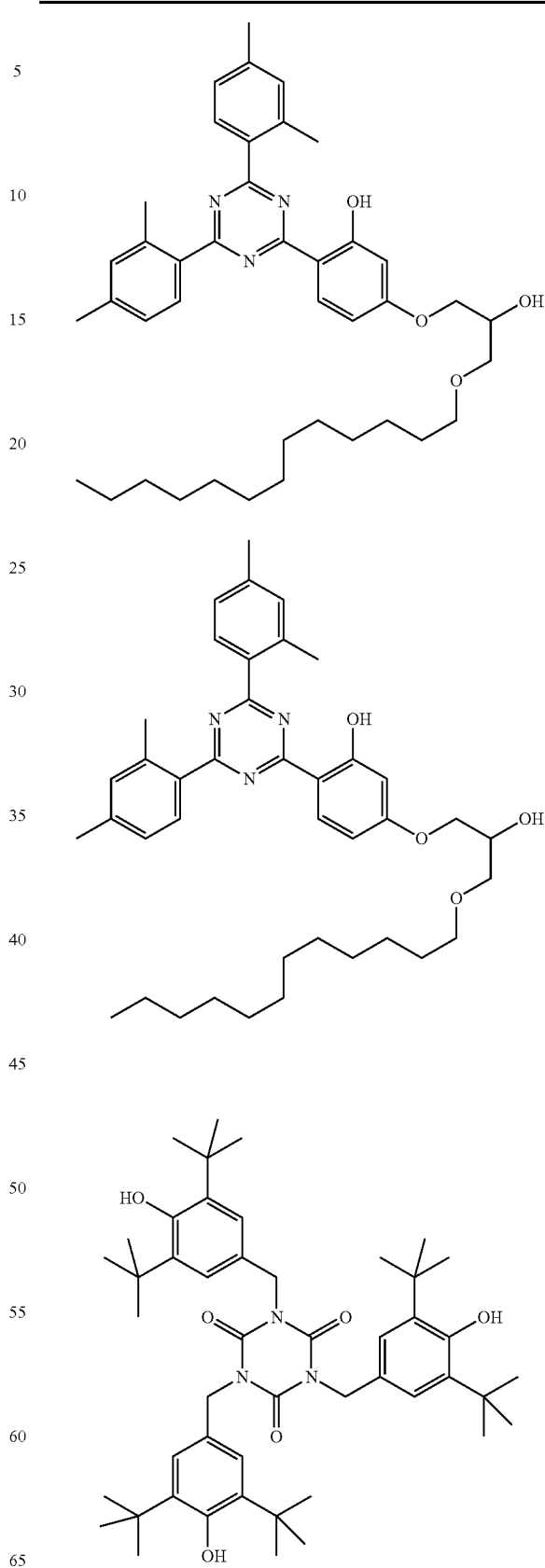

TABLE F-continued

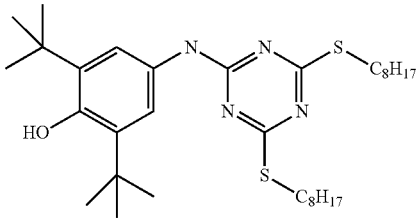

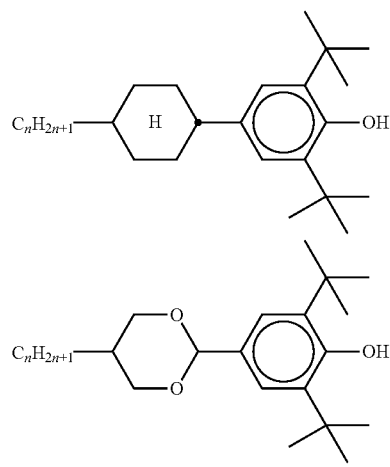

In a preferred embodiment of the present invention, the media according to the invention comprise one or more compounds selected from the group of the compounds from Table F, in particular one or more compounds selected from the group of the compounds of the two formulae

TABLE G

Table G lists illustrative compounds which can preferably be used as polymerisable compounds in the LC media in accordance with the present invention.

RM-1

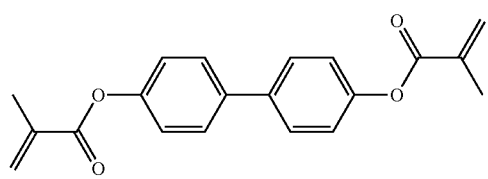 [SMILES: C=C(C)C(=O)Oc1ccc(-c2ccc(OC(=O)C(=C)C)cc2)cc1]

RM-2

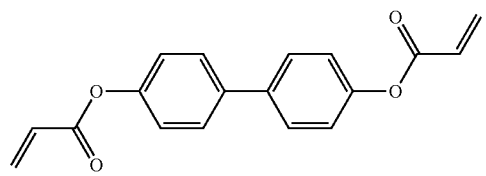 [SMILES: C=CC(=O)Oc1ccc(-c2ccc(OC(=O)C=C)cc2)cc1]

RM-3

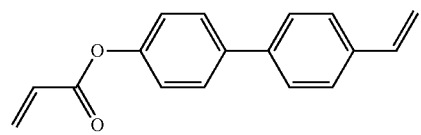 [SMILES: C=CC(=O)Oc1ccc(-c2ccc(C=C)cc2)cc1]

RM-4

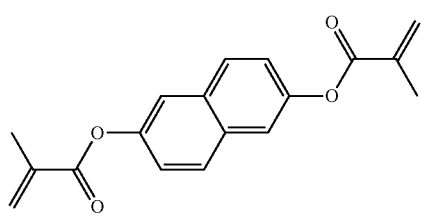 [SMILES: C=C(C)C(=O)Oc1ccc2cc(OC(=O)C(=C)C)ccc2c1]

TABLE G-continued
Table G lists illustrative compounds which can preferably be used as polymerisable compounds in the LC media in accordance with the present invention.
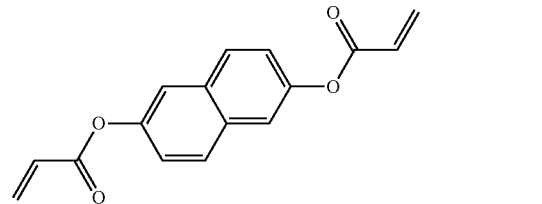 [SMILES: C=CC(=O)Oc1ccc2cc(OC(=O)C=C)ccc2c1]
RM-5
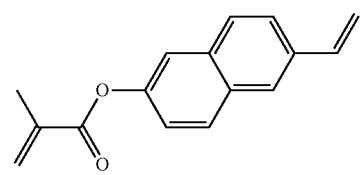 [SMILES: C=Cc1ccc2cc(OC(=O)C(=C)C)ccc2c1]
RM-6
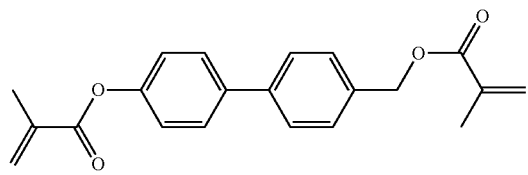 [SMILES: C=C(C)C(=O)OCc1ccc(-c2ccc(OC(=O)C(=C)C)cc2)cc1]
RM-7
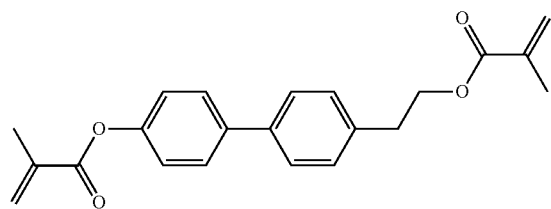 [SMILES: C=C(C)C(=O)OCCc1ccc(-c2ccc(OC(=O)C(=C)C)cc2)cc1]
RM-8
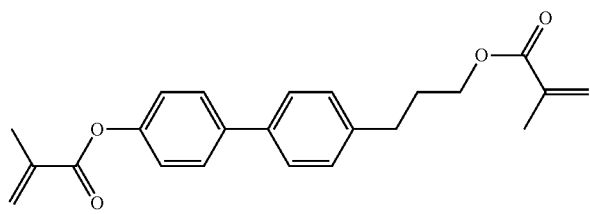 [SMILES: C=C(C)C(=O)OCCCc1ccc(-c2ccc(OC(=O)C(=C)C)cc2)cc1]
RM-9
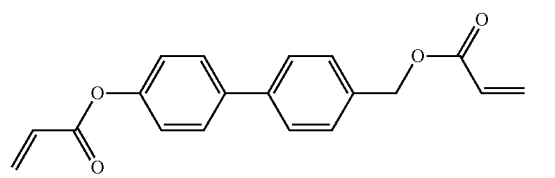 [SMILES: C=CC(=O)OCc1ccc(-c2ccc(OC(=O)C=C)cc2)cc1]
RM-10
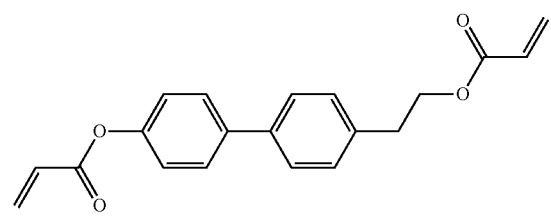
RM-11

TABLE G-continued
Table G lists illustrative compounds which can preferably be used as polymerisable compounds in the LC media in accordance with the present invention.
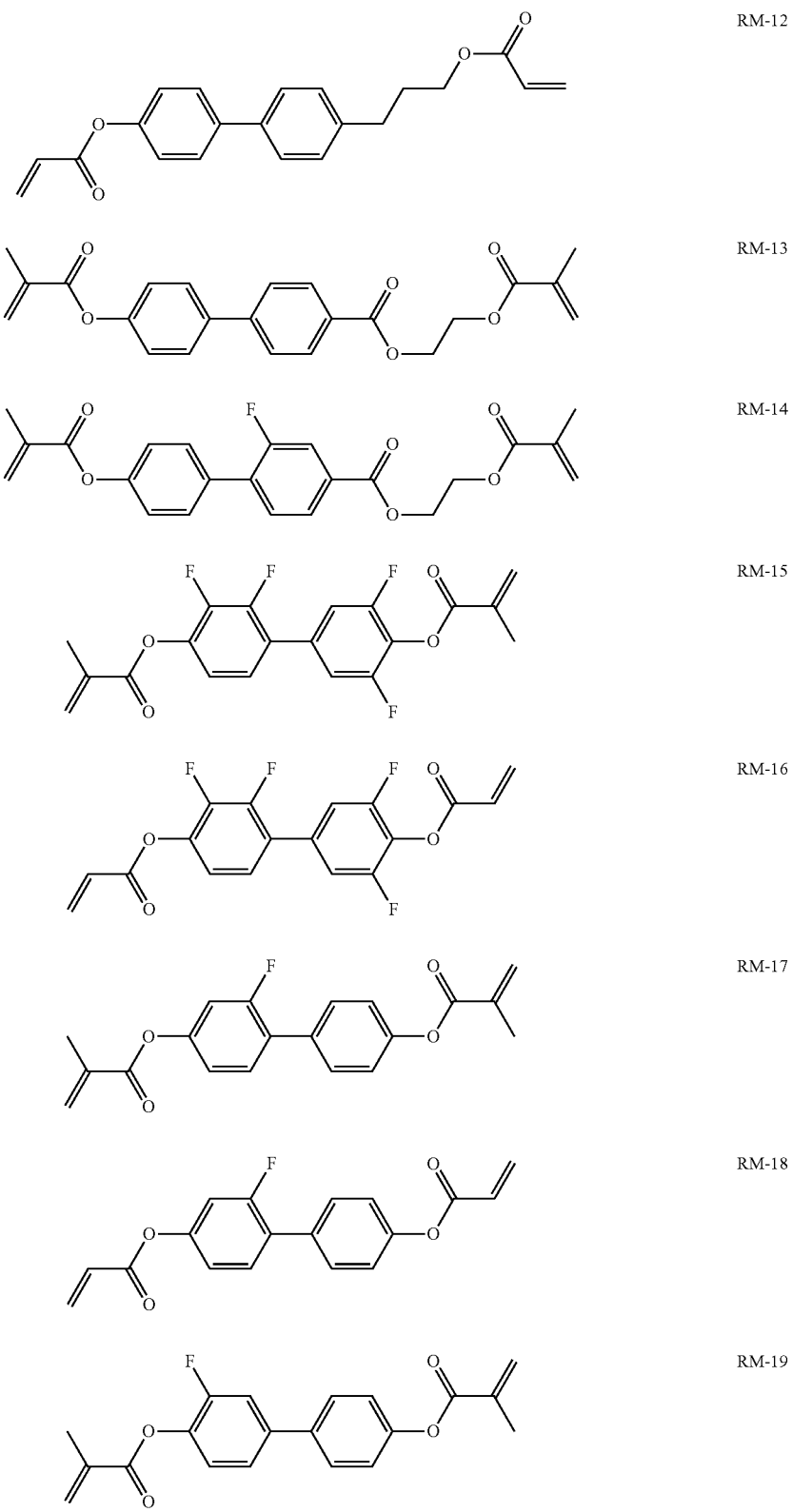

TABLE G-continued
Table G lists illustrative compounds which can preferably be used as polymerisable compounds in the LC media in accordance with the present invention.
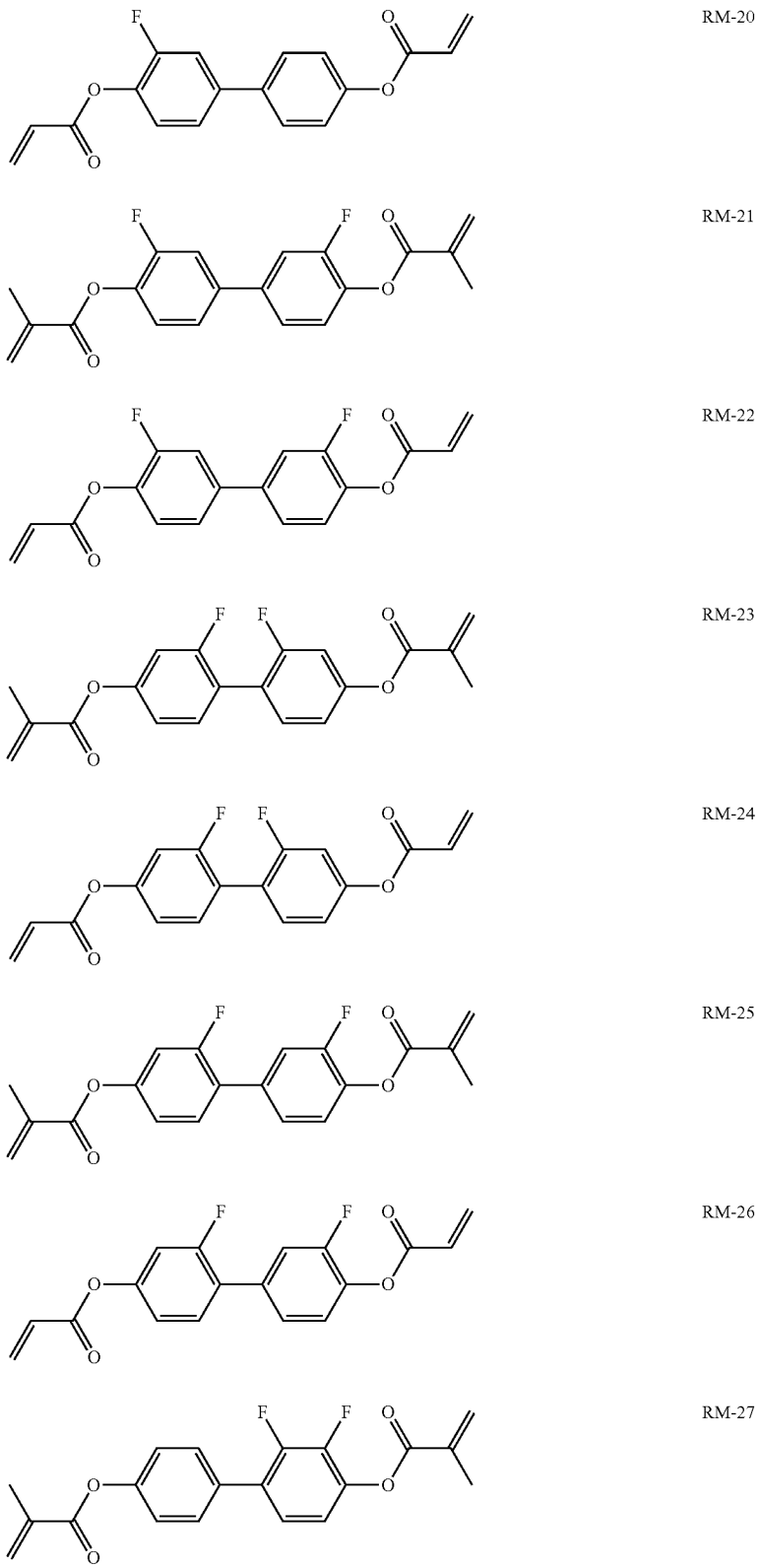

TABLE G-continued
Table G lists illustrative compounds which can preferably be used as polymerisable compounds in the LC media in accordance with the present invention.
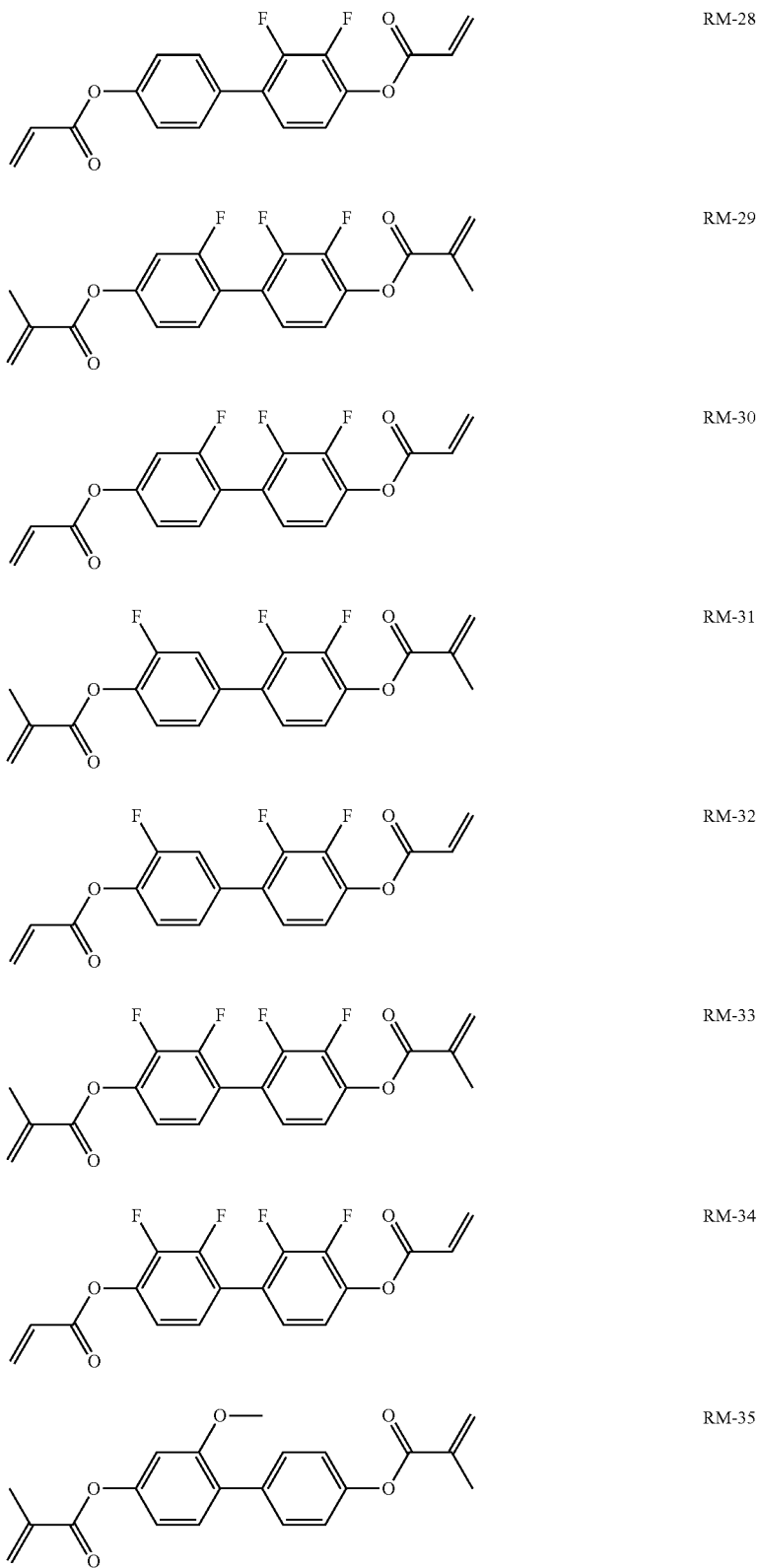
RM-28
RM-29
RM-30
RM-31
RM-32
RM-33
RM-34
RM-35

TABLE G-continued
Table G lists illustrative compounds which can preferably be used as polymerisable compounds in the LC media in accordance with the present invention.
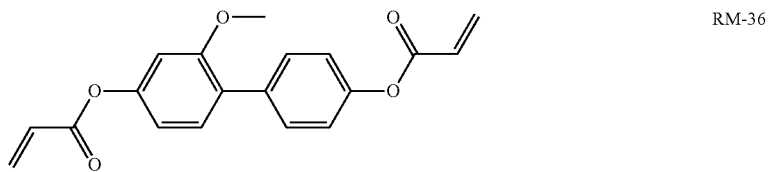 RM-36
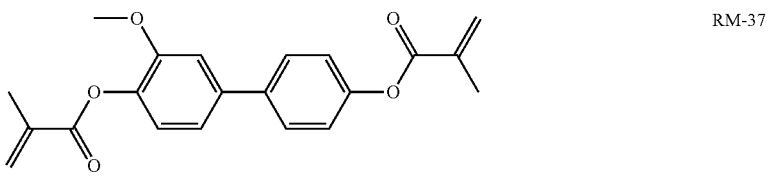 RM-37
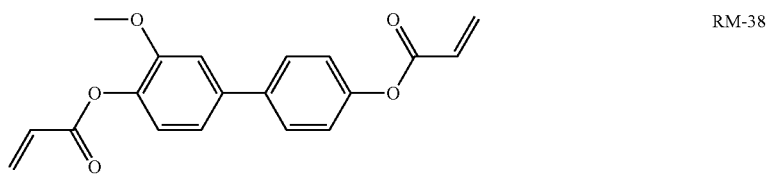 RM-38
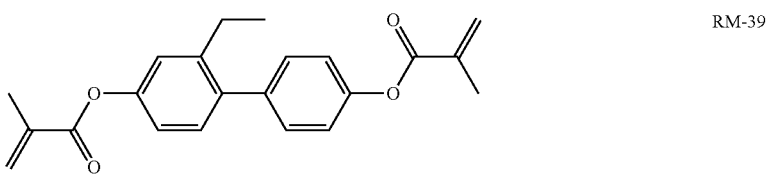 RM-39
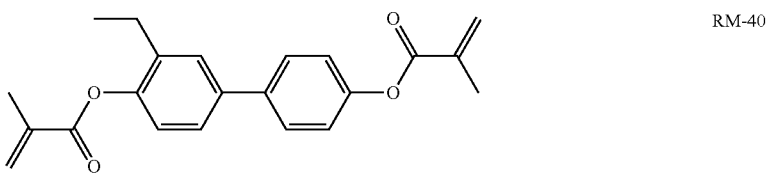 RM-40
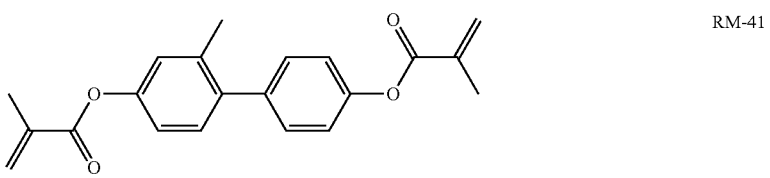 RM-41
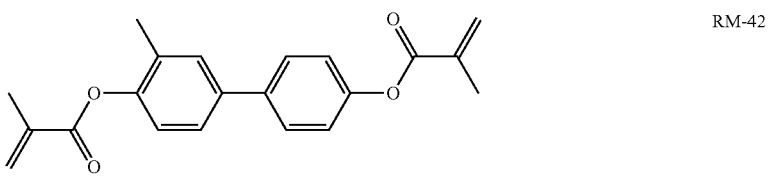 RM-42
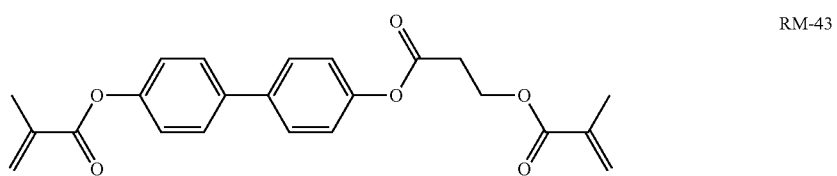 RM-43

TABLE G-continued
Table G lists illustrative compounds which can preferably be used as polymerisable compounds in the LC media in accordance with the present invention.
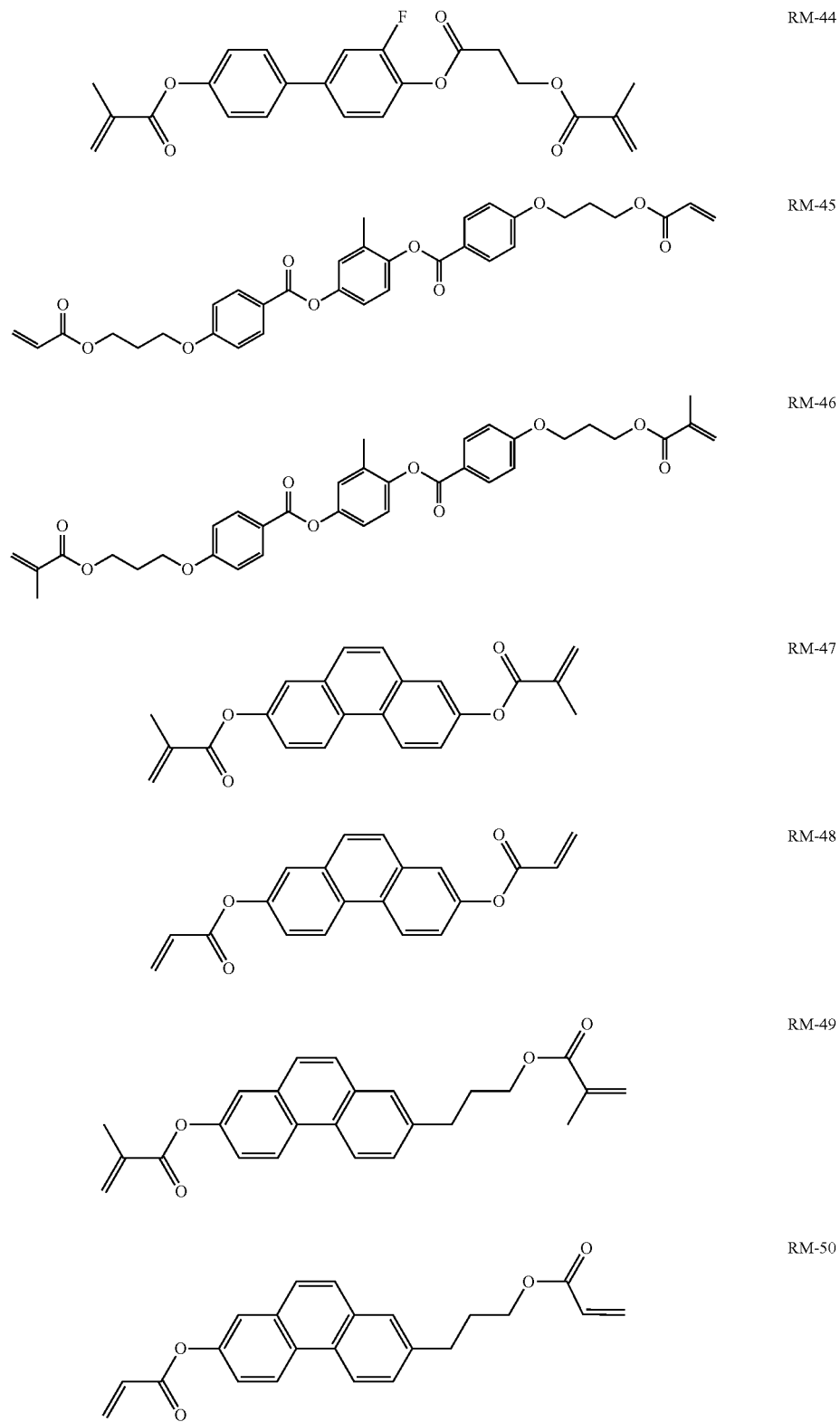
RM-44
RM-45
RM-46
RM-47
RM-48
RM-49
RM-50

TABLE G-continued
Table G lists illustrative compounds which can preferably be used as polymerisable compounds in the LC media in accordance with the present invention.
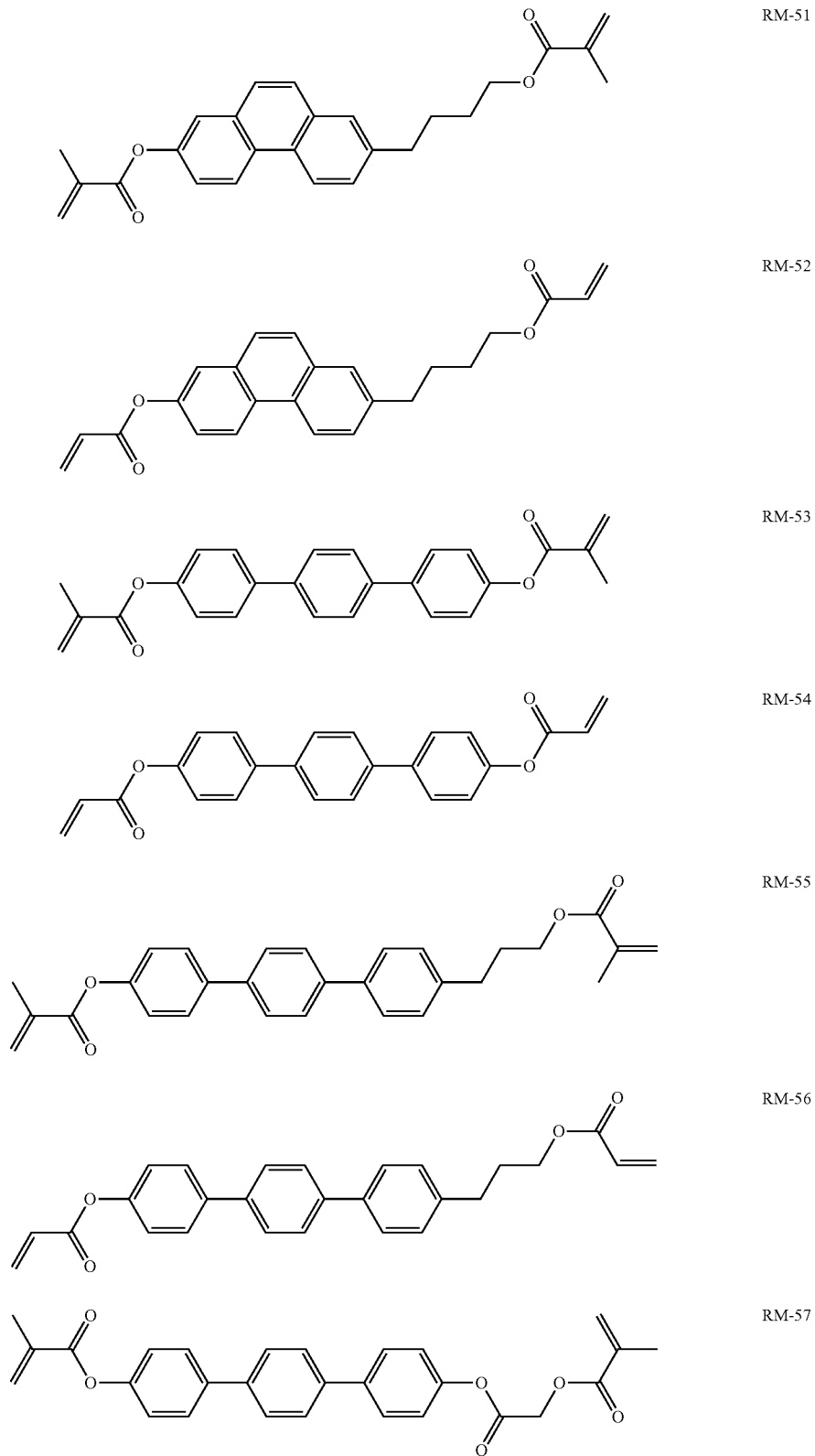

TABLE G-continued
Table G lists illustrative compounds which can preferably be used as polymerisable compounds in the LC media in accordance with the present invention.
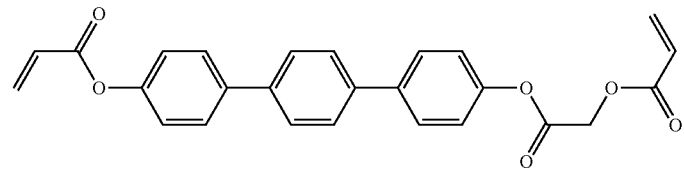 [SMILES: C=CC(=O)OCC(=O)Oc1ccc(-c2ccc(-c3ccc(OC(=O)C=C)cc3)cc2)cc1] RM-58
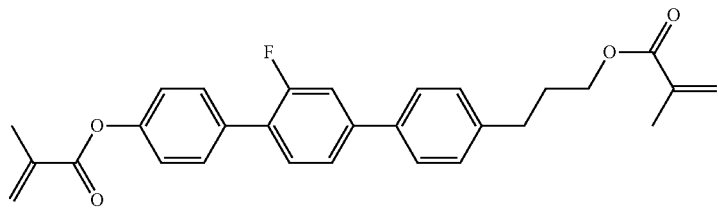 [SMILES: C=C(C)C(=O)OCCCc1ccc(-c2ccc(-c3ccc(OC(=O)C(=C)C)cc3)c(F)c2)cc1] RM-59
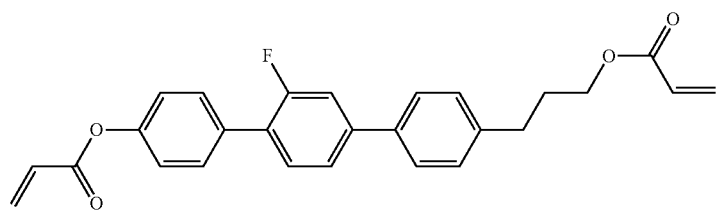 [SMILES: C=CC(=O)OCCCc1ccc(-c2ccc(-c3ccc(OC(=O)C=C)cc3)c(F)c2)cc1] RM-60
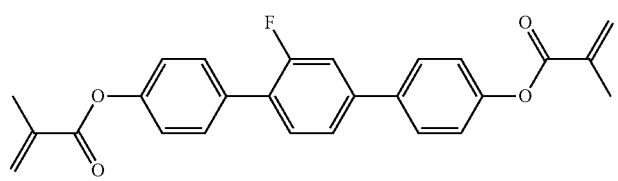 [SMILES: C=C(C)C(=O)Oc1ccc(-c2ccc(-c3ccc(OC(=O)C(=C)C)cc3)c(F)c2)cc1] RM-61
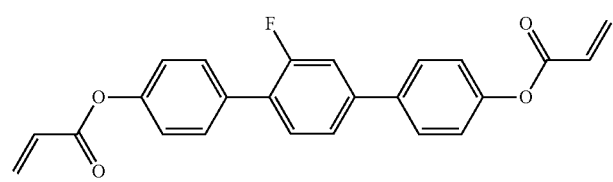 [SMILES: C=CC(=O)Oc1ccc(-c2ccc(-c3ccc(OC(=O)C=C)cc3)c(F)c2)cc1] RM-62
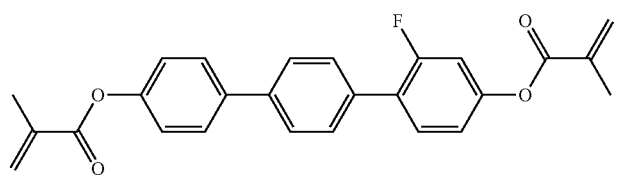 RM-63
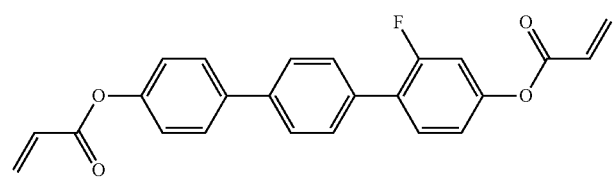 RM-64
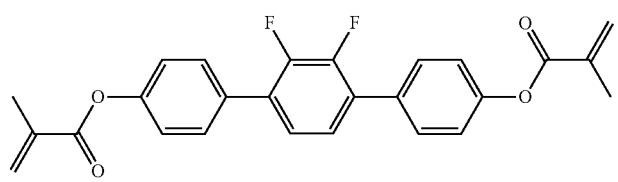 RM-65

TABLE G-continued
Table G lists illustrative compounds which can preferably be used as polymerisable compounds in the LC media in accordance with the present invention.
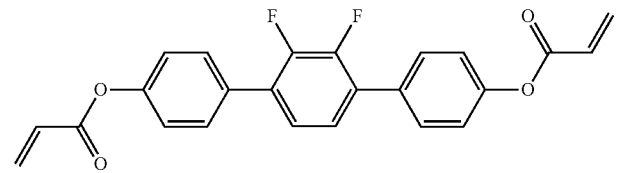 RM-66
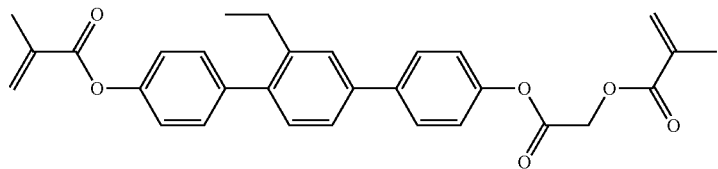 [SMILES: C=C(C)C(=O)OCC(=O)Oc1ccc(-c2ccc(-c3ccc(OC(=O)C(=C)C)cc3)c(CC)c2)cc1] RM-67
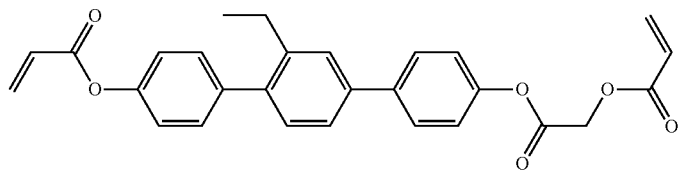 [SMILES: C=CC(=O)OCC(=O)Oc1ccc(-c2ccc(-c3ccc(OC(=O)C=C)cc3)c(CC)c2)cc1] RM-68
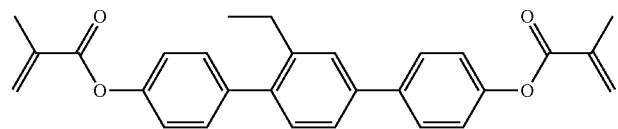 [SMILES: C=C(C)C(=O)Oc1ccc(-c2ccc(-c3ccc(OC(=O)C(=C)C)cc3)c(CC)c2)cc1] RM-69
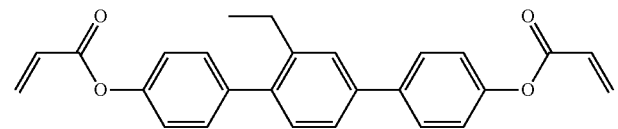 [SMILES: C=CC(=O)Oc1ccc(-c2ccc(-c3ccc(OC(=O)C=C)cc3)c(CC)c2)cc1] RM-70
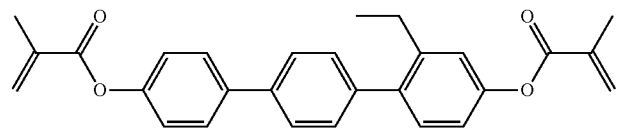 [SMILES: C=C(C)C(=O)Oc1ccc(-c2ccc(-c3ccc(OC(=O)C(=C)C)cc3CC)cc2)cc1] RM-71
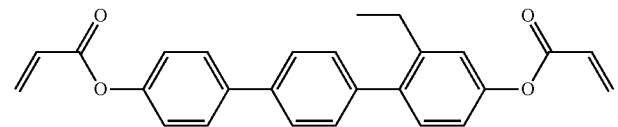 [SMILES: C=CC(=O)Oc1ccc(-c2ccc(-c3ccc(OC(=O)C=C)cc3CC)cc2)cc1] RM-72
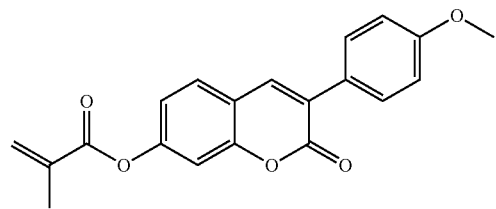 [SMILES: C=C(C)C(=O)Oc1ccc2cc(-c3ccc(OC)cc3)c(=O)oc2c1] RM-73
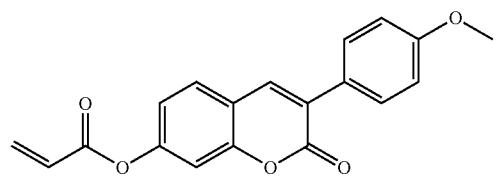 [SMILES: C=CC(=O)Oc1ccc2cc(-c3ccc(OC)cc3)c(=O)oc2c1] RM-74

TABLE G-continued
Table G lists illustrative compounds which can preferably be used as polymerisable compounds in the LC media in accordance with the present invention.
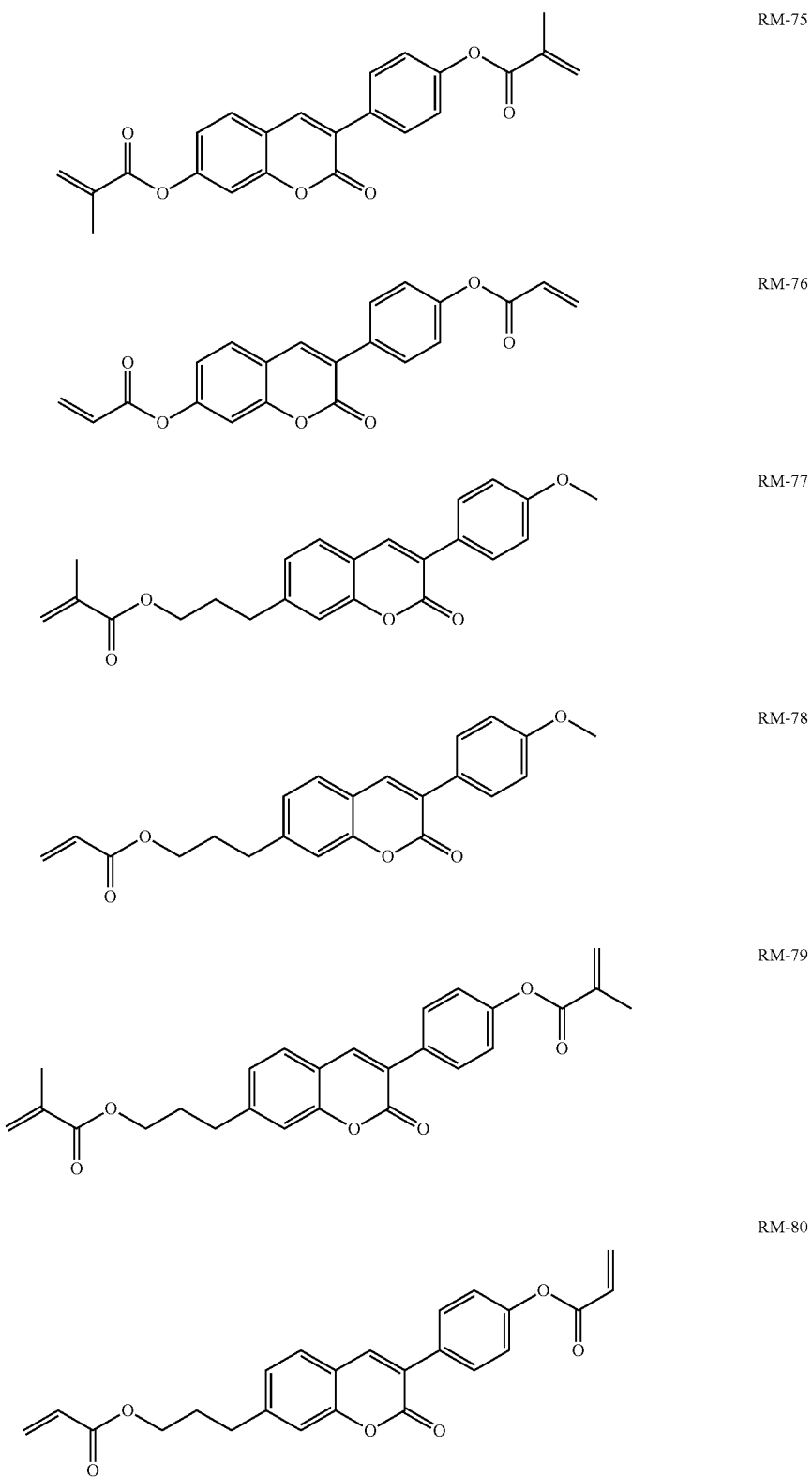

TABLE G-continued
Table G lists illustrative compounds which can preferably be used as polymerisable compounds in the LC media in accordance with the present invention.
RM-81
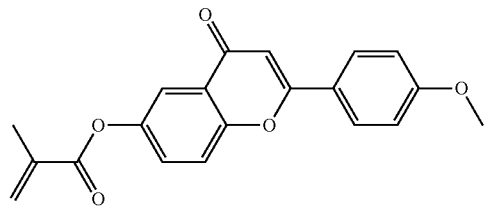 [SMILES: C=C(C)C(=O)Oc1ccc2oc(-c3ccc(OC)cc3)cc(=O)c2c1]
RM-82
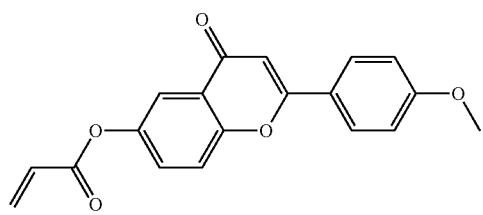 [SMILES: C=CC(=O)Oc1ccc2oc(-c3ccc(OC)cc3)cc(=O)c2c1]
RM-83
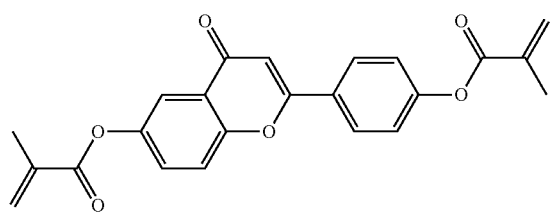 [SMILES: C=C(C)C(=O)Oc1ccc(-c2cc(=O)c3cc(OC(=O)C(=C)C)ccc3o2)cc1]
RM-84
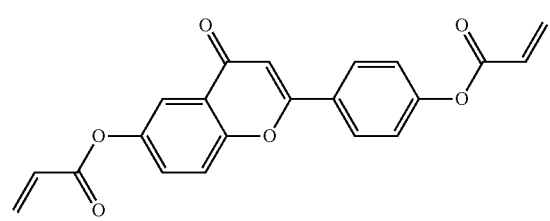 [SMILES: C=CC(=O)Oc1ccc(-c2cc(=O)c3cc(OC(=O)C=C)ccc3o2)cc1]
RM-85
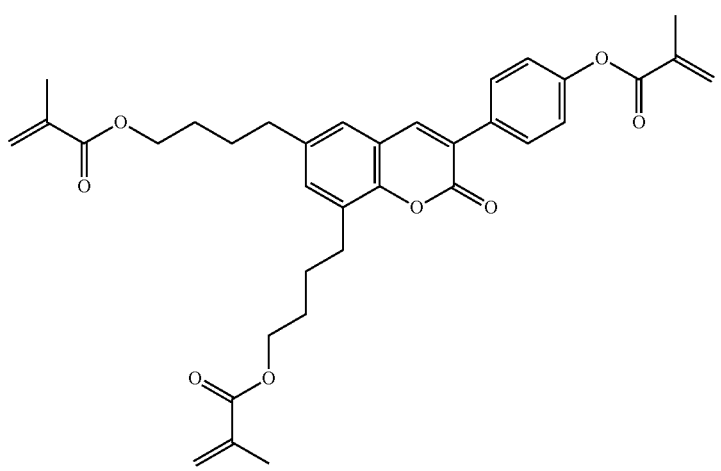 [SMILES: C=C(C)C(=O)OCCCCc1cc(CCCCOC(=O)C(=C)C)c2oc(=O)c(-c3ccc(OC(=O)C(=C)C)cc3)cc2c1]

TABLE G-continued
Table G lists illustrative compounds which can preferably be used as polymerisable compounds in the LC media in accordance with the present invention.
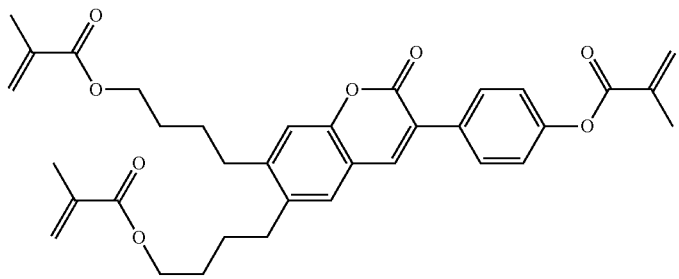 [SMILES: C=C(C)C(=O)OCCCCc1cc2cc(-c3ccc(OC(=O)C(=C)C)cc3)c(=O)oc2cc1CCCCOC(=O)C(=C)C]
RM-86
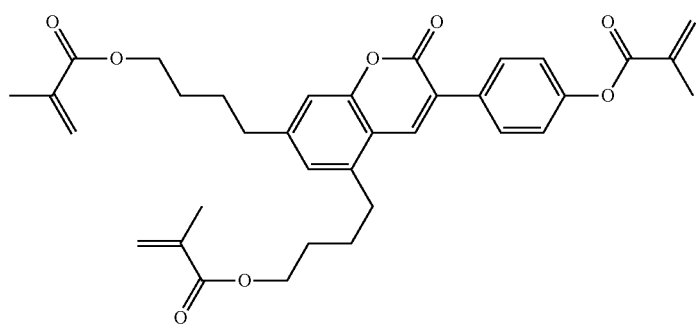 [SMILES: C=C(C)C(=O)OCCCCc1cc(CCCCOC(=O)C(=C)C)c2cc(-c3ccc(OC(=O)C(=C)C)cc3)c(=O)oc2c1]
RM-87
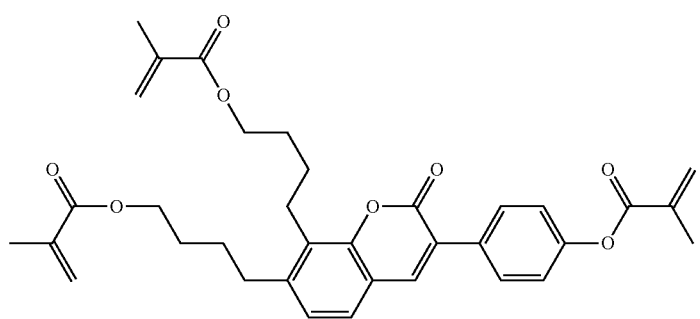 [SMILES: C=C(C)C(=O)OCCCCc1ccc2cc(-c3ccc(OC(=O)C(=C)C)cc3)c(=O)oc2c1CCCCOC(=O)C(=C)C]
RM-88
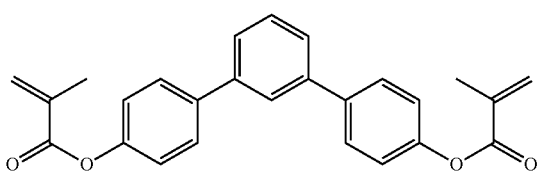 [SMILES: C=C(C)C(=O)Oc1ccc(-c2cccc(-c3ccc(OC(=O)C(=C)C)cc3)c2)cc1]
RM-89
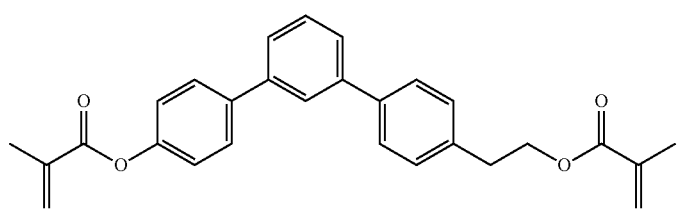 [SMILES: C=C(C)C(=O)OCCc1ccc(-c2cccc(-c3ccc(OC(=O)C(=C)C)cc3)c2)cc1]
RM-90
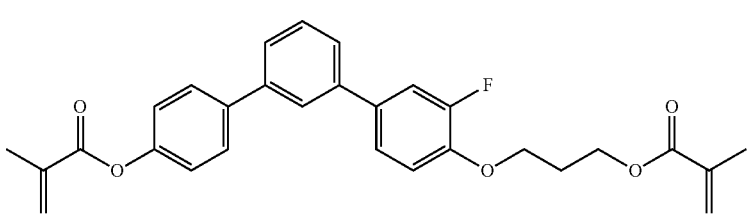 [SMILES: C=C(C)C(=O)OCCCOc1ccc(-c2cccc(-c3ccc(OC(=O)C(=C)C)cc3)c2)cc1F]
RM-91

TABLE G-continued
Table G lists illustrative compounds which can preferably be used as polymerisable compounds in the LC media in accordance with the present invention.
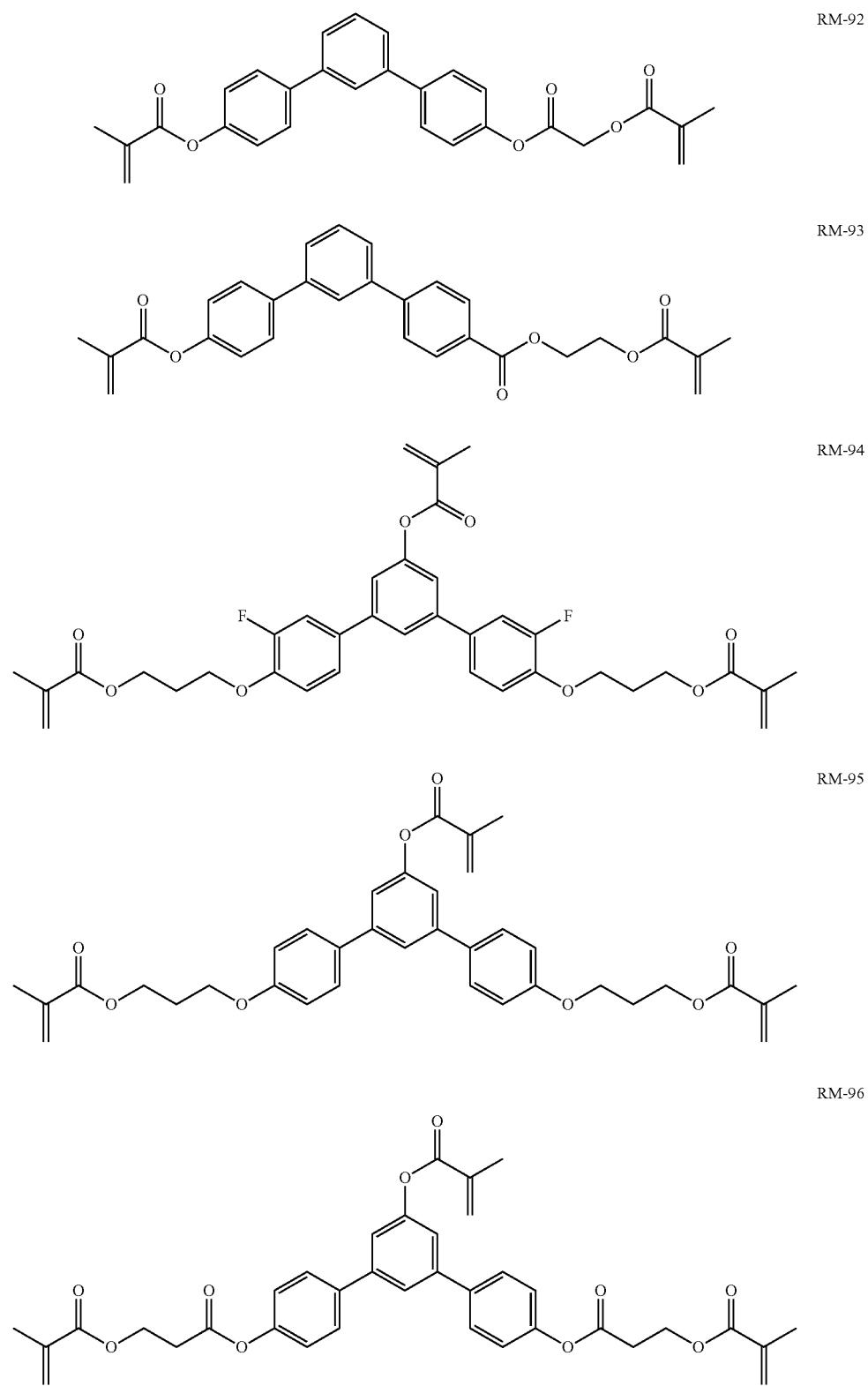
RM-92
RM-93
RM-94
RM-95
RM-96

TABLE G-continued
Table G lists illustrative compounds which can preferably be used as polymerisable compounds in the LC media in accordance with the present invention.
RM-97
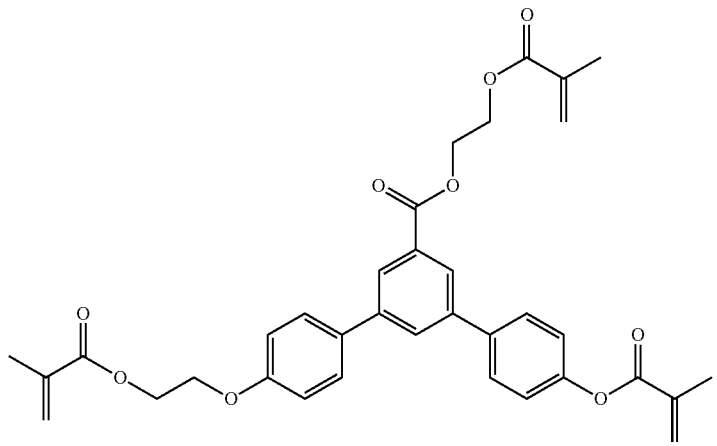 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-98
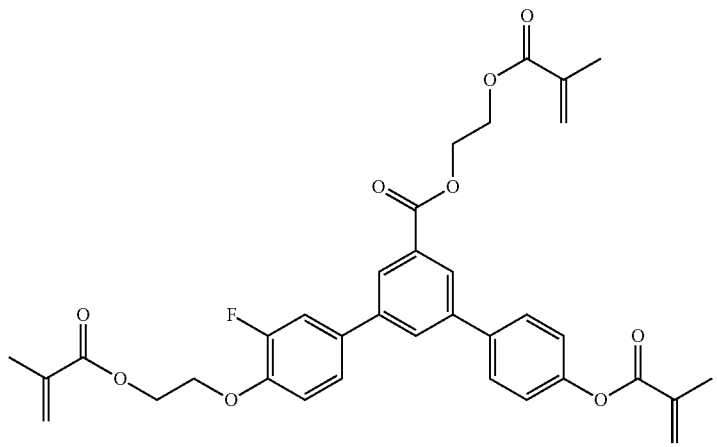 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-99
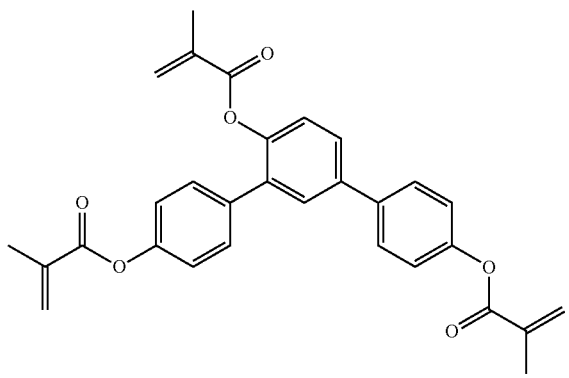 [SMILES: C=C(C)C(=O)Oc1ccc(-c2ccc(OC(=O)C(=C)C)c(-c3ccc(OC(=O)C(=C)C)cc3)c2)cc1]

TABLE G-continued
Table G lists illustrative compounds which can preferably be used as polymerisable compounds in the LC media in accordance with the present invention.
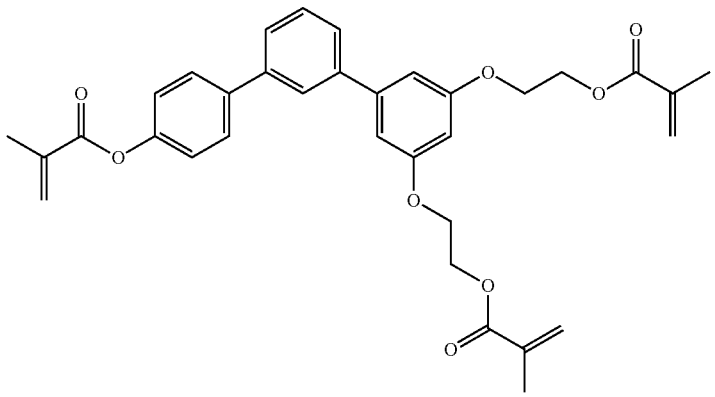 [SMILES: C=C(C)C(=O)OCCOc1cc(OCCOC(=O)C(=C)C)cc(-c2cccc(-c3ccc(OC(=O)C(=C)C)cc3)c2)c1]
RM-100
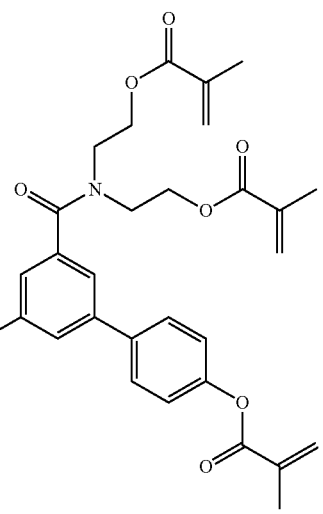
RM-101
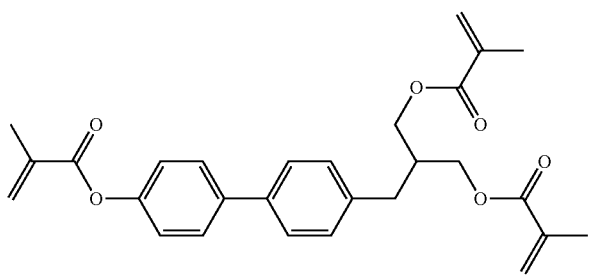 [SMILES: C=C(C)C(=O)OCC(COC(=O)C(=C)C)Cc1ccc(-c2ccc(OC(=O)C(=C)C)cc2)cc1]
RM-102
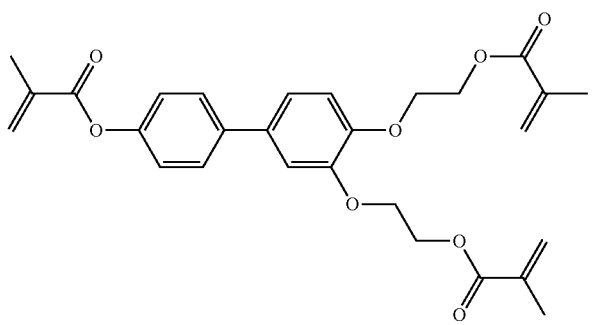 [SMILES: C=C(C)C(=O)OCCOc1ccc(-c2ccc(OC(=O)C(=C)C)cc2)cc1OCCOC(=O)C(=C)C]
RM-103

TABLE G-continued
Table G lists illustrative compounds which can preferably be used as polymerisable compounds in the LC media in accordance with the present invention.
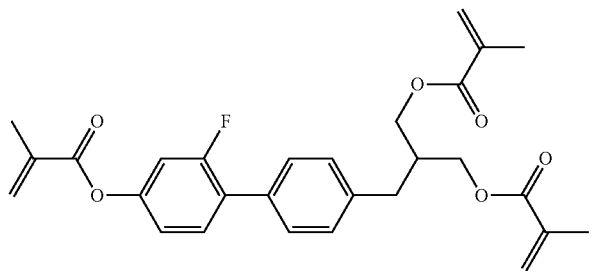 [SMILES: C=C(C)C(=O)OCC(COC(=O)C(=C)C)Cc1ccc(-c2ccc(OC(=O)C(=C)C)cc2F)cc1]
RM-104
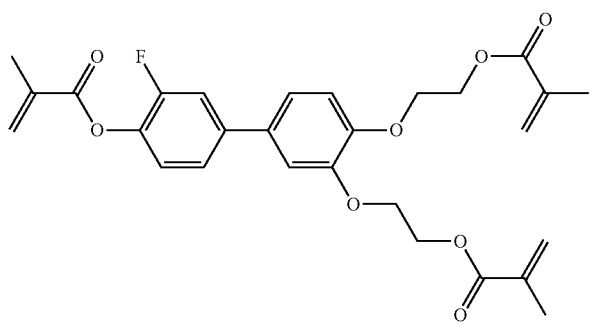 [SMILES: C=C(C)C(=O)OCCOc1ccc(-c2ccc(OC(=O)C(=C)C)c(F)c2)cc1OCCOC(=O)C(=C)C]
RM-105
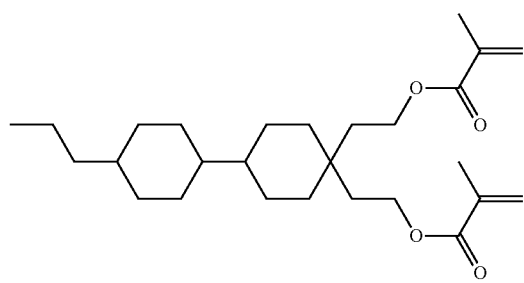 [SMILES: C=C(C)C(=O)OCCC1(CCOC(=O)C(=C)C)CCC(C2CCC(CCC)CC2)CC1]
RM-106
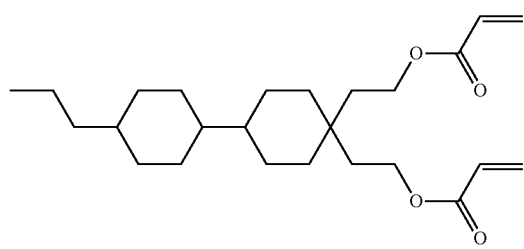 [SMILES: C=CC(=O)OCCC1(CCOC(=O)C=C)CCC(C2CCC(CCC)CC2)CC1]
RM-107
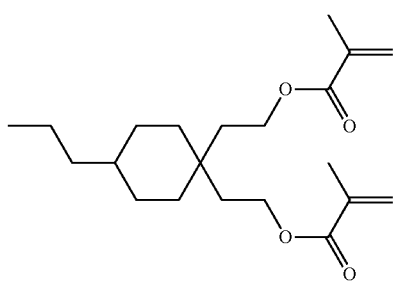 [SMILES: C=C(C)C(=O)OCCC1(CCOC(=O)C(=C)C)CCC(CCC)CC1]
RM-108

TABLE G-continued
Table G lists illustrative compounds which can preferably be used as polymerisable compounds in the LC media in accordance with the present invention.
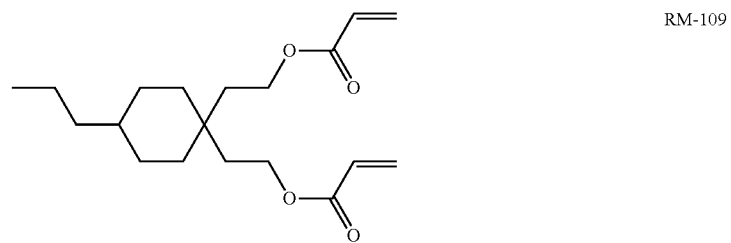
RM-109
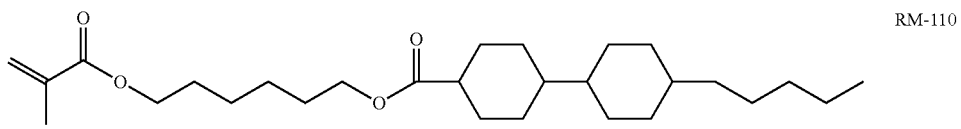
RM-110
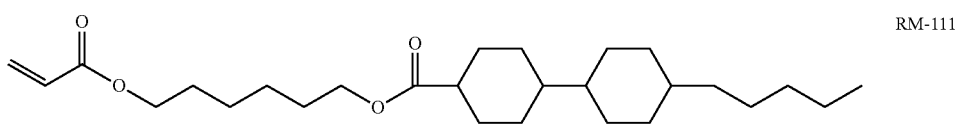
RM-111
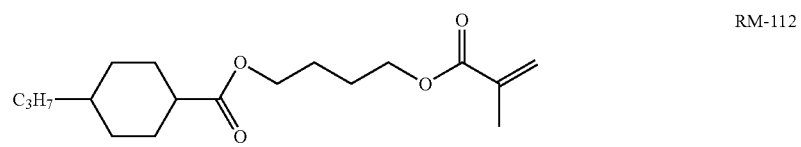
RM-112
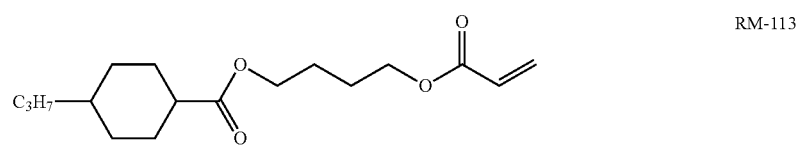
RM-113
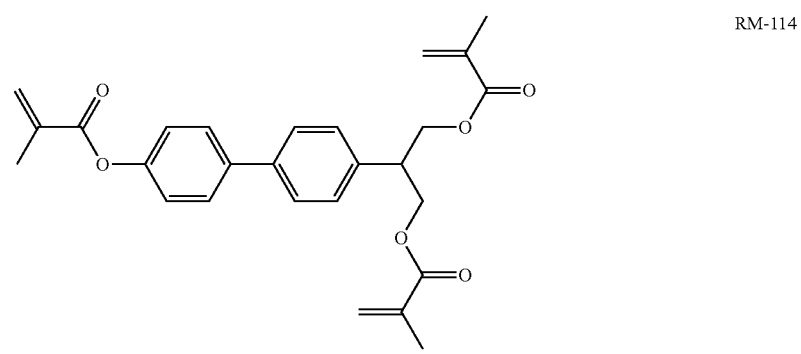
RM-114
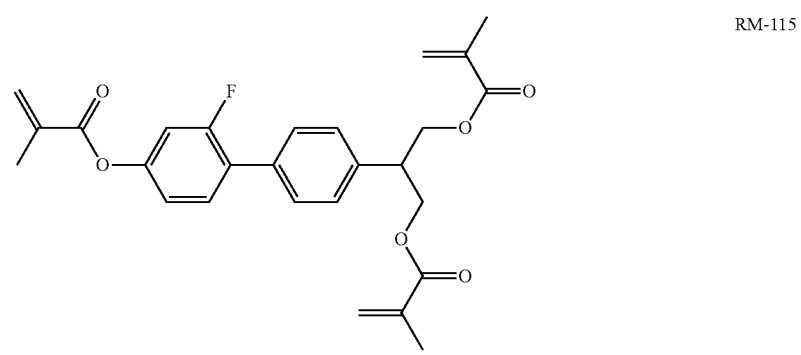
RM-115

TABLE G-continued
Table G lists illustrative compounds which can preferably be used as polymerisable compounds in the LC media in accordance with the present invention.
RM-116
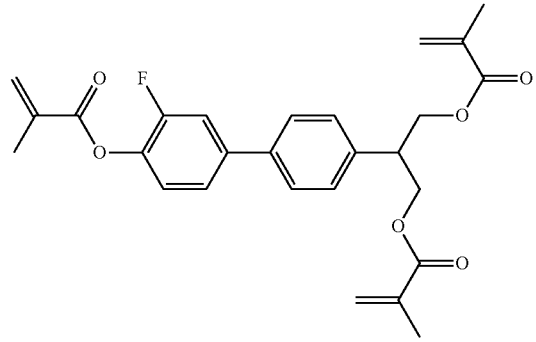 [SMILES: C=C(C)C(=O)OCC(COC(=O)C(=C)C)c1ccc(-c2ccc(OC(=O)C(=C)C)c(F)c2)cc1]
RM-117
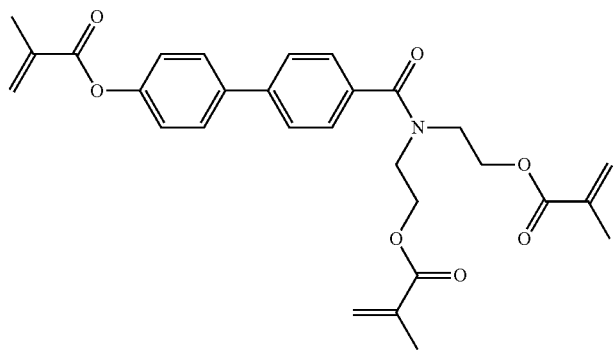 [SMILES: C=C(C)C(=O)OCCN(CCOC(=O)C(=C)C)C(=O)c1ccc(-c2ccc(OC(=O)C(=C)C)cc2)cc1]
RM-118
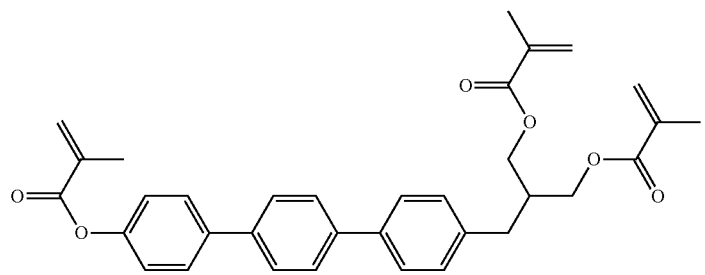 [SMILES: C=C(C)C(=O)OCC(COC(=O)C(=C)C)Cc1ccc(-c2ccc(-c3ccc(OC(=O)C(=C)C)cc3)cc2)cc1]
RM-119
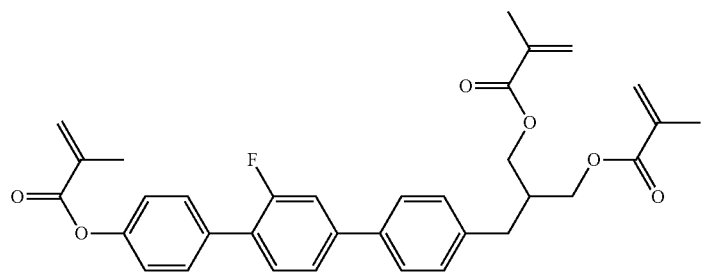

TABLE G-continued
Table G lists illustrative compounds which can preferably be used as polymerisable compounds in the LC media in accordance with the present invention.
RM-120
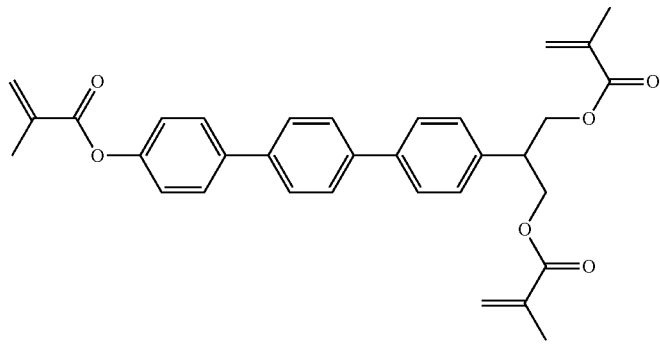 [SMILES: C=C(C)C(=O)OCC(COC(=O)C(=C)C)c1ccc(-c2ccc(-c3ccc(OC(=O)C(=C)C)cc3)cc2)cc1]
RM-121
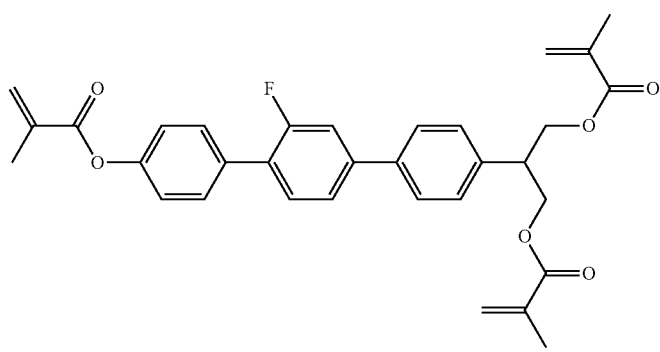
RM-122
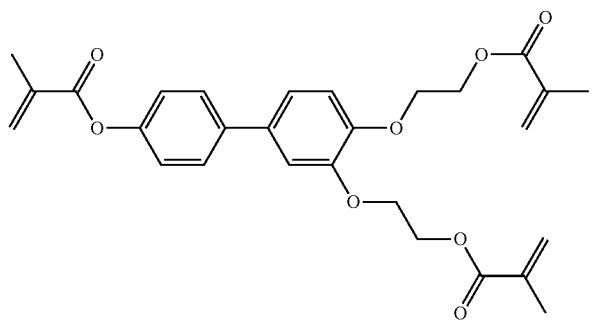 [SMILES: C=C(C)C(=O)OCCOc1ccc(-c2ccc(OC(=O)C(=C)C)cc2)cc1OCCOC(=O)C(=C)C]
RM-123
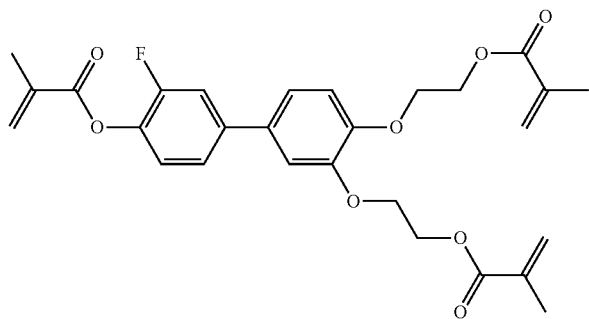 [SMILES: C=C(C)C(=O)OCCOc1ccc(-c2ccc(OC(=O)C(=C)C)c(F)c2)cc1OCCOC(=O)C(=C)C]

TABLE G-continued
Table G lists illustrative compounds which can preferably be used as polymerisable compounds in the LC media in accordance with the present invention.
RM-124
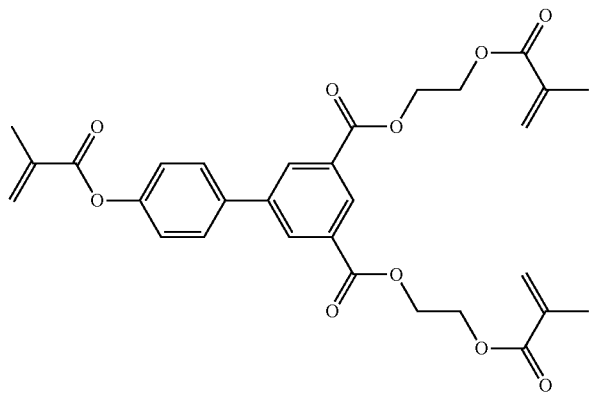 [SMILES: C=C(C)C(=O)OCCOC(=O)c1cc(C(=O)OCCOC(=O)C(=C)C)cc(-c2ccc(OC(=O)C(=C)C)cc2)c1]
RM-125
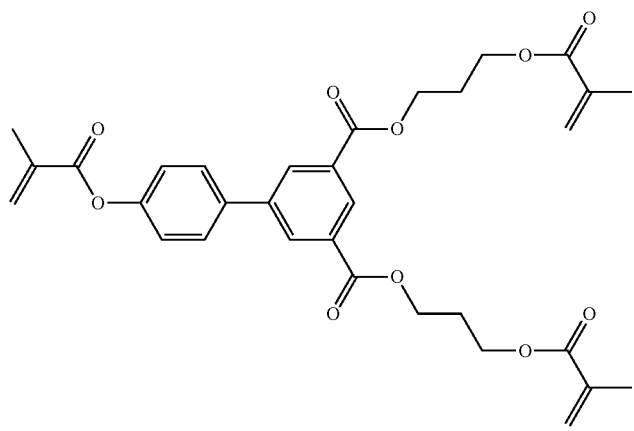 [SMILES: C=C(C)C(=O)OCCCOC(=O)c1cc(C(=O)OCCCOC(=O)C(=C)C)cc(-c2ccc(OC(=O)C(=C)C)cc2)c1]
RM-126
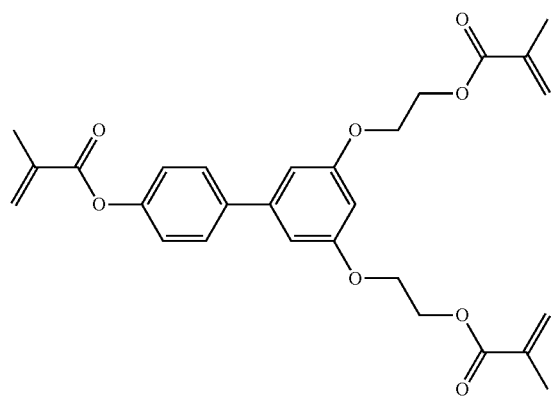 [SMILES: C=C(C)C(=O)OCCOc1cc(OCCOC(=O)C(=C)C)cc(-c2ccc(OC(=O)C(=C)C)cc2)c1]

TABLE G-continued
Table G lists illustrative compounds which can preferably be used as polymerisable compounds in the LC media in accordance with the present invention.
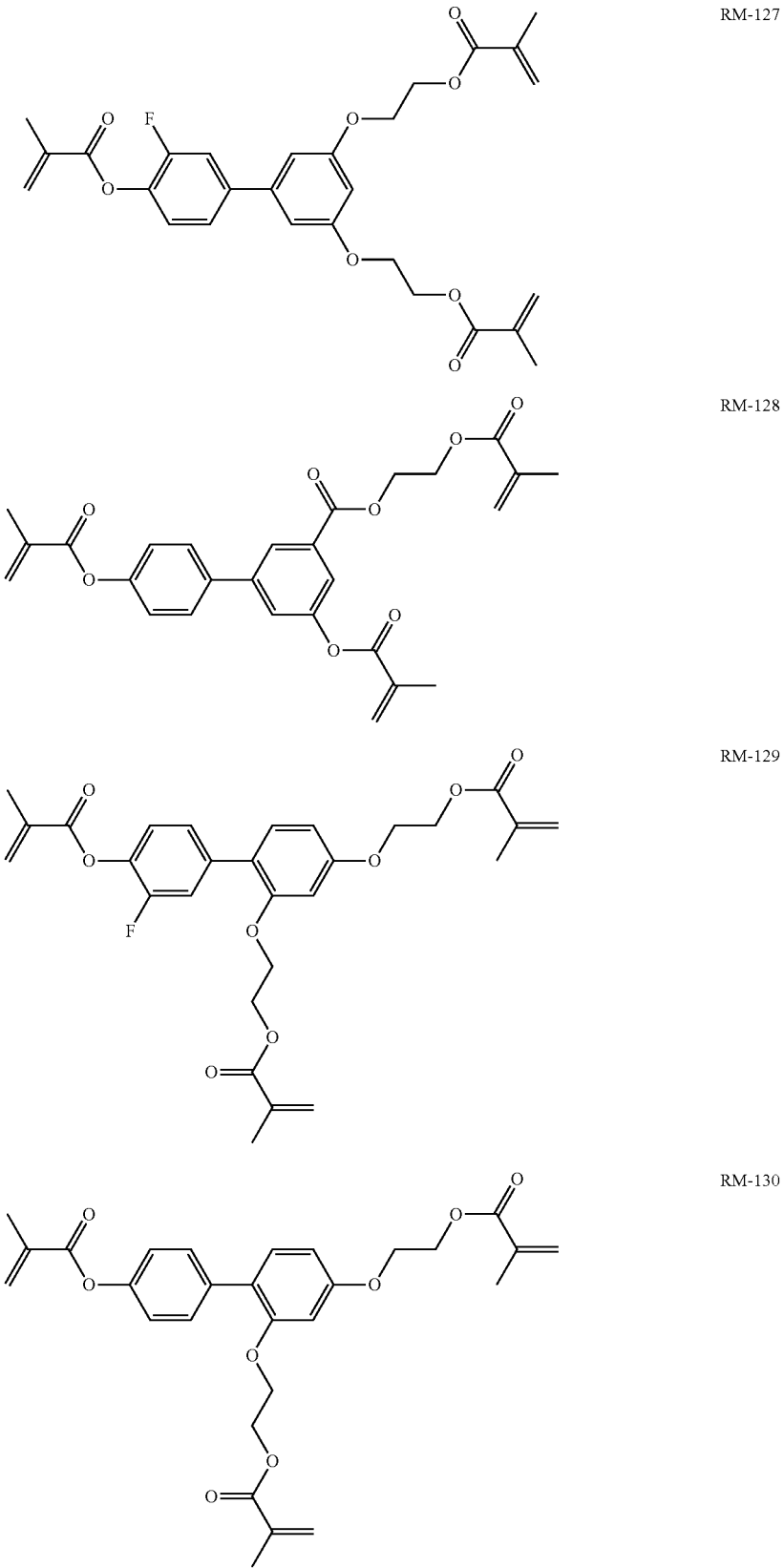

TABLE G-continued
Table G lists illustrative compounds which can preferably be used as polymerisable compounds in the LC media in accordance with the present invention.
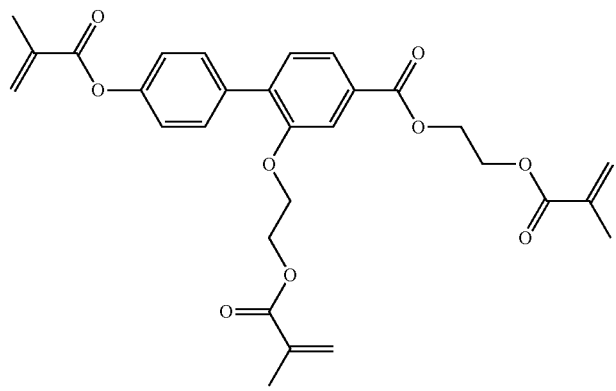 [SMILES: C=C(C)C(=O)OCCOC(=O)c1ccc(-c2ccc(OC(=O)C(=C)C)cc2)c(OCCOC(=O)C(=C)C)c1]
RM-131
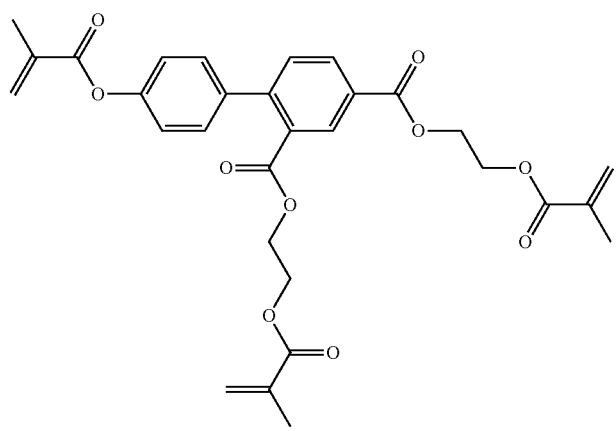 [SMILES: C=C(C)C(=O)OCCOC(=O)c1ccc(-c2ccc(OC(=O)C(=C)C)cc2)c(C(=O)OCCOC(=O)C(=C)C)c1]
RM-132
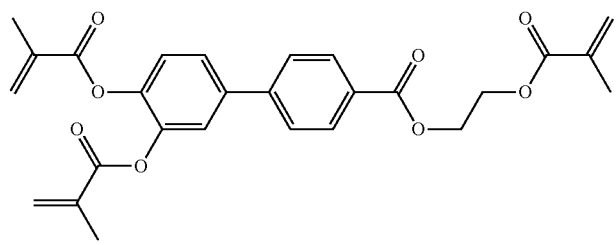 [SMILES: C=C(C)C(=O)OCCOC(=O)c1ccc(-c2ccc(OC(=O)C(=C)C)c(OC(=O)C(=C)C)c2)cc1]
RM-133
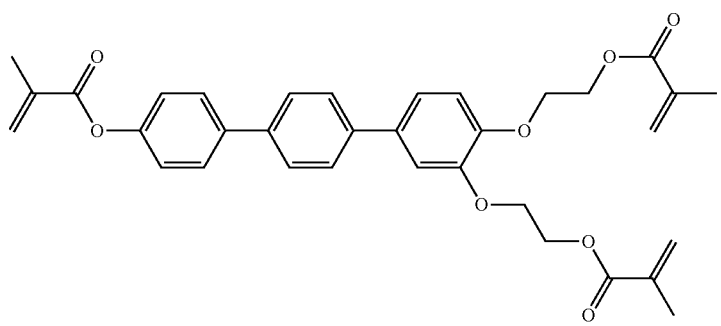 [SMILES: C=C(C)C(=O)OCCOc1ccc(-c2ccc(-c3ccc(OC(=O)C(=C)C)cc3)cc2)cc1OCCOC(=O)C(=C)C]
RM-134

TABLE G-continued
Table G lists illustrative compounds which can preferably be used as polymerisable compounds in the LC media in accordance with the present invention.
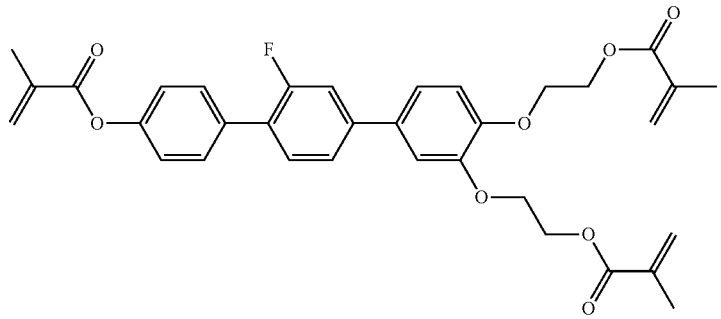 [SMILES: C=C(C)C(=O)OCCOc1ccc(-c2ccc(-c3ccc(OC(=O)C(=C)C)cc3)c(F)c2)cc1OCCOC(=O)C(=C)C]
RM-135
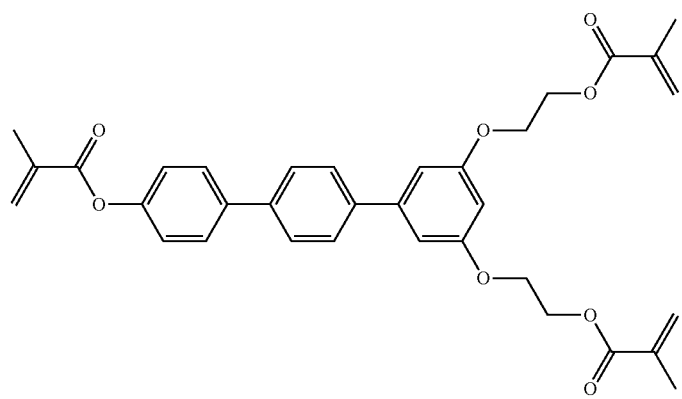 [SMILES: C=C(C)C(=O)OCCOc1cc(OCCOC(=O)C(=C)C)cc(-c2ccc(-c3ccc(OC(=O)C(=C)C)cc3)cc2)c1]
RM-136
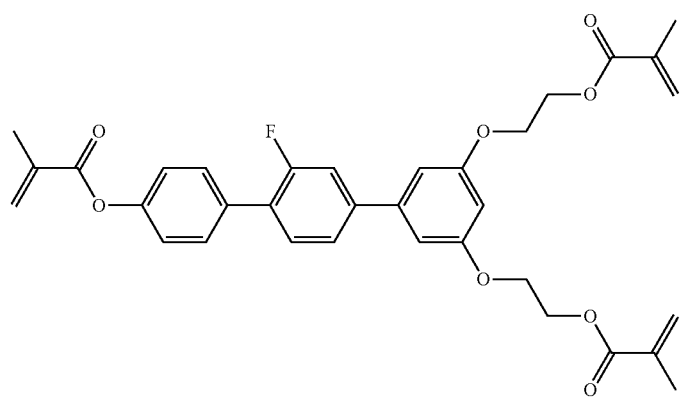 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-137
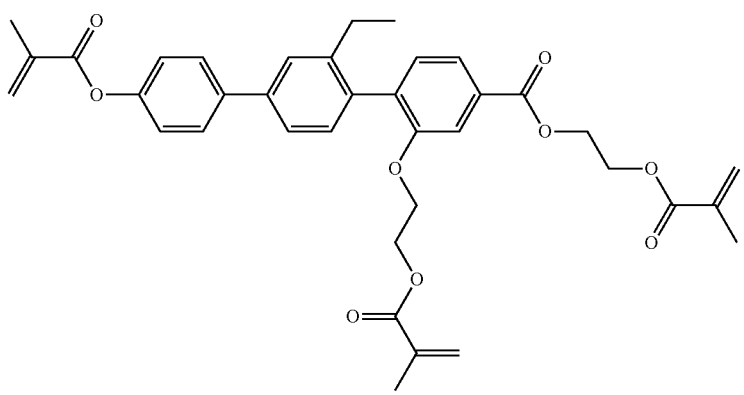 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-138

In a preferred embodiment of the present invention, the mesogenic media comprise one or more compounds selected from the group of the compounds from Table G.

EXAMPLES

The following examples are intended to explain the invention without limiting it. Above and below, percentage data denote percent by weight. All temperatures are indicated in degrees Celsius. Furthermore, C=crystalline state, N=nematic phase, Sm=smectic phase and I=isotropic phase. The data between these symbols represent the transition temperatures. Δn denotes the optical anisotropy (589 nm, 20° C.), Δε denotes the dielectric anisotropy (1 kHz, 20° C.) and $\gamma_1$ denotes the rotational viscosity (in the unit mPa·s).

Physical, physicochemical or electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt. Above and below, Δn denotes the optical anisotropy (589 nm, 20° C.) and Δε denotes the dielectric anisotropy (1 kHz, 20° C.). The dielectric anisotropy Δε is determined at 20° C. and 1 kHz. The optical anisotropy Δn is determined at 20° C. and a wavelength of 589.3 nm.

The Δε and Δn values and the rotational viscosity ($\gamma_1$) of the compounds according to the invention are obtained by linear extrapolation from liquid-crystalline mixtures consisting of 5 to 10% of the respective compound according to the invention and 90-95% of the commercially available liquid-crystal mixture ZLI-4792 (for Δε>1, Δn, $\gamma_1$) or ZLI-2857 (for Δε<1) (mixtures, Merck KGaA, Darmstadt).

Synthesis Examples

Synthesis Example 1

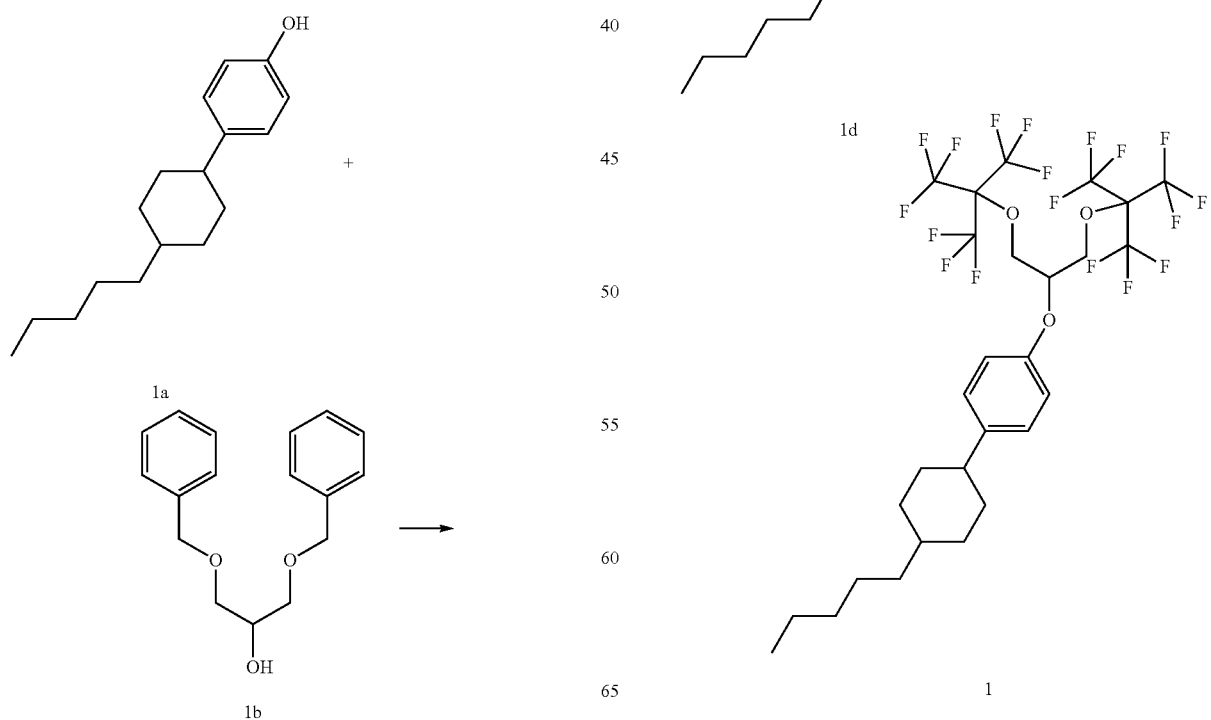

1c: Diisopropyl azodicarboxylate (4.70 ml, 23.9 mmol) is added dropwise to a solution of 1a (5.00 g, 20.3 mmol), 1b (5.53 g, 20.3 mmol) and triphenylphosphine (6.04 g, 23.0 mmol) in 50 ml of dry tetrahydrofuran (THF), during which the reaction temperature is held below 30° C. The reaction mixture is stirred overnight at room temperature. After the solvent has been separated off, the oily residue is purified by means of flash chromatography on silica gel with heptane/ethyl acetate, giving 1c as a colourless oil (5.8 g).

1d: Palladium (5%) on active carbon (2.5 g) is added to a solution of 1c (5.2 g, 10.4 mmol) in 50 ml of THF, and the mixture is hydrogenated under hydrogen for 19 h. The catalyst is filtered off. After the solvent has been removed, the residue is purified by means of flash chromatography on silica gel with dichloromethane/methanol, giving 1d as a white solid (2.6 g).

1: Diisopropyl azodicarboxylate (1.87 ml, 9.6 mmol) is added dropwise at 0° C. to a solution of 1d (1.03 g, 3.2 mmol) and triphenylphosphine (2.52 g, 9.6 mmol) in 25 ml of dry THF. After the mixture has been stirred for 30 min, perfluoro-tert-butanol (2.27 g, 9.6 mmol) is added, and the mixture is stirred overnight at 45° C. After the solvent has been separated off, the residue is purified by means of flash chromatography on silica gel with heptane/ethyl acetate, giving 1 as white crystals (1.0 g, m.p. 41° C.).

Synthesis Example 2

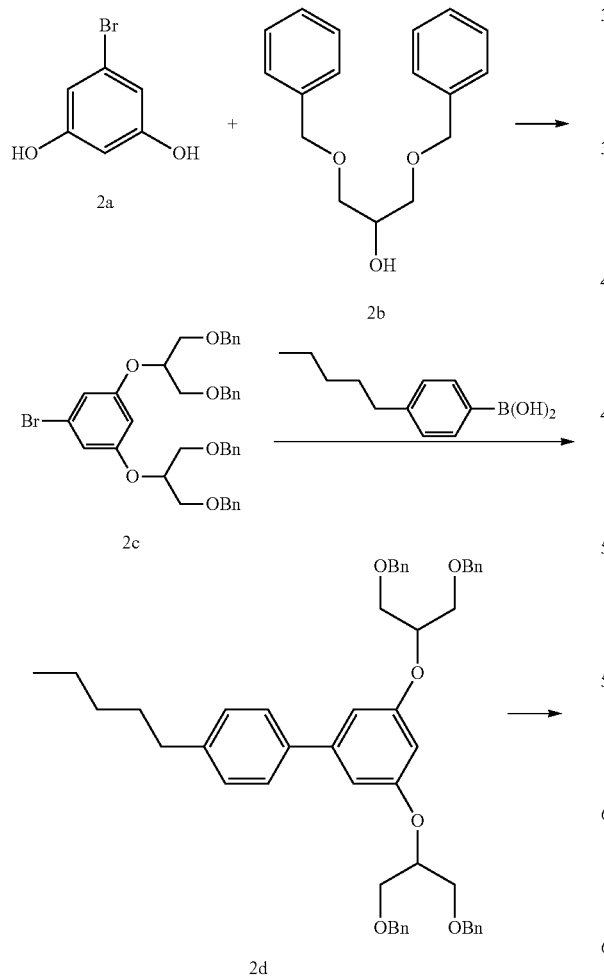

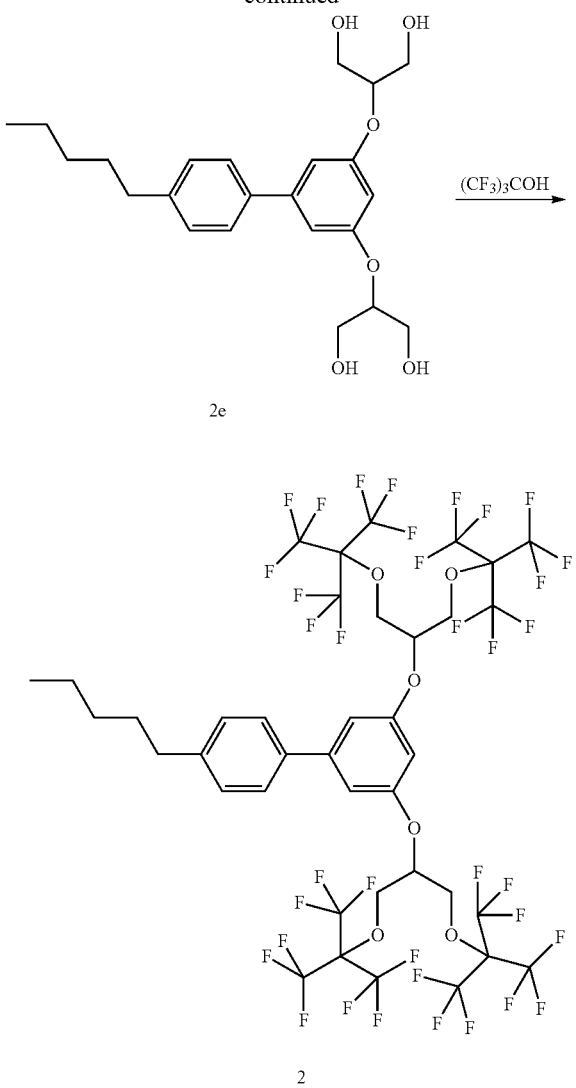

2c: Diisopropyl azodicarboxylate (3.70 ml, 18.8 mmol) is added dropwise to a solution of 2a (2.50 g, 13.5 mmol), 2b (7.60 g, 27.0 mmol) and triphenylphosphine (8.00 g, 30.0 mmol) in 60 ml of THF, during which the reaction temperature is kept below 30° C. The reaction mixture is stirred overnight at room temperature. After the solvent has been separated off, the oily residue is purified by means of flash chromatography on silica gel with heptane/ethyl acetate, giving 2d as a colourless oil (2.1 g).

2d: Sodium carbonate (0.9 g, 8.5 mmol) and 4 ml of distilled water are added to a solution of 2c (2.00 g, 2.9 mmol) and 4-pentylphenylboronic acid (0.60 g, 3.1 mmol) in 20 ml of 1,4-dioxane. After the mixture has been degassed using argon, [1,1'-bis(diphenylphosphine)ferrocene]palladium(II) dichloride (0.063 g, 0.09 mmol) is added. The reaction mixture is heated to reflux and stirred overnight. After conventional work-up, the collected organic phases are dried over sodium sulfate. After removal of the solvent, the residue is purified by means of flash chromatography on silica gel with heptane/ethyl acetate, giving 2d (2.0 g).

2e: Palladium (5%) on active carbon (0.5 g) is added to a solution of 2d (2.0 g, 2.6 mmol) in 20 ml of THF, and the mixture is hydrogenated under hydrogen for 16 h. The catalyst is filtered off. After removal of the solvent, the residue is purified by means of flash chromatography on silica gel with dichloromethane/methanol, giving 2e as a colourless oil (1.0 g).

2: Diisopropyl azodicarboxylate (2.43 ml, 12.4 mmol) is added dropwise at 0° C. to a solution of 2e (1.0 g, 2.5 mmol) and triphenylphosphine (2.72 ml, 12.4 mmol) in 50 ml of dry THF. After the mixture has been stirred for 30 min, per-fluoro-tert-butanol (3.5 g, 14.8 mmol) is added, and the mixture is stirred overnight at 45° C. After the solvent has been separated off, the residue is purified by means of flash chromatography on silica gel with heptane/ethyl acetate. Recrystallisation of the crude product obtained from ethanol gives the product 2 as white crystals (1.0 g, melting point 46° C.).

The following are prepared analogously to Example 1 or 2:

Synthesis Example 3

Synthesis Example 4

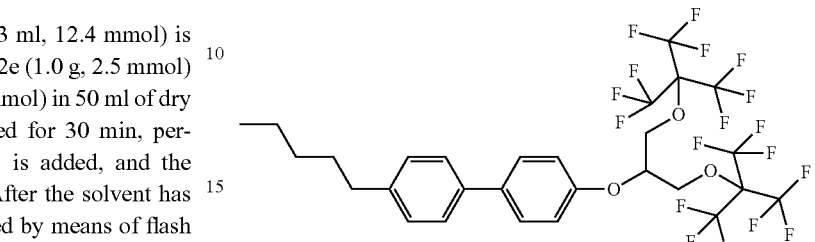

Synthesis Example 5

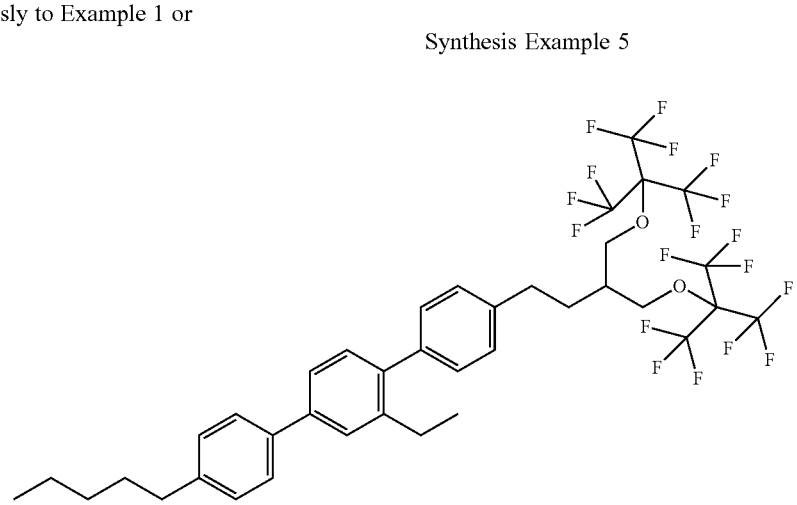

Melting point 40° C. (C 40 SmA (23) I)

Synthesis Example 6

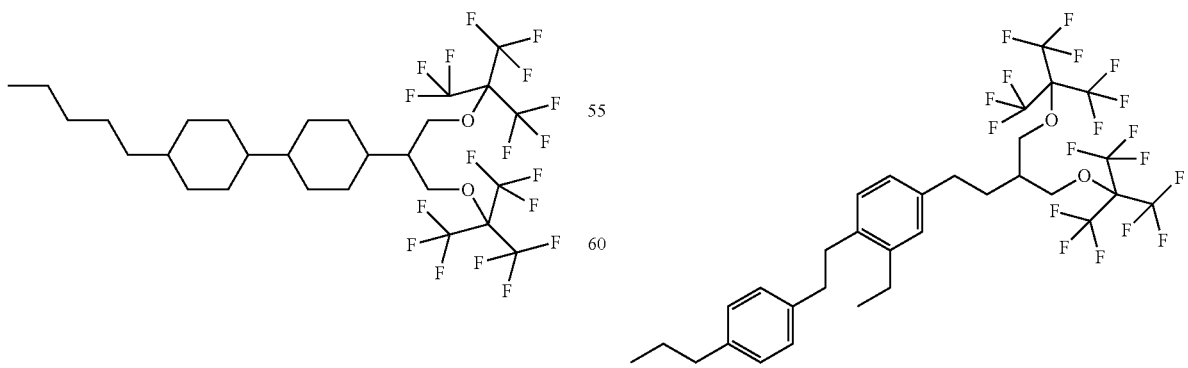

Melting point 65° C. (C 65 I).

Melting point 36° C. (C 36 I)

Synthesis Example 7
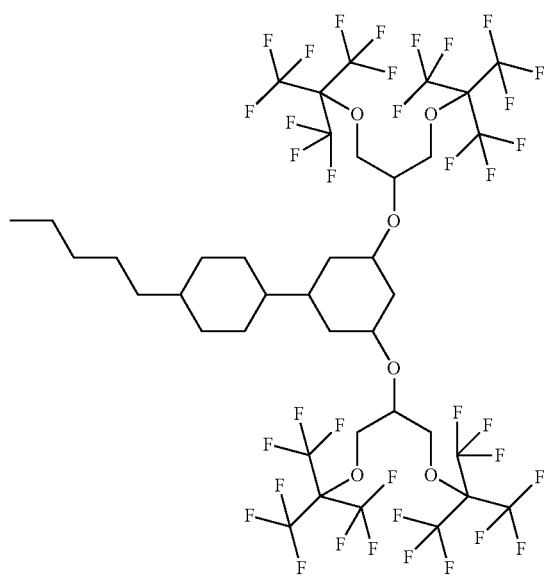 [SMILES: CCCCCC1CCC(C2CC(OC(COC(C(F)(F)F)(C(F)(F)F)C(F)(F)F)COC(C(F)(F)F)(C(F)(F)F)C(F)(F)F)CC(OC(COC(C(F)(F)F)(C(F)(F)F)C(F)(F)F)COC(C(F)(F)F)(C(F)(F)F)C(F)(F)F)C2)CC1]
Mixture of the isomers prepared by catalytic hydrogenation of the product from Synthesis Example 2. Oil (main fraction: Tg−38° C. I)
Synthesis Example 8
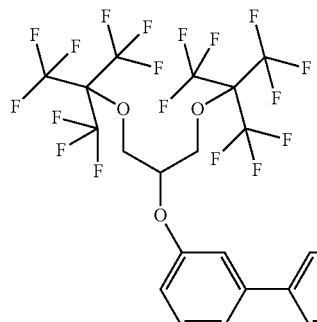
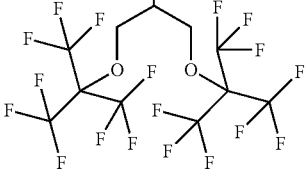
Oil (Tg −19° C. I)
Synthesis Example 9
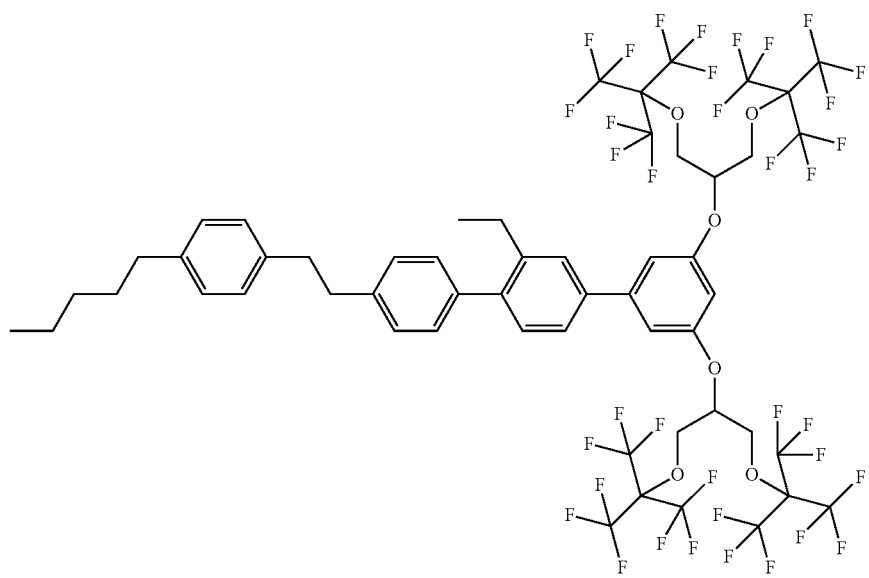 [SMILES: CCCCCc1ccc(CCc2ccc(-c3ccc(-c4cc(OC(COC(C(F)(F)F)(C(F)(F)F)C(F)(F)F)COC(C(F)(F)F)(C(F)(F)F)C(F)(F)F)cc(OC(COC(C(F)(F)F)(C(F)(F)F)C(F)(F)F)COC(C(F)(F)F)(C(F)(F)F)C(F)(F)F)c4)cc3CC)cc2)cc1]

Synthesis Example 10
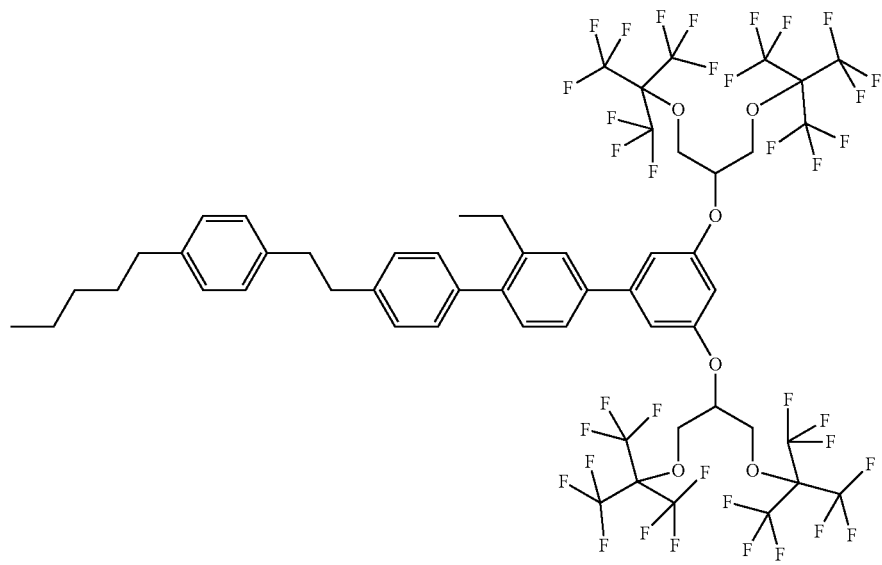 [SMILES: CCCCCc1ccc(CCc2ccc(-c3ccc(-c4cc(OC(COC(C(F)(F)F)(C(F)(F)F)C(F)(F)F)COC(C(F)(F)F)(C(F)(F)F)C(F)(F)F)cc(OC(COC(C(F)(F)F)(C(F)(F)F)C(F)(F)F)COC(C(F)(F)F)(C(F)(F)F)C(F)(F)F)c4)cc3CC)cc2)cc1]
Synthesis Example 11
Synthesis Example 12
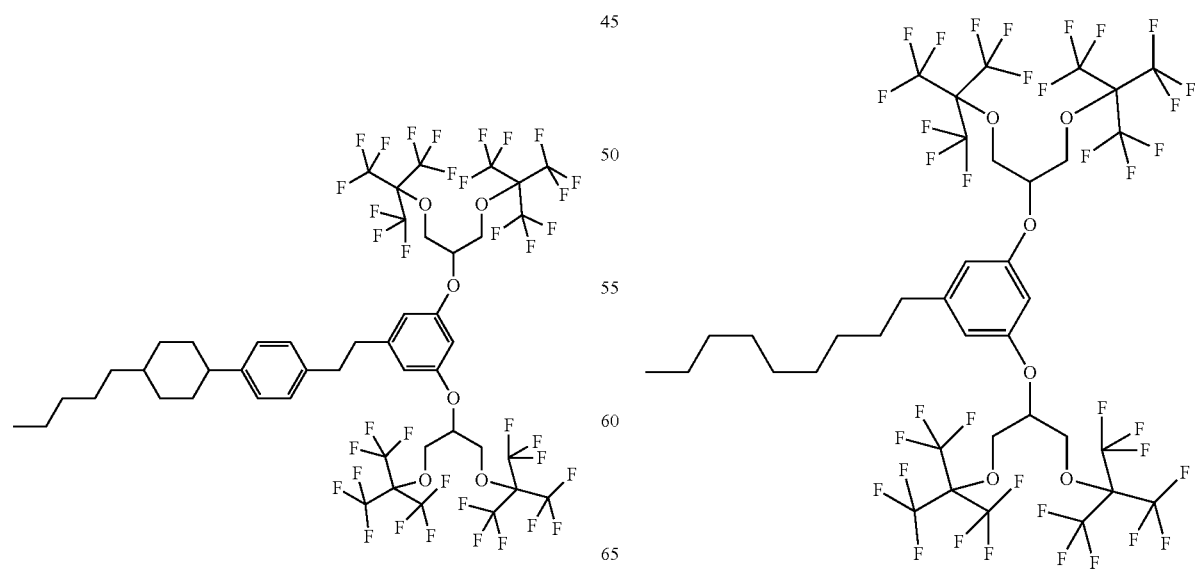

Synthesis Example 13
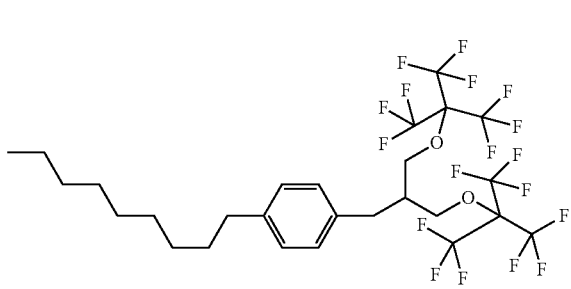 [SMILES: CCCCCCCCCc1ccc(CC(COC(C(F)(F)F)(C(F)(F)F)C(F)(F)F)COC(C(F)(F)F)(C(F)(F)F)C(F)(F)F)cc1]
Synthesis Example 14
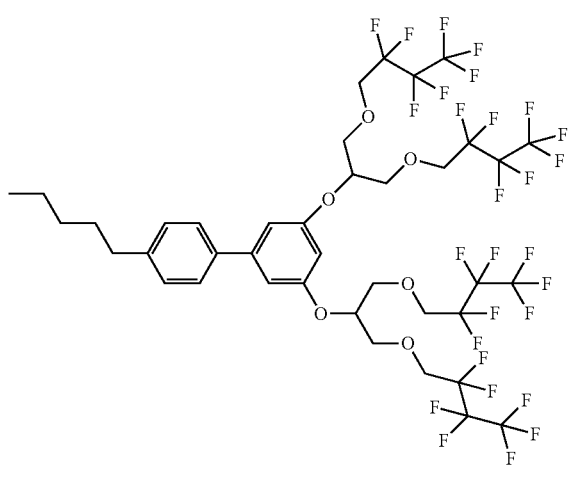 [SMILES: CCCCCc1ccc(-c2cc(OC(COCC(F)(F)C(F)(F)C(F)(F)F)COCC(F)(F)C(F)(F)C(F)(F)F)cc(OC(COCC(F)(F)C(F)(F)C(F)(F)F)COCC(F)(F)C(F)(F)C(F)(F)F)c2)cc1]
Oil.
¹H NMR (500 MHz, chloroform-d) δ 7.55-7.41 (m, 2H), 7.27 (dd, J=7.7, 5.9 Hz, 2H), 6.84 (d, J=2.2 Hz, 2H), 6.56 (t, J=2.2 Hz, 1H), 4.59 (p, J=4.8 Hz, 2H), 4.15-3.97 (m, 8H), 3.95-3.85 (m, 8H), 2.67 (dd, J=8.7, 6.9 Hz, 2H), 1.74-1.63 (m, 2H), 1.46-1.34 (m, 4H), 0.97-0.87 (m, 3H).
Synthesis Example 15
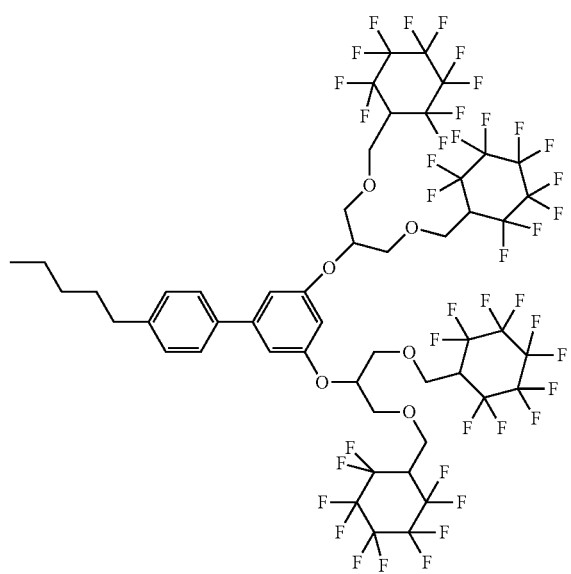 [SMILES: CCCCCc1ccc(-c2cc(OC(COCC3C(F)(F)C(F)(F)C(F)(F)C(F)(F)C3(F)F)COCC3C(F)(F)C(F)(F)C(F)(F)C(F)(F)C3(F)F)cc(OC(COCC3C(F)(F)C(F)(F)C(F)(F)C(F)(F)C3(F)F)COCC3C(F)(F)C(F)(F)C(F)(F)C(F)(F)C3(F)F)c2)cc1]
Synthesis Example 16
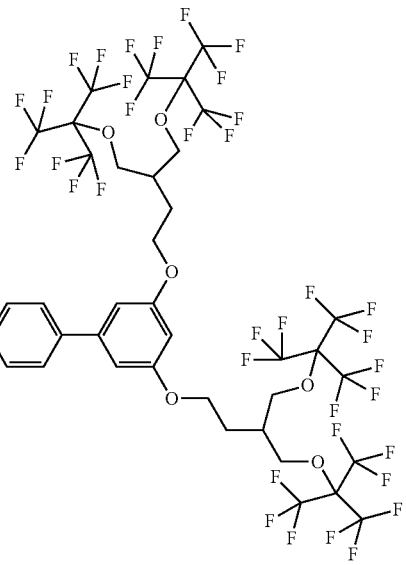
Synthesis Example 17
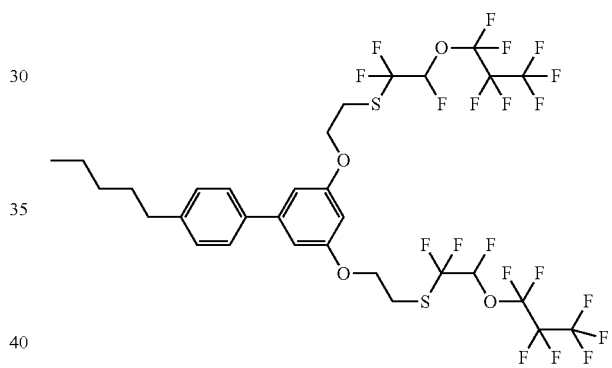
Oil.
¹H NMR (chloroform-d) δ 7.55-7.45 (m, 2H), 7.27 (dd, J=7.6, 5.8 Hz, 2H), 6.77 (d, J=2.2 Hz, 2H), 6.45 (t, J=2.2 Hz, 1H), 6.04 (dt, J=54.4, 3.8 Hz, 2H), 4.27 (t, J=6.5 Hz, 4H), 3.32 (t, J=6.4 Hz, 4H), 2.71-2.61 (m, 2H), 1.73-1.62 (m, 2H), 1.46-1.20 (m, 4H), 0.93 (td, J=6.7, 4.3 Hz, 3H).
Synthesis Example 18
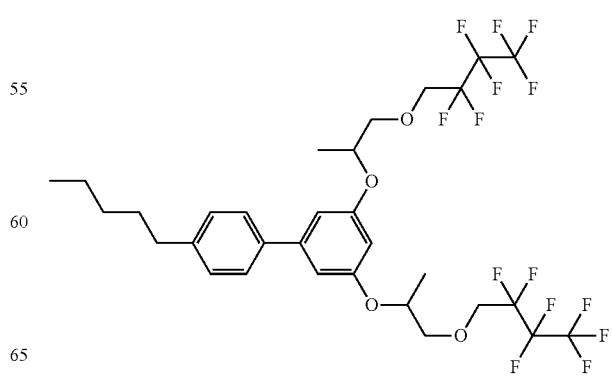

Oil.

$^1$H NMR (chloroform-d) δ 7.43-7.34 (m, 2H), 7.17 (dd, J=9.0, 7.1 Hz, 2H), 6.67 (d, J=2.1 Hz, 2H), 6.39 (t, J=2.2 Hz, 1H), 4.51 (pd, J=6.2, 4.5 Hz, 2H), 3.98 (t, J=13.7 Hz, 4H), 3.70 (qd, J=10.5, 5.0 Hz, 4H), 2.63-2.52 (m, 2H), 1.65-1.50 (m, 2H), 1.28 (app t, J=6.8 Hz, 10H), 0.88-0.79 (m, 3H).

Synthesis Example 19

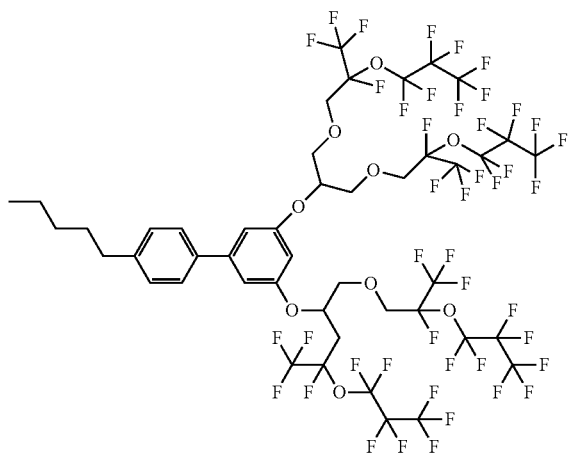 [SMILES: CCCCCc1ccc(-c2cc(OC(COCC(F)(OC(F)(F)C(F)(F)C(F)(F)F)C(F)(F)F)COCC(F)(OC(F)(F)C(F)(F)C(F)(F)F)C(F)(F)F)cc(OC(COCC(F)(OC(F)(F)C(F)(F)C(F)(F)F)C(F)(F)F)CC(F)(OC(F)(F)C(F)(F)C(F)(F)F)C(F)(F)F)c2)cc1]

Oil.

$^1$H NMR (chloroform-d) δ 7.51-7.40 (m, 2H), 7.27 (d, J=8.0 Hz, 2H), 6.80 (d, J=2.1 Hz, 2H), 6.48 (t, J=2.3 Hz, 1H), 4.56 (p, J=4.8 Hz, 2H), 4.18-4.04 (m, 8H), 3.93-3.81 (m, 8H), 2.73-2.62 (m, 2H), 1.72-1.61 (m, 2H), 1.44-1.33 (m, 4H), 0.97-0.86 (m, 3H).

Synthesis Example 20

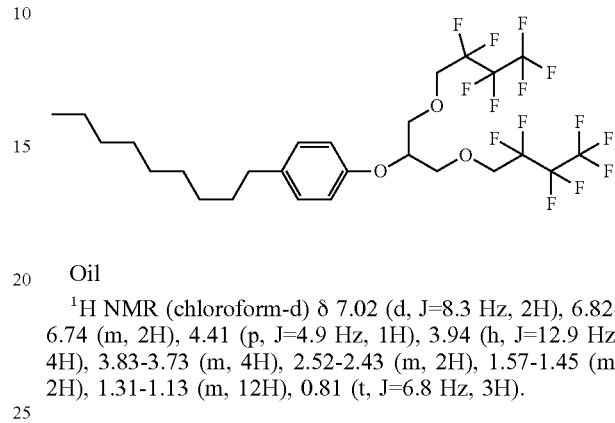

Oil $^1$H NMR (chloroform-d) δ 7.02 (d, J=8.3 Hz, 2H), 6.82-6.74 (m, 2H), 4.41 (p, J=4.9 Hz, 1H), 3.94 (h, J=12.9 Hz, 4H), 3.83-3.73 (m, 4H), 2.52-2.43 (m, 2H), 1.57-1.45 (m, 2H), 1.31-1.13 (m, 12H), 0.81 (t, J=6.8 Hz, 3H).

Synthesis Example 21

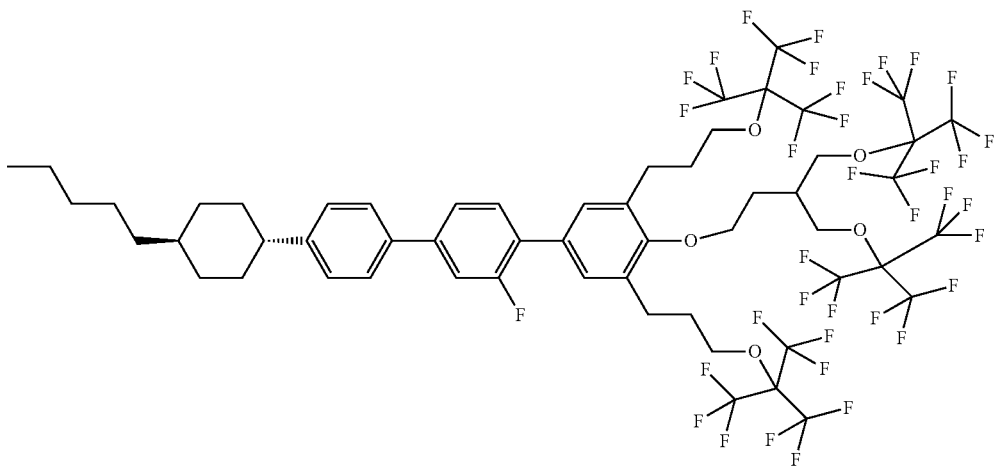 [SMILES: CCCCC[C@H]1CC[C@H](c2ccc(-c3ccc(-c4cc(CCCOC(C(F)(F)F)(C(F)(F)F)C(F)(F)F)c(OCCC(COC(C(F)(F)F)(C(F)(F)F)C(F)(F)F)COC(C(F)(F)F)(C(F)(F)F)C(F)(F)F)c(CCCOC(C(F)(F)F)(C(F)(F)F)C(F)(F)F)c4)c(F)c3)cc2)CC1]

Melting point 92° C. (C 92 I).

Use examples: Liquid-crystal mixtures with additive

The following additives are added to the liquid-crystal media:

| Additive No. | Structure of the additive |
|---|---|
| 1 | |

-continued
| Additive No. | Structure of the additive |
|---|---|
| 2 | 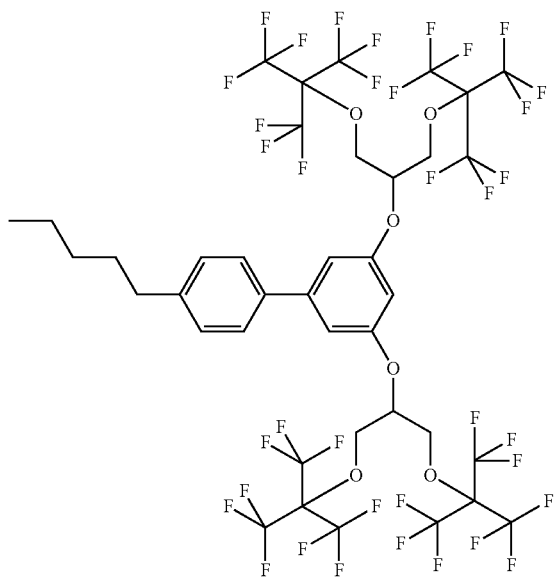 [SMILES: CCCCCc1ccc(-c2cc(OC(COC(C(F)(F)F)(C(F)(F)F)C(F)(F)F)COC(C(F)(F)F)(C(F)(F)F)C(F)(F)F)cc(OC(COC(C(F)(F)F)(C(F)(F)F)C(F)(F)F)COC(C(F)(F)F)(C(F)(F)F)C(F)(F)F)c2)cc1] |
| 3 | 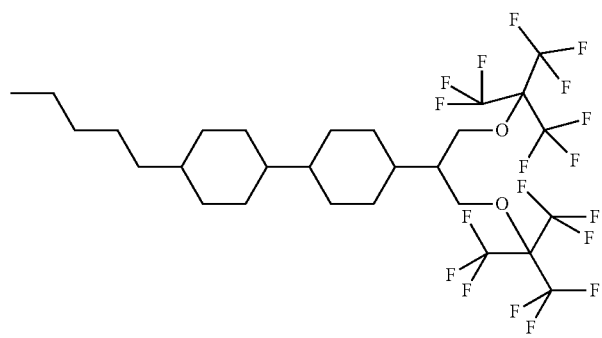 [SMILES: CCCCCC1CCC(C2CCC(C(COC(C(F)(F)F)(C(F)(F)F)C(F)(F)F)COC(C(F)(F)F)(C(F)(F)F)C(F)(F)F)CC2)CC1] |
| 4 | 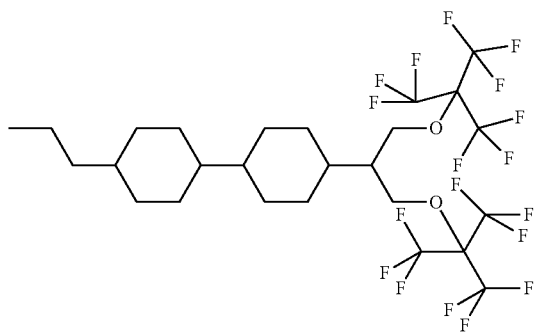 [SMILES: CCCC1CCC(C2CCC(C(COC(C(F)(F)F)(C(F)(F)F)C(F)(F)F)COC(C(F)(F)F)(C(F)(F)F)C(F)(F)F)CC2)CC1] |

-continued

| Additive No. | Structure of the additive |
|---|---|
| 5 | 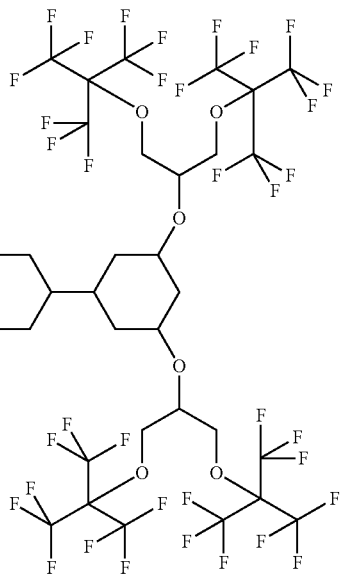 |

The following polymerisable compound is used:

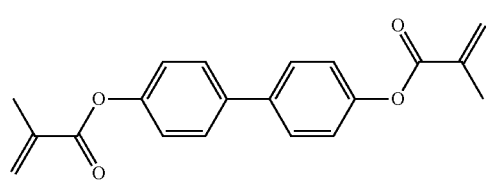

RM-1

The base mixtures (hosts) used are the following liquid-crystal media H1 to H15 (figures in % by weight).

| H1: Nematic host mixture ($\Delta\varepsilon < 0$) | |
|---|---|
| CC-3-V | 15% |
| CC-3-V1 | 9.0% |
| CC-2-3 | 8.0% |
| CC-3-4 | 7.5% |
| CCY-3-O2 | 10% |
| CCY-5-O2 | 8.0% |
| CPY-2-O2 | 3.0% |
| CPY-3-O2 | 8.5% |
| CY-3-O2 | 7.0% |
| PY-3-O2 | 16% |
| PYP-2-3 | 8% |
| H2: Nematic host mixture ($\Delta\varepsilon < 0$) | |
| CC-3-V1 | 8% |
| CC-2-3 | 18% |
| CC-3-4 | 4% |
| CC-3-5 | 7% |
| CCP-3-1 | 5% |
| CCY-3-O2 | 12.5% |
| CPY-2-O2 | 8% |
| CPY-3-O2 | 11% |
| CY-3-O2 | 15.5% |
| PY-3-O2 | 11% |

| H3: Nematic host mixture ($\Delta\varepsilon < 0$) | |
|---|---|
| CPP-3-2 | 5.5% |
| CCP-3-1 | 8.0% |
| CCY-3-O1 | 10% |
| CCY-3-O2 | 8.5% |
| CPY-3-O2 | 11% |
| CC-3-V1 | 9.0% |
| CC-3-O1 | 6.0% |
| CY-3-O2 | 11% |
| CP-3-O1 | 20% |
| PY-3-O2 | 11% |
| H4: Nematic host mixture ($\Delta\varepsilon < 0$) | |
| CC-3-V | 36.5% |
| CC-3-V1 | 2.0% |
| CCY-3-O1 | 8.0% |
| CCY-3-O2 | 6.0% |
| CCY-4-O2 | 2.5% |
| CLY-3-O2 | 8.0% |
| CLY-3-O3 | 2.0% |
| CPY-2-O2 | 10% |
| CPY-3-O2 | 3.0% |
| CY-3-O2 | 5.5% |
| PY-3-O2 | 13% |
| PY-1-O4 | 3.5% |
| H5: Nematic host mixture ($\Delta\varepsilon < 0$) | |
| B-2-O-O5 | 4.0% |
| CPP-3-2 | 8.0% |
| CC-3-V1 | 9.0% |
| CC-3-O1 | 2.0% |
| CC-3-4 | 8.0% |
| CC-3-5 | 7.0% |
| CCP-3-1 | 8.0% |
| CCP-V2-1 | 5.0% |
| CCY-3-O2 | 10.5% |
| CLY-3-O2 | 1.0% |
| CPY-3-O2 | 2.5% |
| CY-3-O2 | 11.5% |
| CP-3-O1 | 5.5% |
| PY-3-O2 | 18% |

| H6: Nematic host mixture (Δε < 0) | |
|---|---|
| B(S)-20-O5 | 4.0% |
| B(S)-20-O4 | 3.0% |
| CPP-3-2 | 8.0% |
| CC-3-V1 | 9.0% |
| CC-3-O1 | 2.0% |
| CC-3-4 | 8.0% |
| CC-3-5 | 7.0% |
| CCP-3-1 | 11% |
| CCP-V2-1 | 5.0% |
| CCY-3-O2 | 7.0% |
| CLY-3-O2 | 1.0% |
| CY-3-O2 | 13% |
| CP-3-O1 | 5.5% |
| PY-3-O2 | 16.5% |

| H7: Nematic host mixture (Δε > 0) | |
|---|---|
| APUQU-2-F | 2.0% |
| APUQU-3-F | 5.0% |
| CPU-2-F | 5.0% |
| CPU-3-F | 10% |
| CPPC-3-3 | 4.0% |
| CC-3-V1 | 6.0% |
| CC-5-V | 8.0% |
| CC-3-4 | 8.0% |
| CCGU-3-F | 9.0% |
| CCP-3-OCF3 | 9.0% |
| CCP-3-1 | 4.0% |
| CCZPC-3-3 | 3.5% |
| CP-3-O1 | 10% |
| PGUQU-3-F | 4.0% |
| PPGU-3-F | 1.0% |
| PUQU-3-F | 11.5% |

| H8: Nematic host mixture (Δε < 0) | |
|---|---|
| B-2-O-O5 | 4.0% |
| CPP-3-2 | 8.0% |
| CC-3-V1 | 9.0% |
| CC-3-O1 | 2.0% |
| CC-3-4 | 8.0% |
| CC-3-5 | 7.0% |
| CCP-3-1 | 8.0% |
| CCP-V2-1 | 5.0% |
| CCY-3-O2 | 10.5% |
| CLY-3-O2 | 1.0% |
| CPY-3-O2 | 2.5% |
| CY-3-O2 | 11.5% |
| CP-3-O1 | 5.5% |
| PY-3-O2 | 18% |

| H9: Nematic host mixture (Δε > 0) | |
|---|---|
| APUQU-2-F | 6.0% |
| APUQU-3-F | 8.0% |
| CDUQU-3-F | 10% |
| DGUQU-4-F | 4.0% |
| DPGU-4-F | 5.0% |
| PGUQU-3-F | 3.0% |
| PGUQU-4-F | 7.0% |
| CCQU-3-F | 9.0% |
| CC-3-2V1 | 10% |
| CC-3-V | 24.5% |
| CC-3-V1 | 9.5% |
| CCP-3-OCF3 | 4.0% |

| H10: Nematic host mixture (Δε > 0) | |
|---|---|
| CC-3-V | 32% |
| CC-3-V1 | 11% |
| CC-3-2V1 | 4.5% |
| PP-1-2V1 | 2.0% |
| CCP-3-OCF3 | 7.5% |
| CCP-5-OCF3 | 1.5% |
| PUQU-3-F | 1.5% |
| APUQU-2-F | 7.0% |
| APUQU-3-F | 7.0% |
| PGUQU-3-F | 3.0% |
| PGUQU-4-F | 8.0% |
| PGUQU-5-F | 2.0% |
| DPGU-4-F | 5.0% |
| DGUQU-4-F | 8.0% |

| H11: Nematic host mixture (Δε > 0) | |
|---|---|
| CC-3-V | 42% |
| CC-3-V1 | 5.5% |
| CCP-V-1 | 4.0% |
| CCP-3-OCF3 | 7.0% |
| PGP-2-2V | 6.5% |
| APUQU-2-F | 3.0% |
| APUQU-3-F | 8.0% |
| PGUQU-3-F | 4.0% |
| CPGU-3-OT | 5.0% |
| CPY-3-O2 | 3.0% |
| CY-3-O2 | 9.0% |
| PYP-2-3 | 3.0% |

| H12: Nematic host mixture (Δε > 0) | |
|---|---|
| CC-3-V | 48% |
| CC-3-V1 | 10.5% |
| CCP-V-1 | 11% |
| CLP-V-1 | 6.0% |
| CLP-3-T | 5.5% |
| PGP-2-2V | 5.0% |
| PGUQU-3-F | 4.0% |
| APUQU-2-F | 4.5% |
| PP-1-2V1 | 5.0% |
| PPGU-3-F | 0.5% |

| H13: Nematic host mixture (Δε > 0) | |
|---|---|
| CCQU-2-F | 15% |
| CCQU-3-F | 15% |
| CCQU-5-F | 15% |
| CCU-3-F | 12% |
| CCU-5-F | 6.0% |
| CCP-3-1 | 10% |
| CGPC-5-3 | 6.0% |
| CGPC-3-3 | 3.0% |
| CDUQU-3-F | 8.0% |
| CCP-2-OCF3 | 5.0% |
| CCP-3-OCF3 | 5.0% |

| H14: Nematic host mixture (Δε < 0) | |
|---|---|
| Host H1 | 99.55% |
| RM-1 | 0.45% |

| H15: Nematic host mixture (Δε > 0) | |
|---|---|
| CC-3-V | 48% |
| CC-3-V1 | 12% |
| CCP-V-1 | 11.5% |
| CLP-V-1 | 9.0% |
| PGP-2-2V | 4.5% |
| PGUQU-3-F | 3.0% |
| APUQU-2-F | 7.5% |
| PP-1-2V1 | 4.0% |
| PPGU-3-F | 0.5% |

Various % proportions by weight of the example additives indicated are added to the base mixture, which is then investigated with respect to various parameters (contact angle, surface tension, droplet size, ODF drop mura).

1. Measurement of the Contact Angle

The contact angle between the substrate surface and the liquid-crystal medium is investigated using a Krüss "Easy Drop" drop shape analyser. The substrate is coated with a polyimide (product JALS-2347-R6 from JSR, Table 1) or with ITO. The measurement is carried out using a drop having a volume of 0.4 μl at room temperature (21° C.) and 45% relative atmospheric humidity. To this end, a single drop is applied using a metering pipette and measured photographically after a waiting time of 60 s. The contour is analysed by means of the circle method.

The measurement results are shown in Tables 1 and 2 below.

TABLE 1

Contact angle measurement values of the test mixtures with various additives and variation of the added amount on polyimide-coated substrates. Measurement after 60 s.

| No. | Additive (% by wt.) | Base mixture | Contact angle [ ° ] | Standard deviation [ ° ] |
|---|---|---|---|---|
| 1 | none (0% by wt.) | H3 | 19.2 | 0.7 |
| 2 | 1 (0.037% by wt.) | H3 | 18.1 | 1.3 |
| 3 | 1 (0.37% by wt.) | H3 | 11.2 | 0.4 |
| 4 | 1 (1.2% by wt.) | H3 | 10.1 | 0.5 |
| 5 | 2 (0.010% by wt.) | H3 | 14.0 | 0.4 |
| 6 | 2 (0.23% by wt.) | H3 | 12.3 | 0.3 |
| 7 | 2 (0.03% by wt.) | H3 | 13.9 | 0.7 |
| 8 | 2 (0.1% by wt.) | H3 | 16.1 | 0.3 |
| 9 | 2 (0.22% by wt.) | H3 | 17.0 | 0.5 |
| 10 | — | H2 | 14.0 | 0.6 |
| 11 | 1 (0.13% by wt.) | H2 | 14.2 | 0.8 |
| 12 | 1 (0.30% by wt.) | H2 | 13.0 | 0.3 |
| 13 | 1 (1.30% by wt.) | H2 | 11.3 | 0.2 |
| 14 | — | H1 | 13.8 | 0.3 |
| 15 | 1 (0.30% by wt.) | H1 | 11.6 | 0.4 |
| 16 | 2 (0.023% by wt.) | H1 | 9.4 | 0.4 |
| 17 | — | H4 | 15.2 | 0.1 |
| 18 | 2 (0.023% by wt.) | H4 | 13.0 | 0.2 |
| 19 | 3 (1% by wt.) | H4 | 12.5 | 0.1 |
| 20 | — | H5 | 16.5 | 0.9 |
| 21 | 2 (0.023% by wt.) | H5 | 14.0 | 0.8 |
| 22 | 3 (1% by wt.) | H5 | 13.0 | 0.4 |
| 23 | — | H6 | 17.9 | 0.3 |
| 24 | 2 (0.023% by wt.) | H6 | 13.1 | 0.6 |
| 25 | 3 (1% by wt.) | H6 | 14.6 | 0.2 |
| 26 | — | H7 | 16.2 | 0.1 |
| 27 | 2 (0.023% by wt.) | H7 | 13.2 | 0.2 |
| 28 | 3 (1% by wt.) | H7 | 13.9 | 0.2 |
| 29 | — | H8 | 18.7 | 0.5 |
| 30 | 2 (0.023% by wt.) | H8 | 13.6 | 0.1 |
| 31 | 3 (1% by wt.) | H8 | 14.8 | 0.5 |
| 32 | — | H9 | 15.7 | 0.5 |
| 33 | 2 (0.023% by wt.) | H9 | 15.3 | 0.5 |
| 34 | 3 (1% by wt.) | H9 | 14.1 | 0.2 |
| 35 | — | H10 | 12.9 | 0.2 |
| 36 | 2 (0.023% by wt.) | H10 | 12.0 | 0.5 |
| 37 | 3 (1% by wt.) | H10 | 11.6 | 0.1 |
| 38 | — | H11 | 11.0 | 0.8 |
| 39 | 2 (0.023% by wt.) | H11 | 10.2 | 0.4 |
| 40 | 3 (1% by wt.) | H11 | 9.9 | 0.4 |
| 41 | — | H12 | 14.5 | 0.4 |
| 42 | 3 (1% by wt.) | H12 | 11.1 | 0.4 |
| 43 | — | H13 | 14.5 | 0.4 |
| 44 | 3 (1% by wt.) | H13 | 11.3 | 0.3 |
| 45 | — | H14 | 14.8 | 0.7 |
| 46 | 3 (1% by wt.) | H14 | 11.6 | 0.4 |

TABLE 2

Contact angle measurement values of the test mixtures with various additives in base mixture H14 and variation of the added amount on various substrates (ITO, glass and PSA-PI CT 16557). Measurement after 20 s.

| No. | Additive | % by wt. | Substrate surface | Contact angle [ ° ] | Standard deviation [ ° ] |
|---|---|---|---|---|---|
| 1 | — | — | PSA-PI | 13.1 | 0.5 |
| 2 | 2 | 0.025 | PSA-PI | 11.9 | 0.2 |
| 3 | 3 | 1 | PSA-PI | 11.4 | 0.4 |
| 4 | 2 + 3 | 0.025 + 1 | PSA-PI | 10.8 | 0.2 |
| 5 | — | — | ITO | 5.8 | 1.6 |
| 6 | 2 | 0.025 | ITO | 4.3 | 0.9 |
| 7 | 3 | 1 | ITO | 5.2 | 0.9 |
| 8 | 2 + 3 | 0.025 + 1 | ITO | 5.1 | 0.8 |
| 9 | — | — | Glass | 19.5 | 0.3 |
| 10 | 2 | 0.025 | Glass | 6.2 | 0.2 |
| 15 | 5 | 0.01 | Glass | 11.9 | 2.1 |
| 16 | 5 | 0.025 | Glass | 10.4 | 2.0 |
| 17 | 5 | 0.1 | Glass | 10.4 | 1.4 |
| 18 | 5 | 1 | Glass | 11.1 | 0.34 |

The contact angles are already reduced significantly by a small amount (<1%) of additives. A small contact angle improves the spreading behaviour.

2. Measurement of the Surface Tension

The surface tension of the liquid-crystal media is investigated using a Krüss "Easy Drop" drop shape analyser. The measurement method used measures the deformation of a hanging drop under the action of gravity. The measurement is carried out using a dropping tip with a diameter of 1.054 mm at room temperature (21° C.) and 45% relative atmospheric humidity. The needle tip and the drop are recorded using a camera and subsequently evaluated by means of the Young-Laplace equation. The specific density of the liquid-crystal media is measured using a flexural resonator. The measurement results are shown in Table 3 below.

TABLE 3

Surface tension measurement values of the test mixtures with various additives and variation of the added amount.

| No. | Additive (% by wt.) | Base mixture | Surface tension [mN/m] | Standard deviation [mN/m] |
|---|---|---|---|---|
| 1 | none (0% by wt.) | H2 | 28.10 | 0.04 |
| 2 | 1 (1.5% by wt.) | H2 | 24.58 | 0.06 |

The result obtained is a clear reduction in the surface tension due to the addition of an additive to a liquid-crystal mixture.

3. Measurement: Enlargement of the Drop Size After Application

The analysis of the drop size is carried out using a microscope and an evaluation program for determination of the geometrical surface of a drop on the substrate. For the measurement, in each case a drop having a volume of 10.0 μl is applied to the substrate. After prespecified waiting times (0.25 min, 5 min, 60 min), the wetted surface is photographed and evaluated. For each waiting time, the relative drop size compared with a medium without additive (reference waiting time 0.25 min or 5 min) is determined. The measurement results on polyimide (on glass), glass, and Ito (on glass) substrates are shown in the Tables 4, 5 and 6 below.

TABLE 4

Relative drop size after waiting time with various additives on polyimide (reference waiting time = 0.25 min).

| No. | Additive (% by wt.) | Base mixture | Relative drop size after waiting time, [%] | | |
|---|---|---|---|---|---|
| | | | 0.25 min | 5 min | 60 min |
| 1 | none (0% by wt.) | H2 | 100 | 106 | 109 |
| 2 | 1 (1.5% by wt.) | H2 | 118 | 135 | 149 |

TABLE 4-continued

Relative drop size after waiting time with various additives on polyimide (reference waiting time = 0.25 min).

| | | Base | Relative drop size after waiting time, [%] | | |
|---|---|---|---|---|---|
| No. | Additive (% by wt.) | mixture | 0.25 min | 5 min | 60 min |
| 3 | none (0% by wt.) | H1 | 100 | 102 | 101 |
| 4 | 1 (1.5% by wt.) | H1 | 108 | 125 | 141 |

TABLE 5

Relative drop size after waiting time with various additives on glass (reference waiting time = 5 min).

| No. | Additive (% by wt.) | Base mixture | Relative drop size after waiting time, [%] 5 min |
|---|---|---|---|
| 1 | none (0% by wt.) | H2 | 100 |
| 2 | 1 (1.5% by wt.) | H2 | 330 |
| 3 | none (0% by wt.) | H1 | 100 |
| 4 | 1 (1.5% by wt.) | H1 | 442 |

TABLE 6

Relative drop size after waiting time with various additives on ITO (reference waiting time = 5 min).

| No. | Additive (% by wt.) | Base mixture | Relative drop size after waiting time, [%] 5 min |
|---|---|---|---|
| 1 | none (0% by wt.) | H14 | 100 |
| 2 | 2 (0.025% by wt.) | H14 | 210 |
| 3 | 4 (1% by wt.) | H14 | 155 |
| 4 | 2 (0.025% by wt.) + 4 (1% by wt.) | H14 | 225 |

The advantageous enlargement of the droplet size on a substrate, i.e. analogous to ODF conditions, indicates good flow behaviour, readiness for spreading and for even distribution, and rapid homogeneous distribution of the liquid-crystal media. This facilitates a short cycle time in the filling process and fewer droplet traces (ODF mura).

4. ODF Test

The ODF test enables evaluation of the additives under actual process conditions and shows whether ODF mura actually occurring can also be improved by the improved spreading behaviour. The ODF test is composed of a number of part-processes.

a) Production of the Test Displays

The substrates are cleaned before further processing, with the aim of removing all adhering particles. This is carried out by machine in a multistep process in which rinsing is carried out stepwise with a soap solution (distilled water and 0.5% of detergent) and pure distilled water. After completion of the rinsing operation, the substrates are dried at 120° C. for 30 min.

The polyimide is applied to an ITO-coated glass substrate from solution (N-methyl-2-pyrrolidone and Butylcellosolve) by means of spin coating (MIKASA). To this end, a drop of the polyimide solution is applied to the substrate and spun firstly at 80 rpm for 10 s and then at 760 rpm for 45 s. After the process, the PI should have a homogeneous layer thickness of 100 nm. The substrate is then dried at 60° C. on a hotplate for 1 min and then at 230° C. in an oven for 90 min. If necessary, the polyimide is pre-aligned.

This is followed by application of the adhesive (Sekisui) at the edge of the substrate and the dropwise application (ODF) of the LC medium to the substrate. The lower substrate with the adhesive and the LC medium is brought together with an upper substrate provided with ITO and photospacer (3.3 µm) by means of vacuum (5 Pa, 30 s). This is followed by adhesion of the test display by means of UV light, with only the adhesive edge being exposed, and a heating step (in accordance with the adhesive manufacturer's instructions).

This is then followed by the PS-VA process for achieving the pre-tilt.

To this end, a direct voltage of about 10 V is applied to the cell with UV illumination. The UV illumination initiates photopolymerisation of the RM. The desired tilt is established via the RM concentration, the illumination intensity, the illumination duration or the strength of the applied field. When the desired pre-tilt has been achieved, the process is terminated. This is followed by a second UV step without voltage in order to remove the remaining RM.

b) Evaluation of the Drop Mura

The pre-tilt set is measured by means of a Mueller matrix polarimeter (Axometrics Axostep) with spatial resolution in the region in which the drop was located before spreading out during the vacuum process, and in the region where no LC medium was located before the process. The difference is a criterion which describes the ODF level. The smaller the difference, the smaller the ODF mura occurring.

The test display is operated at various grey shades (various driver voltages) against backlighting. With the aid of a DSLR camera, images of the display are recorded and analysed by means of software. The grey shades are determined with the aid of electro-optical curves (transmission against voltage) using an LCD-5200 (Otsuka, JP).

c) Results

Table 7 shows the results of the pre-tilt measurements in the former drop region and non-drop region. The difference in pre-tilt between these two regions is significantly reduced in the presence of the additives, which confirms the efficacy of the additives in an ODF process. The results of the image analysis in Table x are in agreement with these results. A lower drop mura level arises for the mixtures with additive compared with the mixture without additive. The best action is achieved with additive 2.

TABLE 7

Pre-tilt in the drop and non-drop region and the difference thereof. The smaller the difference, the less pronounced is the drop mura.

| | | Base | Pre-tilt, [°] | | |
|---|---|---|---|---|---|
| No. | Additive (% by wt.) | mixture | Non-drop | Drop | Difference |
| 1 | none (0% by wt.) | H14 | 86.40 | 85.12 | 1.28 |
| 2 | 2 (0.025% by wt.) | H14 | 86.38 | 85.77 | 0.61 |
| 3 | 3 (1% by wt.) | H14 | 86.42 | 85.75 | 0.67 |

The image analysis for a defined grey shade shows the same trend. The contrast between the area on which the drop was lying and free area is also smaller here in the case of addition of additives.

TABLE 8

Drop mura level for a grey shade of L-16 after image analysis by means of software.

| No. | Additive (% by wt.) | Base mixture | Drop mura level |
|---|---|---|---|
| 1 | none (0% by wt.) | H14 | 131% |
| 2 | 2 (0.025% by wt.) | H14 | 51% |
| 3 | 3 (1% by wt.) | H14 | 61% |

The invention claimed is:

1. Liquid-crystalline medium comprising a liquid-crystalline component and one or more polymerisable or polymerised compounds, wherein the liquid crystalline component comprises one or more compounds of the formula II

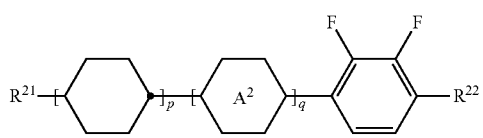

in which $R^{21}$ denotes an unsubstituted alkyl radical having 1 to 7 C atoms, an unsubstituted alkoxy radical having 1 to 6 C atoms or an unsubstituted alkenyl radical having 2 to 7 C atoms, $R^{22}$ denotes an unsubstituted alkyl radical having 1 to 7 C atoms or an unsubstituted alkoxy radical having 1 to 6 C atoms,

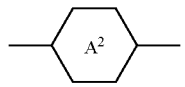

denotes

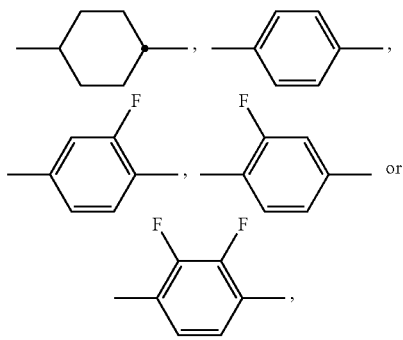

p and q each, independently of one another, denote 0, 1 or 2 and (p+q) denotes 1, 2 or 3, and wherein the liquid-crystalline medium comprises an additive of the following formula I:

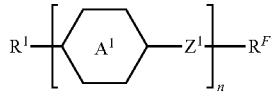

in which $R^1$ denotes a straight-chain alkyl group having 1 to 20 C atoms, a branched alkyl group having 3 to 20 C atoms or H, where, in addition, one or more $CH_2$ groups in the alkyl groups may each be replaced, independently of one another, by —C≡C—, —CH=CH—,

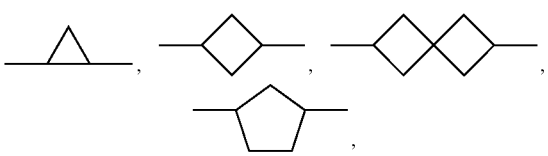

—O—, —S—, —CO—O— or —O—CO— in such a way that O or S atoms are not linked directly to one another, $R^F$ denotes a group selected from the following formulae:
—$R^2$

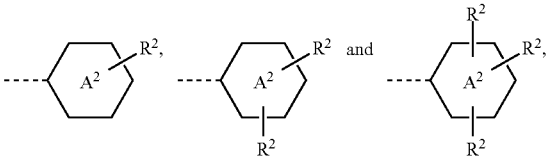

where $R^2$ in each case independently denotes

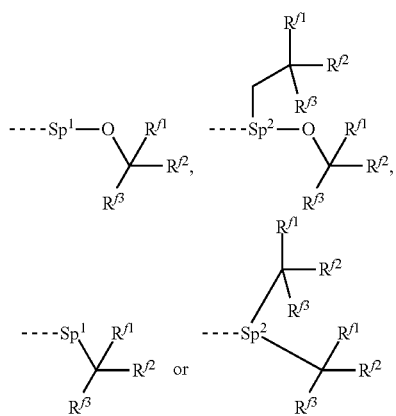

$Rf^1$, $Rf^3$ independently denote H, F, —$CF_3$, —$CF_2CF_3$, —$CF_2CF_2CF_3$ or $CF(CF_3)_2$, $Rf^2$ independently denotes an unbranched, branched or cyclic fluoroalkyl group having 3 to 15 fluorine atoms and 1 to 10 C atoms or 3 to 10 C atoms if branched or cyclic, in which one or more non-adjacent $CH_2$ groups may be replaced by —O— and/or —S—, $Z^1$ independently denotes a single bond, —$CH_2CH_2$—, —COO—, trans- —CH=CH—, trans- —CF=CF—, —$CH_2O$—, —$CF_2O$— or —C≡C—, in which asymmetrical bridges may be oriented to both sides, and where two O atoms of adjacent groups are not connected directly, Sp¹ denotes a single bond or —(CH$_2$)$_m$—, in which m=1, 2, 3 or 4 and in which one or two CH$_2$ groups may be replaced by —O— or —S— in such a way that O/S atoms are not linked directly to one another, Sp² denotes a linear or branched, trivalent spacer, A¹, independently of one another, denotes a radical selected from the following groups:
  a) the group consisting of trans-1,4-cyclohexylene and 1,4-cyclohexenylene, in which, in addition, one or more non-adjacent CH$_2$ groups may be replaced by —O— and/or —S— and in which, in addition, one or more H atoms may be replaced by F or Cl,
  b) 1,4-phenylene, in which, in addition, one or two CH groups may be replaced by N and in which, in addition, one or more H atoms may be replaced by a group L or R², and
  c) the group consisting of 2,6-naphthylene, dibenzofuran-3,7-diyl, dibenzothiophene-3,7-diyl, 9H-fluorene-2,7-diyl, phenanthrene-2,7-diyl, 6H-benzo[c]chromene-3,8-diyl, anthracene-2,6-diyl, tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by a group L, A² denotes a 6- or 5-membered saturated, unsaturated or aromatic, carbocyclic or heterocyclic ring system, which is in each case optionally additionally substituted by one or two groups L, L independently denotes F, Cl, —CN, an alkyl group having 1 to 5 C atoms, an alkoxy group having 1-5 C atoms or an alkenyl group having 2 to 5 C atoms, n denotes 0, 1, 2, 3 or 4.

2. Liquid-crystalline medium according to claim 1, which additionally comprises one or more compounds of the formula IV,

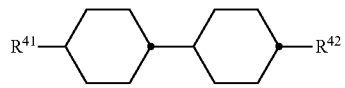

in which;

R$^{41}$ denotes an unsubstituted alkyl radical having 1 to 7 C atoms or an unsubstituted alkenyl radical having 2 to 7 C atoms, and R$^{42}$ denotes an unsubstituted alkyl radical having 1 to 7 C atoms, an unsubstituted alkoxy radical having 1 to 6 C atoms, or an unsubstituted alkenyl radical having 2 to 7 C atoms.

3. Liquid-crystalline medium according to claim 1, wherein the total concentration of the additive of the formula I in the entire medium is 0.001% by weight or more to 2% by weight or less.

4. A compound of the formula I

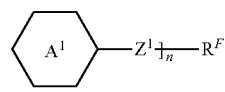

in which

R¹ denotes a straight-chain alkyl group having 1 to 20 C atoms, a branched alkyl group having 3 to 20 C atoms or H, where, in addition, one or more CH$_2$ groups in the alkyl groups may each be replaced, independently of one another, by —C≡C—, —CH=CH—,

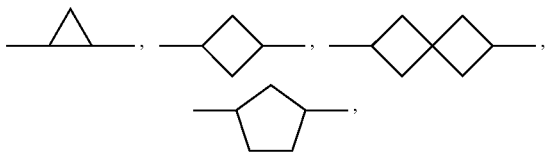

—O—, —S—, —CO—O— or —O—CO— in such a way that O or S atoms are not linked directly to one another, R$^F$ denotes a group selected from the formulae

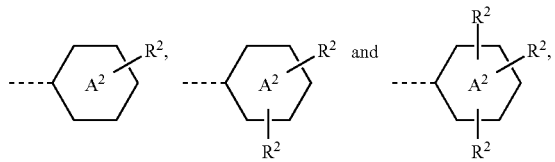

R² in each case independently denotes a group of the following formula:

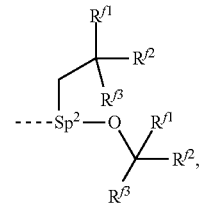

wherein

Rf¹, Rf³ independently denote —CF$_3$, —CF$_2$CF$_3$, —CF$_2$CF$_2$CF$_3$ or CF(CF$_3$)$_2$, Rf² independently denotes an unbranched, branched or cyclic fluoroalkyl group having 3 to 15 fluorine atoms and 1 to 10 C atoms or 3 to 10 C atoms if branched or cyclic, in which one or more non-adjacent CH$_2$ groups may be replaced by —O— and/or —S—, Z¹ in each case independently denotes a single bond, —CH$_2$CH$_2$—, —COO—, trans- —CH=CH—, trans- —CF=CF—, —CH$_2$O—, —CF$_2$O— or —C≡C—, in which asymmetrical bridges may be oriented to both sides and where two O atoms of adjacent groups are not connected directly, Sp² denotes a linear or branched trivalent spacer, A¹ in each case independently denotes a cyclohexane ring or benzene ring, which is optionally additionally substituted by one or two groups L, A² denotes a 6- or 5-membered saturated, unsaturated or aromatic, carbocyclic or heterocyclic ring system, which is in each case optionally additionally substituted by one or two groups L, L independently denotes F, Cl, —CN, an alkyl group having 1 to 5 C atoms, an alkoxy group having 1-5 C atoms or an alkenyl group having 2 to 5 C atoms, and n denotes 0, 1, 2, 3 or 4.

5. A compound according to claim 4, wherein:
$R^F$ denotes a group selected from the formulae

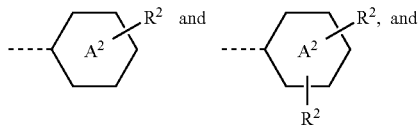

n denotes 0, 1 or 2.

6. A compound according to claim 4, selected from the group of the compounds of the formulae IA to IF:

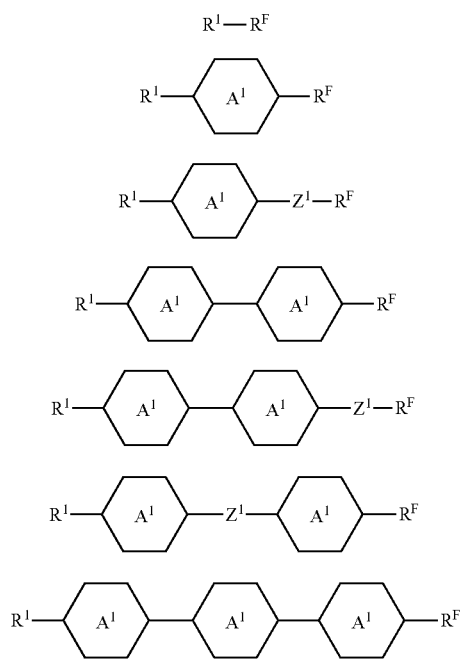

in which the variables independently have the meaning given in claim 4.

7. A compound according to claim 4, which is selected from the group of the compounds of the formulae I-1 to I-4,

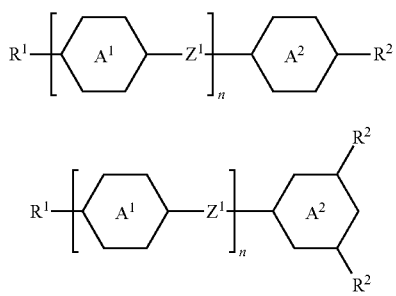

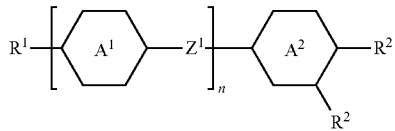

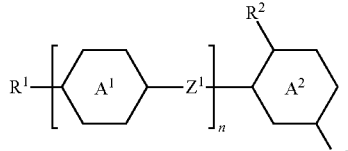

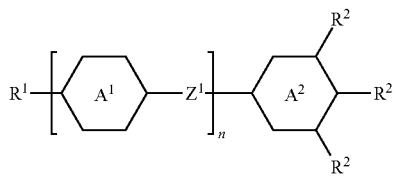

in which the variables independently have the meaning given in claim 4.

8. Process for the preparation of a compound according to claim 6, comprising etherifying a compound of the formula I in which $R^2$ in each case independently denotes

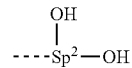

in the presence of a fluorinated alcohol of the formula

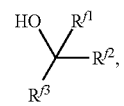

where the formula I and the substituents are defined as in claim 4.

9. Electro-optical display containing a liquid-crystal medium according to claim 1.

10. Process which comprises filling an electro-optical display with a liquid-crystal medium, wherein the liquid-crystal medium comprises an additive of the formula I according to claim 1.

11. A method for preparing a liquid-crystal medium according to claim 1, which comprises adding a compound of formula I to one or more other liquid-crystal compounds.

* * * * *